(12) United States Patent
Craig et al.

(10) Patent No.: US 10,928,784 B2
(45) Date of Patent: Feb. 23, 2021

(54) CENTRAL PLANT OPTIMIZATION SYSTEM WITH STREAMLINED DATA LINKAGE OF DESIGN AND OPERATIONAL DATA

(71) Applicant: Johnson Controls Technology Company, Auburn Hills, MI (US)

(72) Inventors: Peter A. Craig, Pewaukee, WI (US); Michael F. Jaeger, Thiensville, WI (US); James P. Kummer, Wales, WI (US); Carol T. Tumey, Wauwatosa, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 80 days.

(21) Appl. No.: 16/178,361

(22) Filed: Nov. 1, 2018

(65) Prior Publication Data

US 2020/0142364 A1    May 7, 2020

(51) Int. Cl.
*G05B 13/04* (2006.01)
*H02J 3/00* (2006.01)
*H02J 13/00* (2006.01)

(52) U.S. Cl.
CPC .............. *G05B 13/042* (2013.01); *H02J 3/00* (2013.01); *H02J 13/0017* (2013.01); *H02J 3/003* (2020.01); *H02J 2203/20* (2020.01)

(58) Field of Classification Search
CPC ......... G05B 13/042; G05B 13/04; H02J 3/00; H02J 13/0017; H02J 3/003; H02J 2203/20
See application file for complete search history.

(56) References Cited

U.S. PATENT DOCUMENTS 8,903,554 B2  12/2014  Stagner
9,429,923 B2  8/2016  Ward et al.
(Continued)

OTHER PUBLICATIONS

Arthur J Helmicki, Clas A Jacobson, and Carl N Nett. Control Oriented System Identification: a Worstcase/deterministic Approach in H1. IEEE Transactions on Automatic control, 36(10):1163-1176, 1991. 13 pages.
(Continued)

*Primary Examiner* — Mohammad Ali
*Assistant Examiner* — Sheela Rao
(74) *Attorney, Agent, or Firm* — Foley & Lardner LLP

(57) ABSTRACT

A central plant optimization system for designing and operating a central plant includes a planning tool, a central plant controller, and an optimization platform. The planning tool is configured to generate a model of the central plant. The central plant controller is configured to receive the model of the central plant from the planning tool and combine the model of the central plant with timeseries data including a timeseries of predicted energy loads to be served by equipment of the central plant. The optimization platform is configured to receive the model of the central plant combined with the timeseries data, construct an optimization problem using the model of the central plant and the timeseries data, solve the optimization problem to determine an optimal allocation of the energy loads across the equipment of the central plant, and provide optimization results to the central plant controller. The central plant controller is configured to use the optimization results to operate the equipment of the central plant to achieve the optimal allocation of the predicted energy loads.

20 Claims, 17 Drawing Sheets

(56) References Cited

U.S. PATENT DOCUMENTS

| | | | |
|---|---|---|---|
| 2012/0010758 A1* | 1/2012 | Francino | F01K 13/02 700/291 |
| 2015/0316907 A1 | 11/2015 | Elbsat et al. | |
| 2017/0104345 A1 | 4/2017 | Wenzel et al. | |
| 2018/0197253 A1 | 7/2018 | Elbsat et al. | |
| 2018/0202675 A1 | 7/2018 | Park et al. | |

OTHER PUBLICATIONS

Diederik Kingma and Jimmy Ba. Adam: A Method for Stochastic Optimization. In International Conference on Learning Representations (ICLR), 2015, 15 pages.

George EP Box, Gwilym M Jenkins, Gregory C Reinsel, and Greta M Ljung. Time Series Analysis: Forecasting and Control. John Wiley & Sons, 2015, chapters 13-15. 82 pages.

Jie Chen and Guoxiang Gu. Control-oriented System Identification: an H1 Approach, vol. 19. Wiley-Interscience, 2000, chapters 3 & 8, 38 pages.

Jingjuan Dove Feng, Frank Chuang, Francesco Borrelli, and Fred Bauman. Model Predictive Control of Radiant Slab Systems with Evaporative Cooling Sources. Energy and Buildings, 87:199-210, 2015. 11 pages.

K. J. Astrom. Optimal Control of Markov Decision Processes with Incomplete State Estimation. J. Math. Anal. Appl., 10:174-205, 1965.31 pages.

Kelman and F. Borrelli. Bilinear Model Predictive Control of a HVAC System Using Sequential Quadratic Programming. In Proceedings of the 2011 IFAC World Congress, 2011, 6 pages.

Lennart Ljung and Torsten Soderstrom. Theory and practice of recursive identification, vol. 5. JSTOR, 1983, chapters 2, 3 & 7, 80 pages.

Lennart Ljung, editor. System Identification: Theory for the User (2nd Edition). Prentice Hall, Upper Saddle River, New Jersey, 1999, chapters 5 and 7, 40 pages.

Moritz Hardt, Tengyu Ma, and Benjamin Recht. Gradient Descent Learns Linear Dynamical Systems. arXiv preprint arXiv:1609.05191, 2016, 44 pages.

Nevena et al. Data center cooling using model-predictive control, 10 pages.

Sergio Bittanti, Marco C Campi, et al. Adaptive Control of Linear Time Invariant Systems: The "Bet on the Best" Principle. Communications in Information & Systems, 6(4):299-320, 2006. 21 pages.

Yudong Ma, Anthony Kelman, Allan Daly, and Francesco Borrelli. Predictive Control for Energy Efficient Buildings with Thermal Storage: Modeling, Stimulation, and Experiments. IEEE Control Systems, 32(1):44-64, 2012. 20 pages.

Yudong Ma, Francesco Borrelli, Brandon Hencey, Brian Coffey, Sorin Bengea, and Philip Haves. Model Predictive Control for the Operation of Building Cooling Systems. IEEE Transactions on Control Systems Technology, 20(3):796-803, 2012.7 pages.

\* cited by examiner

US 10,928,784 B2

CENTRAL PLANT OPTIMIZATION SYSTEM WITH STREAMLINED DATA LINKAGE OF DESIGN AND OPERATIONAL DATA

BACKGROUND

The present disclosure relates generally to a central plant or central energy facility configured to serve the energy loads of a building or campus. The present disclosure relates more particular to a central plant with an asset allocator configured to determine an optimal distribution of the energy loads across various subplants of the central plant and its data linkage of central plant design and operational data.

A central plant typically include multiple subplants configured to serve different types of energy loads. For example, a central plant may include a chiller subplant configured to serve cooling loads, a heater subplant configured to serve heating loads, and/or an electricity subplant configured to serve electric loads. A central plant purchases resources from utilities to run the subplants to meet the loads.

Some central plants include energy storage. Energy storage may be a tank of water that stores hot water for campus heating, an ice tank for campus cooling, and/or battery storage. In the presence of real-time pricing from utilities, it may be advantageous to manipulate the time that a certain resource or energy type is consumed. Instead of producing the resource exactly when it is required by the load, it can be optimal to produce that resource at a time when the production cost is low, store it, and then use it when the resource needed to produce that type of energy is more expensive. It may be necessary to optimally allocate the energy loads across the assets of the central plant.

It can be difficult and challenging to achieve a central plant that is both optimally designed and operated. Tools used to design plants may not share data with operational software, such as a central plant controller. Therefore sharing data and information between the design and operational tools can be tedious and costly, and may require significant re-formatting of data when moving between the tools. Separating the data and functions can allow for easy linkage of design and operational data.

SUMMARY

One implementation of the present disclosure is a central plant optimization system for designing and operating a central plant. The system includes a planning tool configured to generate a model of the central plant. The model of the central plant comprises one or more subplant models representing equipment of the central plant and one or more element links representing connections between the equipment of the central plant. The system further includes a central plant controller configured to receive the model of the central plant from the planning tool and combine the model of the central plant with timeseries data. The timeseries data comprised of a timeseries of predicted energy loads to be served by the equipment of the central plant. The system further includes an optimization platform configured to receive, from the central plant controller, the model of the central plant combined with the timeseries data, construct an optimization problem using the model of the central plant and the timeseries data, solve the optimization problem to determine an optimal allocation of the energy loads across the equipment of the central plant at each of a plurality of time steps within an optimization period; and, and provide optimization results including the optimal allocation of the predicted energy loads to the central plant controller. The central plant controller is configured to use the optimization results to operate the equipment of the central plant in order to achieve the optimal allocation of the predicted energy loads.

In some embodiments, the timeseries data comprises a timeseries of prices for one or more resources consumed by the equipment of the central plant. In some embodiments, the planning tool is configured to combine the model of the central plant with plan information comprising predetermined energy loads for each time step of the optimization period. In some embodiments, the optimization platform is configured to receive, from the planning tool, the model of the central plant combined with the plan information and solve the optimization problem using the plan information in place of the timeseries data in response to a request from the planning tool.

In some embodiments, the optimization platform is configured to receive the model of the central plant occurs on a scheduled interval. In some embodiments, the central plant controller is configured to provide optimization results comprising the optimal allocation of the predicted energy loads to the planning tool. In some embodiments, the planning tool is configured to use optimization results for reporting and analysis of the system.

In some embodiments, the system includes a database configured to store shared data for the system. In some embodiments, the planning tool is configured to receive initial data from an external source to be used for generating the model of the central plant. In some embodiments, the planning tool is configured to allow user interaction, via a user interface, for designing the central plant.

Another implementation of the present disclosure is a method for designing and operating a central plant. The method includes generating, by a planning tool, a model of the central plant. The model of the central plant comprises one or more subplant models representing equipment of the central plant and one or more element links representing connections between the equipment of the central plant. The method further includes receiving, by a central plant controller, the model of the central plant from the planning tool. The method further includes combining, by a central plant controller, the model of the central plant with timeseries data. The timeseries data comprised of a timeseries of predicted energy loads to be served by the equipment of the central plan. The method further includes receiving, by an optimization platform, a model of the central plant combined with timeseries data. The method further includes constructing, by an optimization platform, an optimization problem using the model of the central plant and the timeseries data. The method further includes solving, by the optimization platform, the optimization problem to determine an optimal allocation of the energy loads across the equipment of the central plant at each of a plurality of time steps within an optimization period. The method further includes providing, by the optimization platform, optimization results. The optimization results depicting the optimal allocation of the predicted energy loads to the central plant controller. The method further includes using, by the central plant controller, the optimization results to operate the equipment of the central plant to achieve the optimal allocation of the predicted energy loads.

In some embodiments, the timeseries data further comprise a timeseries of prices for one or more resources consumed by the equipment of the central plant. In some embodiments, the method further includes combining, by the planning tool, the model of the central plant with plan information comprising predetermined energy loads for each time step of the optimization period. In some embodiments, receiving the model of the central plant occurs on a scheduled interval.

In some embodiments, the method further includes receiving, by the optimization platform, from the planning tool, the model of the central plant combined with the plan information and solving, by the optimization platform, the optimization problem using the plan information in place of the timeseries data in response to a request from the planning tool. In some embodiments, the method further includes, by the central plant controller optimization results comprising the optimal allocation of the predicted energy loads to the planning tool. In some embodiments, the method further includes using, by the planning tool, optimization results for reporting and analysis of the system.

In some embodiments, the method further includes storing, by a database, shared data for the system. In some embodiments, the method further includes receiving, by the planning tool, initial data from an external source to be used for generating the model of the central plant. In some embodiments, the method further includes allowing, by the planning tool, user interaction, via a user interface, for designing the central plant Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Overview

Referring generally to the FIGURES, a central plant optimization system with design and operational data linkage is shown, according to some embodiments. The central plant optimization system can include a planning tool, central plant controller, and an optimization platform referred to herein as an Algorithms As A Service (A3S) platform. The planning tool can be configured to design, build, and re-design the central plant. The central plant controller can be configured to monitor and operate the central plant. The A3S platform can be configured to determine an optimal distribution of heating, cooling, electricity, and energy loads across different subplant (e.g., equipment group) of the central plant. When the central plant is both optimally designed (via the planning tool) and operated (via the central plant controller), maximum benefits (e.g., lowest life-cycle costs) can be achieved. The planning tool and central plant controller can share data and information to simplify the commission and operating processes and avoid significant re-formatting of data when moving between components of the central plant optimization system. In some embodiments, the sharing of data and information between components of the central plant optimization system can reduce costs of implementing and operating the central plant.

Building HVAC System

Figure 1:
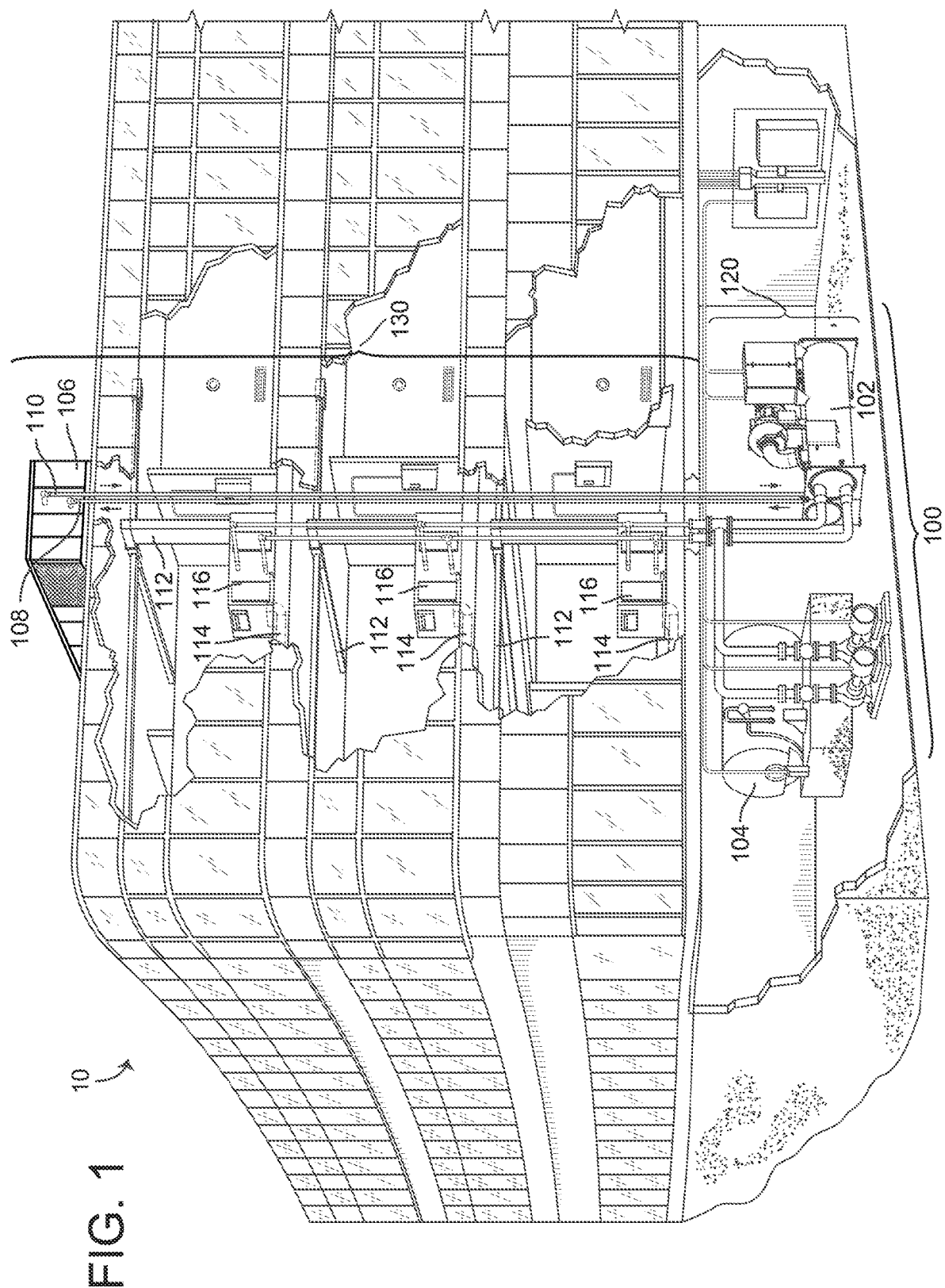
FIG. 1 is a drawing of a building equipped with a HVAC system, according to an exemplary embodiment.

Referring now to FIG. 1, a perspective view of a building 10 is shown. Building 10 can be served by a building management system (BMS). A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof. An example of a BMS which can be used to monitor and control building 10 is described in U.S. patent application Ser. No. 14/717,593 filed May 20, 2015, the entire disclosure of which is incorporated by reference herein.

The BMS that serves building 10 may include a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130.

Waterside system 120 may provide a heated or chilled fluid to an air handling unit of airside system 130. Airside system 130 may use the heated or chilled fluid to heat or cool an airflow provided to building 10. In some embodiments, waterside system 120 can be replaced with or supplemented by a central plant or central energy facility (described in greater detail with reference to FIG. 2). An example of an airside system which can be used in HVAC system 100 is described in greater detail with reference to FIG. 3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (e.g., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Central Plant

Figure 2:
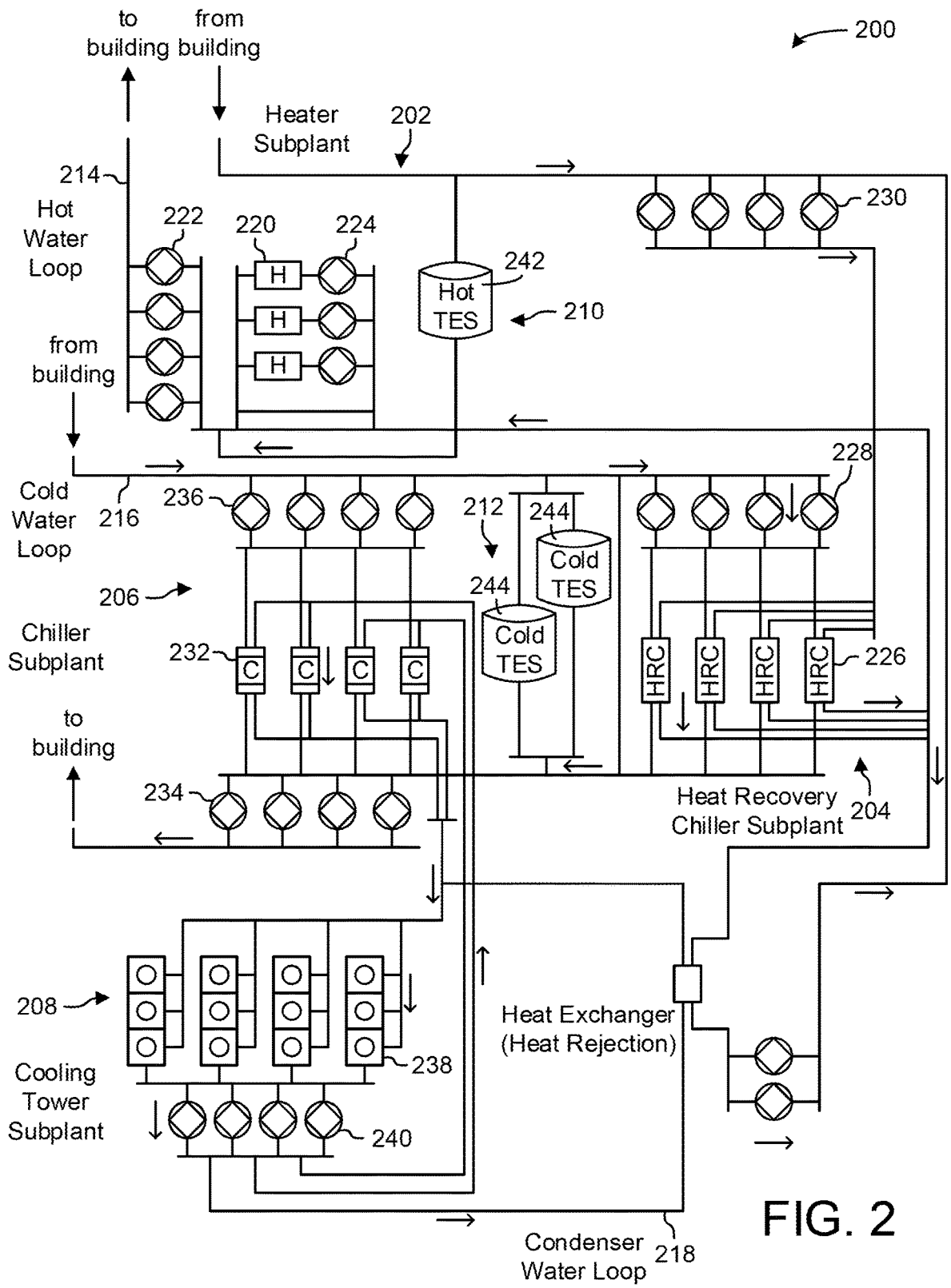
FIG. 2 is a block diagram of a central plant which can be used to serve the energy loads of the building of FIG. 1, according to an exemplary embodiment.

Referring now to FIG. 2, a block diagram of a central plant 200 is shown, according to some embodiments. In various embodiments, central plant 200 can supplement or replace waterside system 120 in HVAC system 100 or can be implemented separate from HVAC system 100. When implemented in HVAC system 100, central plant 200 can include a subset of the HVAC devices in HVAC system 100 (e.g., boiler 104, chiller 102, pumps, valves, etc.) and may operate to supply a heated or chilled fluid to AHU 106. The HVAC devices of central plant 200 can be located within building 10 (e.g., as components of waterside system 120) or at an offsite location such as a central energy facility that serves multiple buildings.

Central plant 200 is shown to include a plurality of subplants 202-208. Subplants 202-208 can be configured to convert energy or resource types (e.g., water, natural gas, electricity, etc.). For example, subplants 202-208 are shown to include a heater subplant 202, a heat recovery chiller subplant 204, a chiller subplant 206, and a cooling tower subplant 208. In some embodiments, subplants 202-208 consume resources purchased from utilities to serve the energy loads (e.g., hot water, cold water, electricity, etc.) of a building or campus. For example, heater subplant 202 can be configured to heat water in a hot water loop 214 that circulates the hot water between heater subplant 202 and building 10. Similarly, chiller subplant 206 can be configured to chill water in a cold water loop 216 that circulates the cold water between chiller subplant 206 building 10.

Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. In various embodiments, central plant 200 can include an electricity subplant (e.g., one or more electric generators) configured to generate electricity or any other type of subplant configured to convert energy or resource types.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-208 to receive further heating or cooling.

Although subplants 202-208 are shown and described as heating and cooling water for circulation to a building, it is understood that any other type of working fluid (e.g., glycol, $CO_2$, etc.) can be used in place of or in addition to water to serve thermal energy loads. In other embodiments, subplants 202-208 may provide heating and/or cooling directly to the building or campus without requiring an intermediate heat transfer fluid. These and other variations to central plant 200 are within the teachings of the present disclosure.

Each of subplants 202-208 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

In some embodiments, one or more of the pumps in central plant 200 (e.g., pumps 222, 224, 228, 230, 234, 236, and/or 240) or pipelines in central plant 200 include an isolation valve associated therewith. Isolation valves can be integrated with the pumps or positioned upstream or downstream of the pumps to control the fluid flows in central plant 200. In various embodiments, central plant 200 can include more, fewer, or different types of devices and/or subplants based on the particular configuration of central plant 200 and the types of loads served by central plant 200.

Still referring to FIG. 2, central plant 200 is shown to include hot thermal energy storage (TES) 210 and cold thermal energy storage (TES) 212. Hot TES 210 and cold TES 212 can be configured to store hot and cold thermal energy for subsequent use. For example, hot TES 210 can include one or more hot water storage tanks 242 configured to store the hot water generated by heater subplant 202 or heat recovery chiller subplant 204. Hot TES 210 may also include one or more pumps or valves configured to control the flow rate of the hot water into or out of hot TES tank 242.

Similarly, cold TES 212 can include one or more cold water storage tanks 244 configured to store the cold water generated by chiller subplant 206 or heat recovery chiller subplant 204. Cold TES 212 may also include one or more pumps or valves configured to control the flow rate of the cold water into or out of cold TES tanks 244. In some embodiments, central plant 200 includes electrical energy storage (e.g., one or more batteries) or any other type of device configured to store resources. The stored resources can be purchased from utilities, generated by central plant 200, or otherwise obtained from any source.

Figure 3:
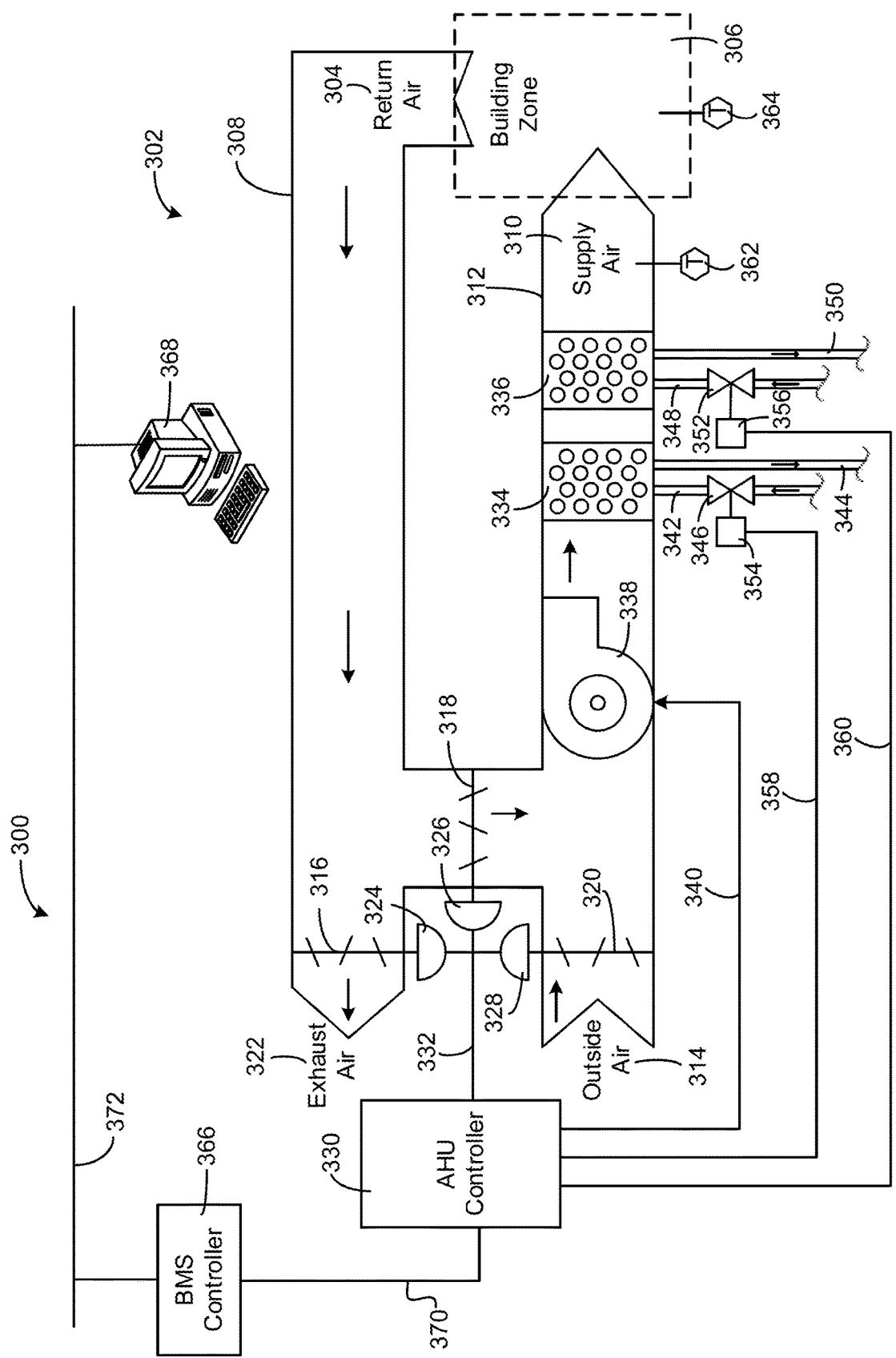
FIG. 3 is a block diagram of an airside system that may be used in conjunction with the building of FIG. 1, according to an exemplary embodiment.

Referring now to FIG. 3, a block diagram of an airside system 300 is shown, according to an exemplary embodiment. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 can operate to heat or cool an airflow provided to building 10 using a heated or chilled fluid provided by waterside system 200.

Airside System

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by central plant 200.

Airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from central plant 200 (e.g., from cold water loop 216) via piping 342 and may return the chilled fluid to central plant 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from central plant 200 (e.g., from hot water loop 214) via piping 348 and may return the heated fluid to central plant 200 via piping

350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, central plant 200, HVAC system 100, and/or other controllable systems that serve building 10. BMS controller 366 may communicate with multiple downstream building systems or subsystems (e.g., HVAC system 100, a security system, a lighting system, central plant 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Building Automation System

Figure 4:
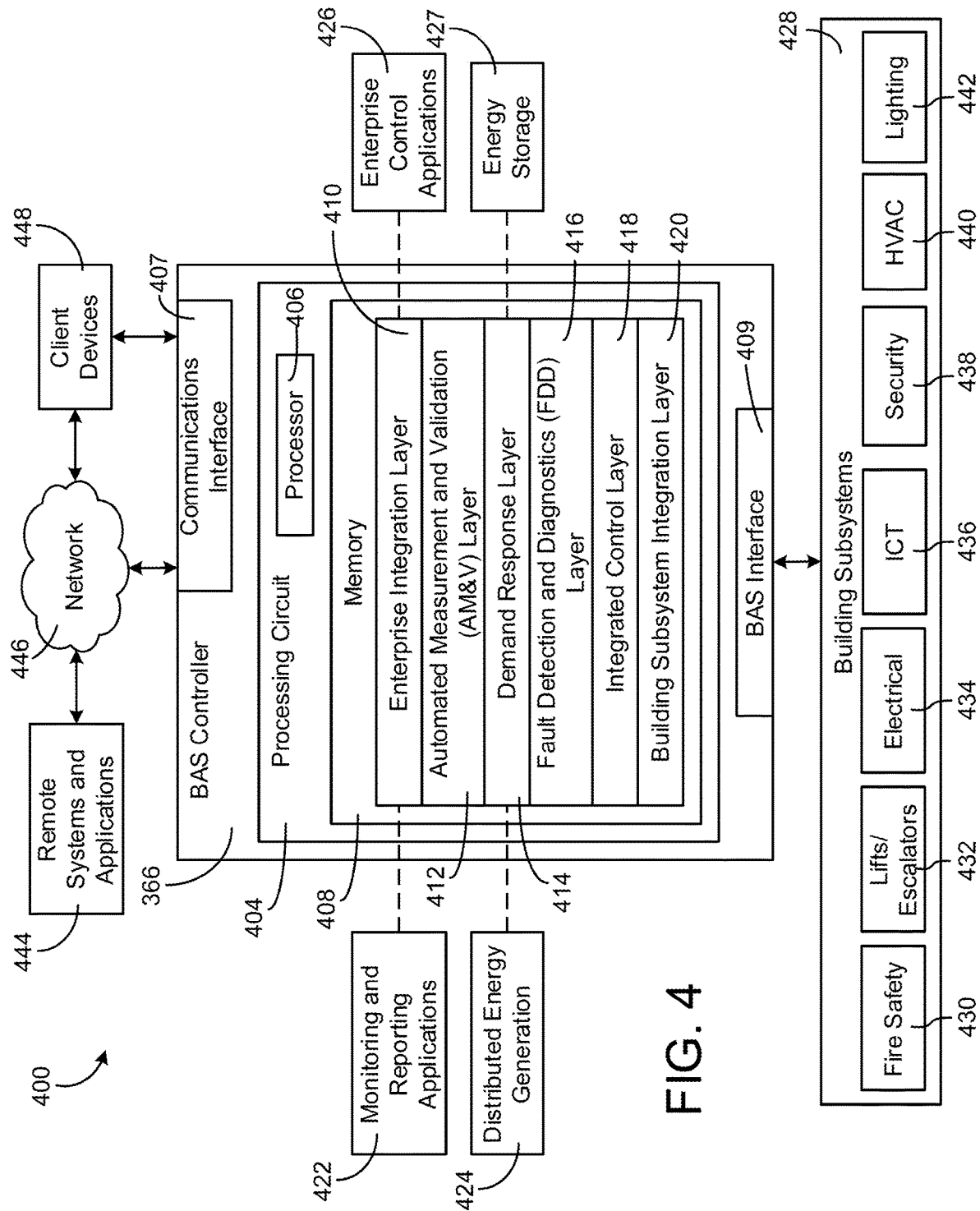
FIG. 4 is a block diagram of a building automation system (BAS) that may be used to monitor and/or control the building of FIG. 1, according to an exemplary embodiment.

Referring now to FIG. 4, a block diagram of a building automation system (BAS) 400 is shown, according to an exemplary embodiment. BAS 400 can be implemented in building 10 to automatically monitor and control various building functions. BAS 400 is shown to include BAS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BAS controller 366 is shown to include a communications interface 407 and a BAS interface 409. Interface 407 can facilitate communications between BAS controller 366 and external applications (e.g., monitoring and reporting applications 422, enterprise control applications 426, remote systems and applications 444, applications residing on client devices 448, etc.) for allowing user control, monitoring, and adjustment to BAS controller 366 and/or subsystems 428. Interface 407 can also facilitate communications between BAS controller 366 and client devices 448. BAS interface 409 can facilitate communications between BAS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BAS interface 409 is an Ethernet interface. In other embodiments, both communications interface 407 and BAS interface 409 are Ethernet interfaces or are the same Ethernet interface.

Still referring to FIG. 4, BAS controller 366 is shown to include a processing circuit 404 including a processor 406 and memory 408. Processing circuit 404 can be communicably connected to BAS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to an exemplary embodiment, memory 408 is communicably connected to processor 406 via processing circuit 404 and includes computer code for executing (e.g., by processing circuit 404 and/or processor 406) one or more processes described herein.

In some embodiments, BAS controller 366 is implemented within a single computer (e.g., one server, one housing, etc.). In various other embodiments BAS controller 366 can be distributed across multiple servers or computers (e.g., that can exist in distributed locations). Further, while FIG. 4 shows applications 422 and 426 as existing outside of BAS controller 366, in some embodiments, applications 422 and 426 can be hosted within BAS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BAS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 can also or alternatively be configured to provide configuration GUIs for configuring BAS controller 366. In yet other embodiments, enterprise control applications 426 can work with layers 410-420 to optimize building performance (e.g., efficiency, energy use, comfort, or safety) based on inputs received at interface 407 and/or BAS interface 409.

Building subsystem integration layer 420 can be configured to manage communications between BAS controller 366 and building subsystems 428. For example, building subsystem integration layer 420 can receive sensor data and input signals from building subsystems 428 and provide output data and control signals to building subsystems 428. Building subsystem integration layer 420 can also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 can receive inputs from other layers of BAS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs can also include inputs such as electrical use (e.g., expressed in kWh), thermal load measurements, pricing information, projected pricing, smoothed pricing, curtailment signals from utilities, and the like.

According to an exemplary embodiment, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 can also include control logic configured to determine when to utilize stored energy. For example, demand response layer 414 can determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models can represent collections of building equipment (e.g., subplants, chiller arrays, etc.) or individual devices (e.g., individual chillers, heaters, pumps, etc.).

Demand response layer 414 can further include or draw upon one or more demand response policy definitions (e.g., databases, Extensible Markup Language (XML) files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In an exemplary embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration can reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints can also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BAS devices or subsystems. For example, AM&V layer 412 can compare a model-predicted output with an actual output from building subsystems 428 to determine an accuracy of the model.

Fault detection and diagnostics (FDD) layer 416 can be configured to provide on-going fault detection for building subsystems 428, building subsystem devices (e.g., building equipment), and control algorithms used by demand response layer 414 and integrated control layer 418. FDD layer 416 can receive data inputs from integrated control layer 418, directly from one or more building subsystems or devices, or from another data source. FDD layer 416 can automatically diagnose and respond to detected faults. The responses to detected or diagnosed faults can include providing an alarm message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to an exemplary embodiment, FDD layer 416 (or a policy executed by an integrated control engine or business rules engine) can shut-down systems or direct control activities around faulty devices or systems to reduce energy waste, extend equipment life, or assure proper control response.

FDD layer 416 can be configured to store or access a variety of different system data stores (or data points for live data). FDD layer 416 can use some content of the data stores to identify faults at the equipment level (e.g., specific chiller, specific AHU, specific terminal unit, etc.) and other content to identify faults at component or subsystem levels. For example, building subsystems 428 can generate temporal (e.g., time-series) data indicating the performance of BAS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alarm a user to repair the fault before it becomes more severe.

Data Linkage System for Central Plant Design and Operational Data

Figure 5:
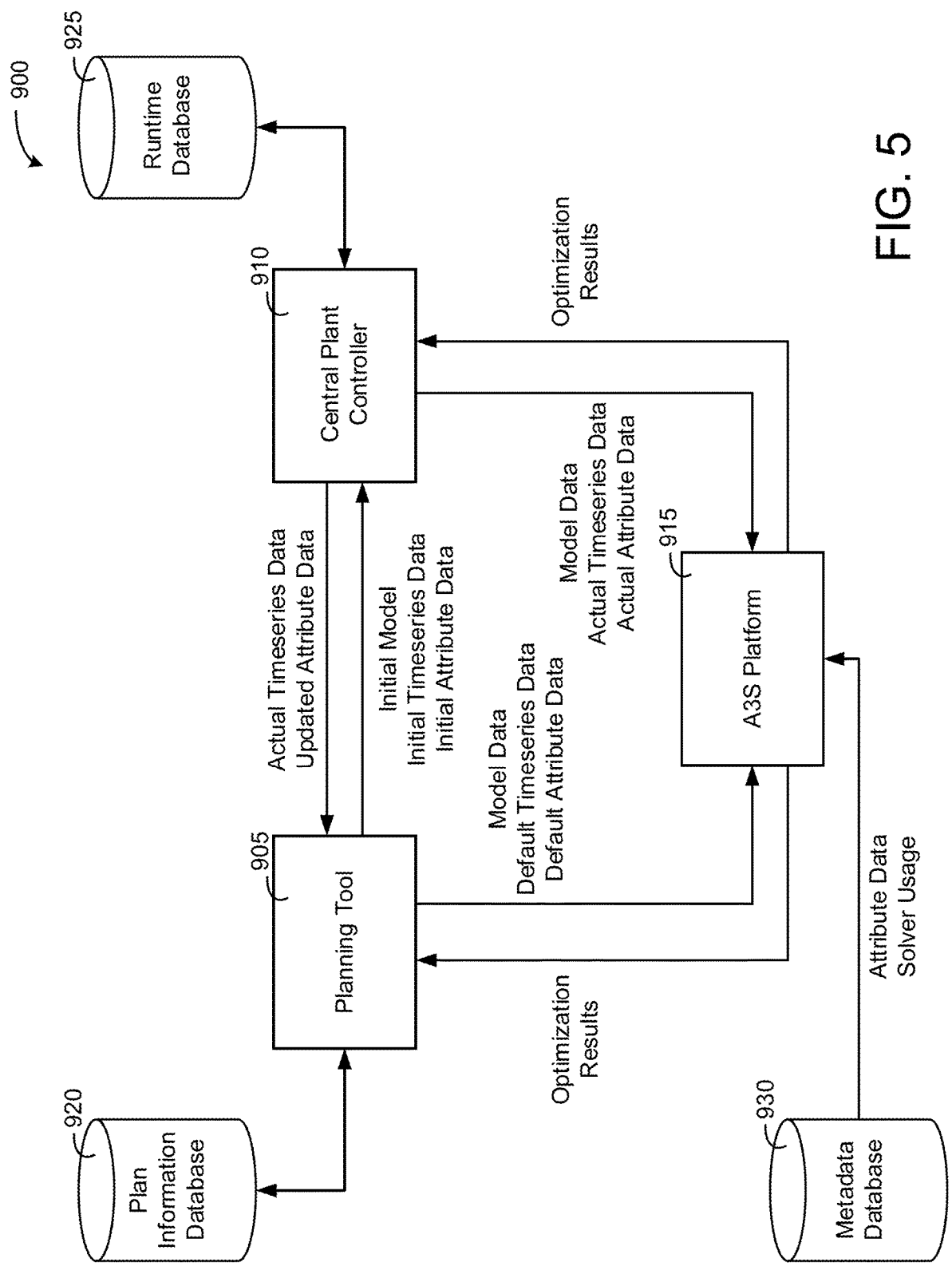
FIG. 5 is a block diagram of a system for exchanging central plant design and operational data, according to an exemplary embodiment.

Referring now to FIG. 5, a system 900 for exchanging central plant design and operational data is shown, according to an exemplary embodiment. System 900 is shown to include planning tool 905, central plant controller 910, A3S platform 915, plan information database 920, runtime database 925, and metadata database 930.

Planning tool 905 may be configured to plan and model the details of a central plant (e.g., number and type of subplants, connections between equipment, equipment capabilities and capacities, etc.). The commissioning process and interaction between planning tool 905 and central plant controller 910 is discussed in greater detail in reference to FIG. 6 and examples of models of a central plant which can be created by planning tool 905 are described with reference to FIGS. 9A and 9B. Planning tool 905 may be cloud-based and can have its own instance of A3S platform 915. The data used by planning tool 905 is shown in FIG. 5 as default timeseries data, which may be historical or hypothetical load data, pricing data, or other types of plan data. The data used by planning tool 905 is distinguished from the data used by central plant controller 910 in that it is not real-time customer data for a particular central plant.

Planning tool 905 may utilize A3S platform 915 to perform a planning optimization using its model for a central plant. Prior to requesting an optimization run, a customer of the central plant may create a model, assign values to attributes (e.g., capacity), and provide data for weather and loads. The customer may then request an optimization run from A3S platform 915 via planning tool 905. Planning tool 905 can send to A3S platform 915 the created customer model, along with default attribute and timeseries data entered by the customer. The data entered by the customer and optimization results received from A3S platform 920 may be stored in plan information database 920. Plan information database 920 may include the planned loads and utility rates, models, and optimization results. The functionality and components of planning tool 905 is discussed in greater detail in reference to at least FIG. 7.

Central plant controller 910 may be configured to control a central plant at a customer site. When controlling the central plant, central plant controller 910 may seek to optimize the allocation of resources to minimize cost or another objective function. Central plant controller 910 may utilize A3S platform 915 to perform the optimization. Central plant controller 910 may send model data and actual data (timeseries and attribute) to A3S platform 915 for optimization. Optimization runs may be scheduled periodically or on demand. For example, during normal operation, central plant controller 910 may request optimization every 15 every minutes. In the case of equipment out of operation or returning to operation, central plant controller 910 may schedule an off-clock optimization run. In each optimization run, central plant controller 910 may send the customer model of the central plant along with current data to A3S platform 915. Current data (timeseries and attribute data) can be acquired from the BAS, but also recent historical data from runtime database 925. Runtime database 925 may provide data to central plant controller 910. In addition, central plant controller 910 may store data in runtime database 925. The data stored in runtime database 925 is data specific to a single customer or single central plant. The amount of data provided to A3S platform 915 can be based on the input schema definition defined by A3S platform 915. Central plant controller 910 is discussed in greater detail in reference to FIG. 10.

A3S platform 915 can be configured to perform optimization for the central plant. A3S platform 915 may receive model data, timeseries data, and attribute data from central plant controller 910. A3S may receive the data in a specific format, for example a JSON formatted document. Upon performing the optimization, A3S platform 915 may send optimization results back to central plant controller 910. In some embodiments, A3S platform 915 can be used for commissioning a central plant. It may receive model data and default data from planning tool 905 (e.g., as a result of a customer request) throughout the planning process of a central plant controller. A3S platform 915 may perform optimization using the temporary data and may send optimization results back to planning tool 905. A3S platform 915 and its optimization process are discussed in greater detail in reference to FIG. 11.

Metadata database 930 can be configured to store metadata including data that is shared across central plants. Metadata database 930 may not store site specific data (e.g., data points from one specific central plant). For example, a metadata database 930 may describe a generic chiller as seen by the optimizer and the interacting components. A chiller has single-valued configuration data (e.g., maximum design capacity, etc.) and its historical time-series data (e.g., chilled water production, etc.). The metadata stored in metadata database 930 may indicate that a chiller would only appear in a plant that produced chilled water and that the plant would need to either have its own cooling towers or be associated with a plant that could handle condenser water. In some embodiments, metadata database 930 is a component of central plant controller 910. Central plant controller 910 may own and control metadata stored in metadata database 930. Metadata stored in metadata database 930 can describe what can be and provides details about the data (e.g., allowed units of measure, base commodity, etc.). Metadata is shared among planning tool 905, central plant controller 910, and A3S platform 915. Metadata can be modified at any point in operation and does not affect customer data (e.g., data of a central plant). By extracting the common information, any customer site can be commissioned with a minimal amount of exchanged information (e.g., model and initial default data).

The metadata database 930 may contain enough data to build a model that the optimizer, A3S platform 915, could understand. Additionally, the metadata database 930 can contain information about that data and its usage for the energy optimization to use. Metadata database 930 can be implemented to store a variety of metadata types such as templates, points, attributes, template connection/relationship rules, and usages.

Template metadata can provide the basis for customer models and specify equipment and subplant definitions. The template metadata may include a unique identifier for the template, as well as a definition for the usage of the template (e.g., primary equipment, optimization subplant, reporting plant, ancillary equipment, etc.). In some embodiments, planning tool 905 may use the template metadata to present users with lists of equipment and aggregations for their model.

Metadata database 930 can be configured to store point metadata. Point metadata may be timeseries data, in other words data that is time-based. The point metadata may be used by planning tool 905, central plant controller 910, and A3S platform 915. In certain embodiments, when runtime database 925 is created, the metadata point information may be used to create point instances for the runtime model's entities. Runtime database 925 may store the unique identifier and qualifier for its points, but may rely on metadata database 930 for common information. For instance, only the metadata database 930 may store the unit category (e.g., power, energy, temperature, etc.) for a point. Point metadata may include a unique identifier for a point (e.g., ChilledWater/AmountProduced_Power may represent chilled water production), a unit category identifier for a point which indicates the category of units for the point (e.g., power, energy, temperature), and a unit commodity type identifier used for refinement of the category and its units (e.g., ChilledWater/AmountProduced_power has a power unit category, but in the United States the unit of measure is displayed as tons, not kilowatts). Point metadata can also include a data source that is a qualifier for the point. For example, the energy optimization system dispatch schedule groups together 3 points: the algorithm-defined setpoint, the BAS-defined setpoint, and the actual BAS value. All of these points share the unique identifier, but have different data sources. In some embodiments, point metadata may also include fields that describe sampling rates and calculations.

Metadata database 930 may store attribute metadata. Attribute metadata includes data that is time independent data, data that is not time-based. A majority of the attribute metadata may be used primarily by the optimizers. Attribute metadata can be configuration parameters (e.g., the chilled water production capacity for each chiller instance). The attribute metadata may be set during commissioning and passed to A3S platform 915 for each optimization execution. In some embodiments, the attribute metadata can be used for reporting (e.g., utilization is the total production divided by the capacity). A3S platform 915 may use schedules, such as equipment out of service and the campus schedule, that is defined as attribute metadata. Attribute metadata may include a unique identifier for the attribute. The unique identifier may appear for more than one entity, but wherever it is used it must have the same meaning. For example, a unique identifier 'DesignCapacity' can appear on a chiller, chiller subplant, or on any of the reporting entities. However, in each case, it must represent the design capacity of production for the entity. Similar to the timeseries metadata, attribute metadata may also include a unit category identifier to indicate the category of units for the attribute (e.g. power, energy, temperature), as well as a unit commodity type identifier to refinement of the category and its units.

Metadata database 930 may store template connection/relationship rule metadata. Template connection/relationship rule metadata may be data that specifies constraints that ensure the relationships defined between equipment entities in a model are valid. There are 4 different relationships defined. One relationship defines which entities may be a child element of another entity for the asset layer. Another relationship defines how asset layer elements can be connected to other asset layer elements via nodes. An additional relationship defines which entities may be a child element of another entity for the device layer. The last relationship defines how device layer elements can be connected to other asset layer elements via nodes. Template connection/relationship rule metadata may include allowed and required children (e.g., a chiller subplant must contain at least one chiller), required siblings (e.g., a chiller subplant would require an electrical supplier and a tower subplant), and the port, cardinality, and direction for the connectivity/relationship (e.g., a chiller has a chilled water output port that can be connected to one or more cold water loads). Planning tool 905 may use the template connection/relationship rule metadata to restrict a user's actions to only operations that will result in a valid model.

Metadata database 930 may store usage metadata. Usage metadata can include usages for the optimizer, as well as usages for user interfaces. Optimizer usages may specify the window size of data for timeseries data and schedules. The user interface usages may include type of user interface data (e.g., input data, dispatch schedule, dispatch chart, graphics, etc.). A3S platform 915 may use usage metadata for optimization. Planning tool 905 may use user interface usages for presenting data.

Figure 6:
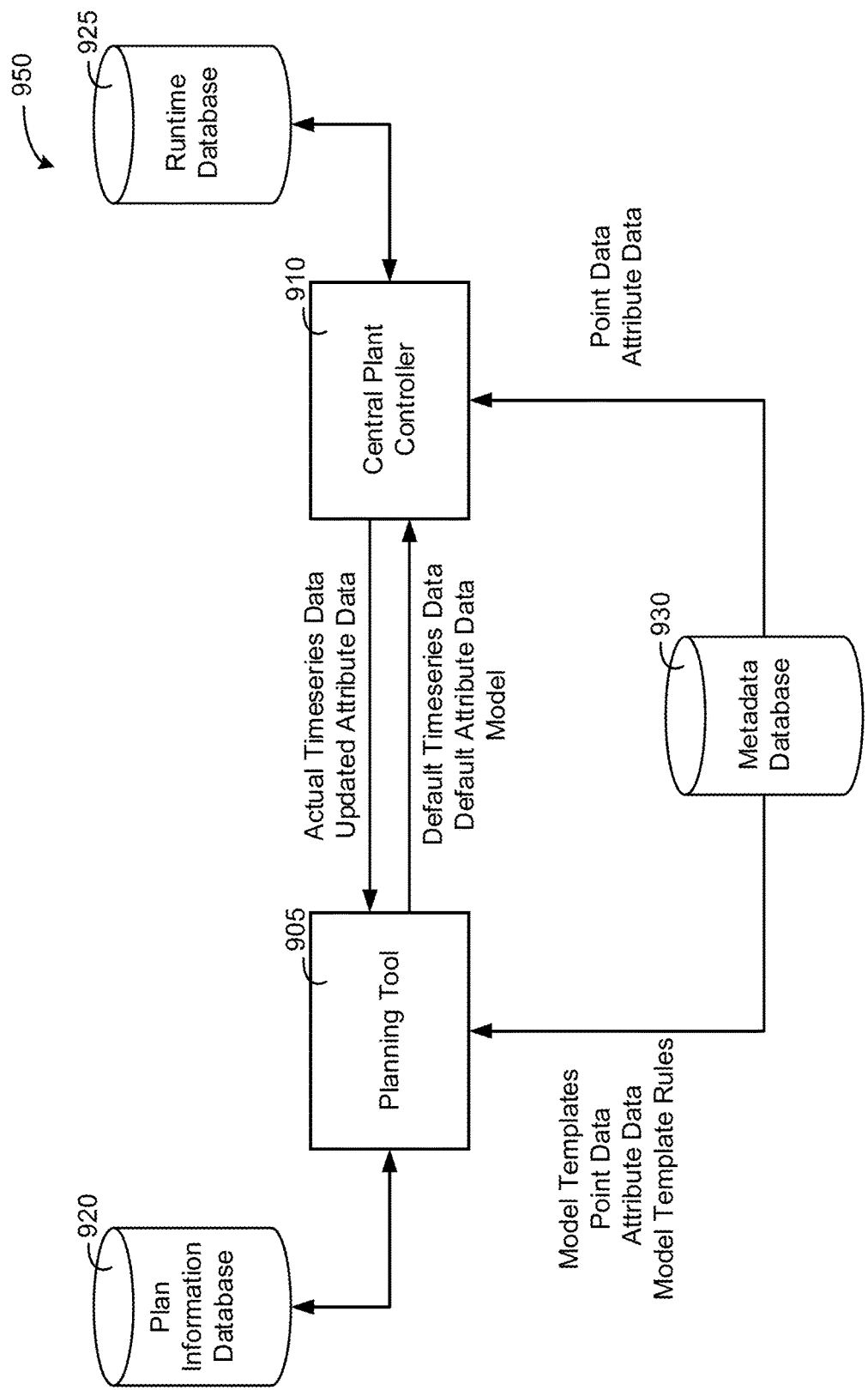
FIG. 6 is a block diagram of a system for commissioning a central plant controller, according to an exemplary embodiment.

Referring now to FIG. 6, a system 950 for commissioning a central plant controller is shown, according to an exemplary embodiment. System 950 is shown to include planning tool 905, central plant controller 910, plan information database 920, runtime database 925, and metadata database 930. When commissioning a central plant of a customer site, data may be exchanged between planning tool 905 and central plant controller 910. The process of commissioning is also discussed in process 1400 of FIG. 14.

A customer may load model data and default data (timeseries and attribute) into planning tool 905 via a user interface. Loaded data may also be provided by plan information database 920. Planning tool 905 may also extract various metadata from metadata database 930 to provide the customer with valid model options. Once the customer uploads and defines all the data, they may request the model to be optimized by A3S platform 915. The customer may view optimization results from A3S platform 915 via planning tool 905 to identify the impact of operating the plan with the optimization and other plant design changes or upgrades. If the customer decides to move forward with the optimization, the plant configuration and system performance models will need to be pushed from planning tool 905 to central plant controller 910. The final model the customer selects, along with the attribute and timeseries data that represents the customer site configuration as well as default values for loads and weather, can be exported from planning tool 905 to central plant controller 910. In some embodiments, this exporting will only take place once. Upon user request, the data may be exported to the user's disk of the client device they are operating. The format of the exported data may be the same formed used when sending the model and additional data to A3S platform 915 (e.g., JSON format). Once the data is exported to the disk, the model and data may be available for import into central plant controller 910.

When central plant controller 910 is first deployed, no customer model is available. The first step of commissioning may require a field service engineer (or other user) to import the model and the default data exported from planning tool 905 to central plant controller 910. The import can be performed via a user interface (e.g., administration user interface) of central plant controller 910. The user may be prompted to name the file and may be asked to re-authenticate per security guidelines. Once the import is complete, the server on which central plant controller 910 resides may be restarted. Once the server has restarted, central plant controller 910 will have a model and additional commissioning (e.g., mapping of point data to the BAS) can begin. Central plant controller 910 can extract metadata from metadata database 930 to commission its respective central plant. In addition, central plant controller 910 can store and retrieve data from runtime database 925.

In some embodiments, planning tool 905 may receive actual timeseries data and updated attribute data from central plant controller 910 to enable further operational analysis, performance reporting, model and verification reporting, and to evaluate future plant re-designs and upgrades. Central plant controller 910 may be live and collecting data from the BAS after the commissioning process described above is complete. In addition, central plant controller 910 may be executing the optimization process of A3S platform 915

(e.g., causing A3S platform 915 to perform the optimization process) on a scheduled or per-request basis. Central plant controller 910 can send data back to planning tool 905 for M&V (model and verification) reporting and analysis. Central plant controller 910 can push the data on a scheduled based to planning tool 905. Pushing the data may remove the need for central plant controller 910 to allow incoming data requests (for instance, a request that may not be allowed by the customer for many on premise deployments). In some embodiments, planning tool 905 may expose an endpoint (e.g., REST endpoint) that will accept data from central plant controller 910 using the format defined for data by A3S platform 915 (e.g., JSON format). Planning tool 905 can store the received data for its reporting and analysis needs. In some embodiments, the amount of data can be large so central plant controller 910 may only send data that has changed since the last data export. In some embodiments, central plant controller 910 may have the ability to retry sending the data if planning tool 905 endpoint is down or the result of pushing data to the endpoint fails.

Planning Tool

Figure 7:
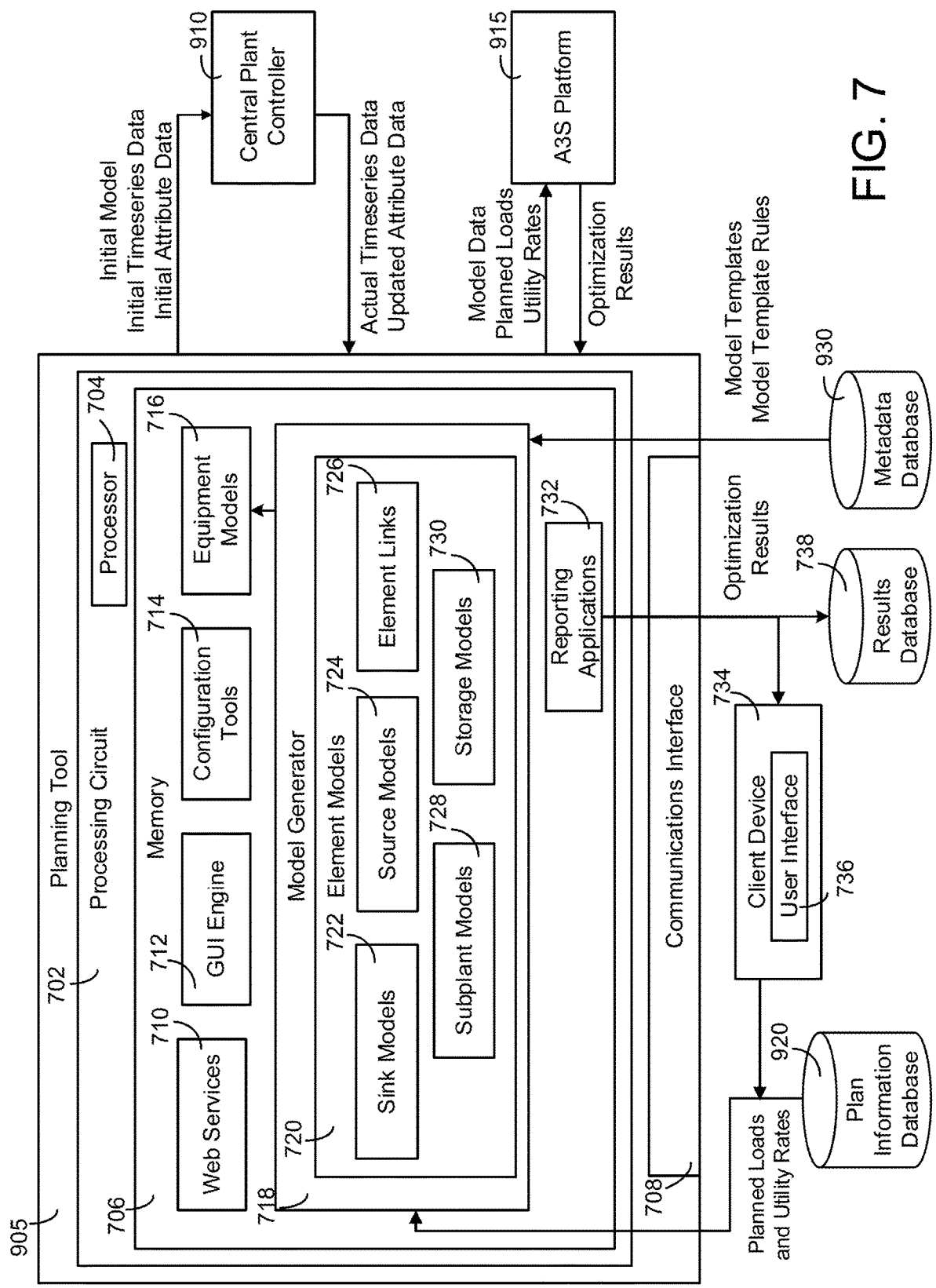
FIG. 7 is a block diagram illustrating the planning tool of FIG. 5 in greater detail, according to an exemplary embodiment.

Referring now to FIG. 7, a block diagram illustrating planning tool 905 in greater detail is shown, according to an exemplary embodiment. Planning tool 905 may be configured to interact with A3S platform 915 to simulate the operation of a central plant over a predetermined time period (e.g., a day, a month, a week, a year, etc.) for planning, budgeting, and/or design considerations. However, planning tool 905 may not be responsible for real-time control of a building management system or central plant.

Planning tool 905 can be configured to determine the benefits of investing in a central plant asset (e.g., a battery, a chiller, a heater, etc.) and the financial metrics associated with the investment. Such financial metrics can include, for example, the internal rate of return (IRR), net present value (NPV), and/or simple payback period (SPP). Planning tool 905 can also assist a user in determining the size of the battery which yields optimal financial metrics such as maximum NPV or a minimum SPP. In some embodiments, planning tool 905 allows a user to specify an asset size and automatically determines the benefits of the asset from participating in selected incentive-based demand response (IBDR) programs while performing price-based demand response (PBDR). In some embodiments, planning tool 905 is configured to determine the asset size that minimizes SPP given the IBDR programs selected and the requirement of performing PBDR. In some embodiments, planning tool 905 is configured to determine the asset size that maximizes NPV given the IBDR programs selected and the requirement of performing PBDR.

In planning tool 905, asset allocator 802 may receive planned loads and utility rates for the entire simulation period. The planned loads and utility rates may be defined by input received from a user via a client device 734 (e.g., user-defined, user selected, etc.) and/or retrieved from a plan information database 920. Planning tool 905 may send the planned loads and utility rates to A3S platform 915 to calculate an optimal resource allocation (e.g., an optimal dispatch schedule) for a portion of the simulation period. A3S platform 915 can send the optimal resource allocation for a portion of a the simulation period to planning tool 905. The portion of the simulation period may be defined by a prediction window ending at a time horizon. With each iteration of the optimization, the prediction window is shifted forward and the portion of the dispatch schedule no longer in the prediction window is accepted (e.g., stored or output as results of the simulation). Load and rate predictions may be predefined for the entire simulation and may not be subject to adjustments in each iteration. However, shifting the prediction window forward in time may introduce additional plan information (e.g., planned loads and/or utility rates) for the newly-added time slice at the end of the prediction window. The new plan information may not have a significant effect on the optimal dispatch schedule since only a small portion of the prediction window changes with each iteration.

Still referring to FIG. 7, planning tool 905 is shown to include a communications interface 708 and a processing circuit 702. Communications interface 708 may include wired or wireless interfaces (e.g., jacks, antennas, transmitters, receivers, transceivers, wire terminals, etc.) for conducting data communications with various systems, devices, or networks. For example, communications interface 708 may include an Ethernet card and port for sending and receiving data via an Ethernet-based communications network and/or a Wi-Fi transceiver for communicating via a wireless communications network. Communications interface 708 may be configured to communicate via local area networks or wide area networks (e.g., the Internet, a building WAN, etc.) and may use a variety of communications protocols (e.g., BACnet, IP, LON, etc.).

Communications interface 708 may be a network interface configured to facilitate electronic data communications between planning tool 905 and various external systems or devices (e.g., client device 734, results database 738, plan information database 920, central plant controller 910, A3S platform 915, etc.). For example, planning tool 905 may receive planned loads and utility rates from client device 734 and/or plan information database 920 via communications interface 708. Planning tool 905 may receive optimization results from A3S platform 915 via communications interface 708. Planning tool 905 may use communications interface 708 to output results of the simulation to client device 732 and/or to store the results in results database 738.

Still referring to FIG. 7, processing circuit 702 is shown to include a processor 704 and memory 706. Processor 704 may be a general purpose or specific purpose processor, an application specific integrated circuit (ASIC), one or more field programmable gate arrays (FPGAs), a group of processing components, or other suitable processing components. Processor 704 may be configured to execute computer code or instructions stored in memory 706 or received from other computer readable media (e.g., CDROM, network storage, a remote server, etc.).

Memory 706 may include one or more devices (e.g., memory units, memory devices, storage devices, etc.) for storing data and/or computer code for completing and/or facilitating the various processes described in the present disclosure. Memory 706 may include random access memory (RAM), read-only memory (ROM), hard drive storage, temporary storage, non-volatile memory, flash memory, optical memory, or any other suitable memory for storing software objects and/or computer instructions. Memory 706 may include database components, object code components, script components, or any other type of information structure for supporting the various activities and information structures described in the present disclosure. Memory 706 may be communicably connected to processor 704 via processing circuit 702 and may include computer code for executing (e.g., by processor 704) one or more processes described herein.

Still referring to FIG. 7, memory 706 is shown to include a GUI engine 712, web services 710, and configuration tools 714. In an exemplary embodiment, GUI engine 712 includes a graphical user interface component configured to provide graphical user interfaces to a user for selecting or defining plan information for the simulation (e.g., planned loads, utility rates, environmental conditions, etc.). Web services 710 may allow a user to interact with planning tool 905 via a web portal and/or from a remote system or device (e.g., an enterprise control application).

Configuration tools 714 can allow a user to define (e.g., via graphical user interfaces, via prompt-driven "wizards," etc.) various parameters of the simulation such as the number and type of subplants, the devices within each subplant, the subplant curves, device-specific efficiency curves, the duration of the simulation, the duration of the prediction window, the duration of each time step, and/or various other types of plan information related to the simulation. Configuration tools 714 can present user interfaces for building the simulation. The user interfaces may allow users to define simulation parameters graphically. In some embodiments, the user interfaces allow a user to select a pre-stored or pre-constructed simulated plant and/or plan information (e.g., from plan information database 920) and adapt it or enable it for use in the simulation.

Still referring to FIG. 7, memory 706 is shown to include model generator 718. Model generator 718 may generate element models 720. Model generator 718 may use inputs from plan information database 920 and/or user input via client device 734 to generate element models 720. Model generator 718 may store the generated models in equipment models 716. The various element models that model generator 718 can generate are described in greater detail below.

Figure 8:
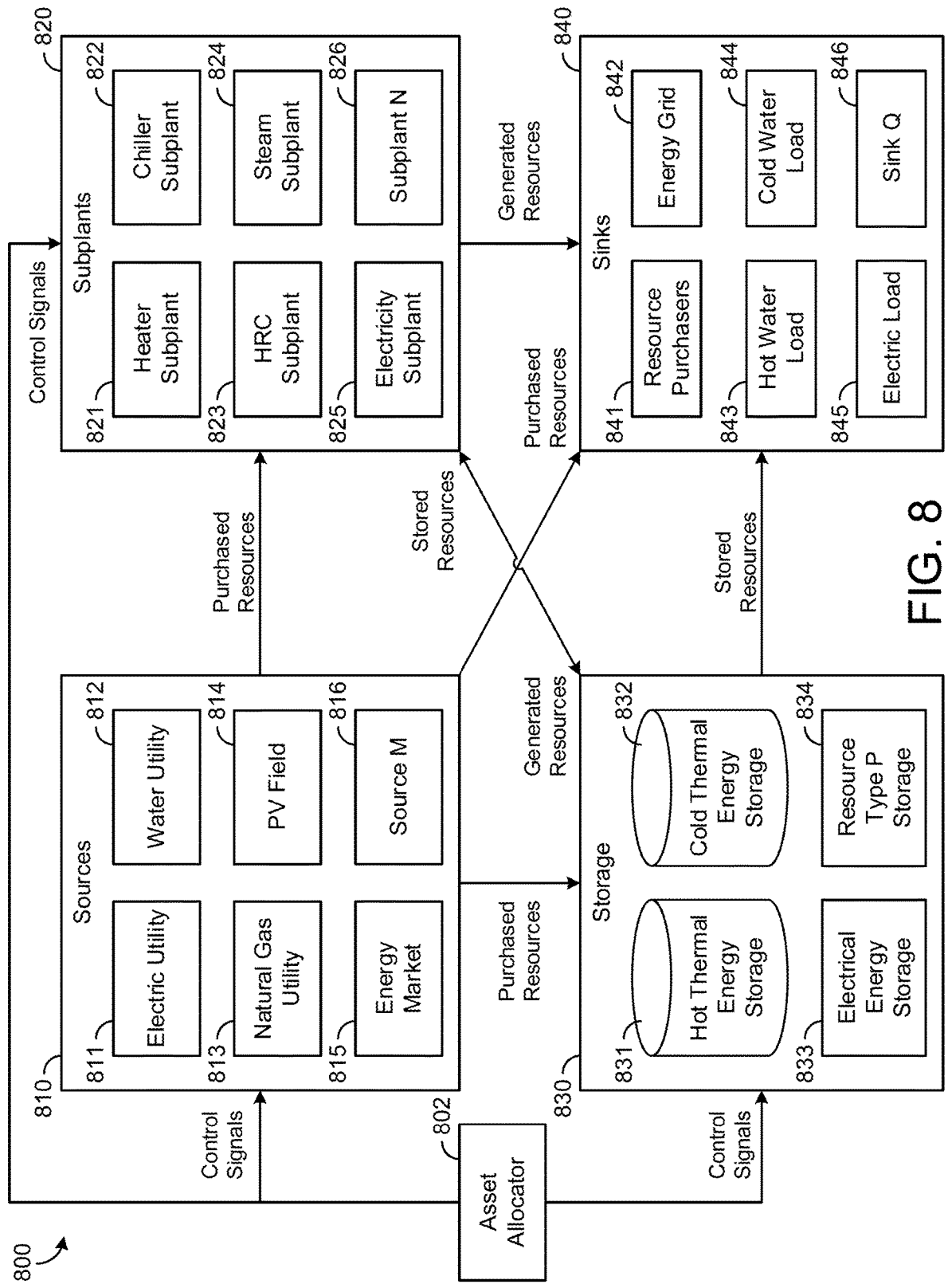
FIG. 8 is a block diagram of an asset allocation system including sources, subplants, storage, sinks, and an asset allocator configured to optimize the allocation of these assets, according to an exemplary embodiment.

Referring now to FIG. 7 and FIG. 8, planning tool 905 is shown to include element models 720. Element models 720 may store definitions and/or models for various elements of the high level optimization problem. For example, element models 720 are shown to include sink models 722, source models 724, subplant models 728, storage models 730, and element links 726. In some embodiments, element models 720 include data objects that define various attributes or properties of components of the central plant or other modeled components, shown in FIG. 8 as sinks 840, sources 810, subplants 820, and storage 830 (e.g., using object-oriented programming).

For example, source models 724 may define the type of resource provided by each of sources 810, a cost of each resource, demand charges associated with the consumption of the resource, a maximum rate at which the resource can be purchased from each of sources 810, and other attributes of sources 810. Similarly, subplant models 728 may define the input resources of each subplant 820, the output resources of each subplant 820, relationships between the input and output variables of each subplant 820 (e.g., the operational domain of each subplant 820), and optimization constraints associated with each of subplants 820. Each of element models 720 are described in greater detail below.

Element models 720 are shown to include sink models 722. Sink models 722 may store models for each of sinks 840. As described above, sinks 840 may include resource consumers or requested loads. Some examples are the campus thermal loads and campus electricity usage. The predicted consumption of a sink 840 over the optimization period can be supplied as an input to planning tool 905 and/or computed by load/rate predictor 1018 (shown in FIG. 10). Sink models 722 may store the predicted consumption over the optimization period for each of sinks 840. Sink models 722 may also store any unmet/overmet load for each of sinks 840, carryover from the previous time steps, and any incentives earned by supplying each of sinks 840 (e.g., for sinks such as an energy purchasers or an energy grid).

Carryover can be defined as the amount of unmet or overmet load for a particular resource from the previous time step. In some embodiments, a component of A3S platform 915 (shown in FIG. 8 as asset allocator 802) determines the carryover by adding the entire unmet load for a particular resource in one time step to the requested load for the resource at the next time step. However, calculating the carryover in this manner may not always be appropriate since the carryover may grow over time. As an example, consider an unmet chilled water load. If there are several time steps where the chilled water load is not met, the buildings supplied by the load will heat up. Due to this increase in building temperature, the amount of chilled water load required to decrease the building temperature to the set-point is not a linearly increasing function of the sum of the unmet load over the past time steps because the building temperature will begin approaching the ambient temperature.

In some embodiments, asset allocator 802 adds a forgetting factor to the carryover. For example, asset allocator 802 can calculate the carryover for each time step using the following equation:

$$\text{carryover}_{j+1} = \gamma_j \cdot \text{unmet/overmet}_j$$

where unmet/overmet$_j$ is the amount of unmet and/or overmet load at time step j, carryover$_{j+1}$ is the carryover added to the right-hand side of the inventory balance at the next time step j+1, and $\gamma_j \in [0,1]$ is the forgetting factor. Selecting $\gamma_j=0$ corresponds to case where no unmet/overmet load is carried over to the next time step, whereas selecting $\gamma_j=1$ corresponds to case where all unmet/overmet load is carried over to the next time step. An intermediate selection of $\gamma_j$ (e.g., $0 \leq \gamma_j \leq 1$) corresponds to the case where some, but not all, of the unmet/overmet load is carried over. For the case of a chilled water system, the choice of $\gamma_j$ may depend on the plant itself and can be determined using the amount of unmet load that actually stored in the water (temperature would increase above the setpoint) when an unmet load occurs.

Still referring to FIG. 7, element models 720 are shown to include source models 724. Source models 724 may store models for each of sources 810. As described above, sources 810 may include utilities or markets where resources may be purchased. Source models 724 may store a price per unit of a resource purchased from each of sources 810 (e.g., $/kWh of electricity, $/liter of water, etc.). This cost can be included as a direct cost associated with resource usage in the cost function. In some embodiments, source models 724 store costs associated with demand charges and demand constraints, incentive programs (e.g., frequency response and economic demand response) and/or sell back programs for one or more of sources 810.

In some embodiments, the cost function J(x) includes a demand charge based on peak electrical usage during a demand charge period (e.g., during a month). This demand charge may be based on the maximum rate of electricity usage at any time in the demand charge period. There are several other types of demand charges besides the anytime monthly demand charge for electricity including, for example, time-of-day monthly and yearlong ratchets. Some or all of these demand charges can be added to the cost function depending on the particular types of demand charges imposed by sources 810. In some embodiments, demand charges are defined as follows:

$$wc \max_{i \in T_{demand}} \{x_i\}$$

where $x_i$ represents the resource purchase at time step i of the optimization period, c>0 is the demand charge rate, w is a (potentially time-varying) weight applied to the demand charge term to address any discrepancies between the optimization period and the time window over which the demand charge is applied, and $T_{demand} \subseteq \{1, \ldots, h\}$ is the subinterval of the optimization period to which the demand charge is applied. Source models 724 can store values for some or all of the parameters that define the demand charges and the demand charge periods.

In some embodiments, asset allocator 802 accounts for demand charges within a linear programming framework by introducing an auxiliary continuous variable. This technique is described in greater detail with reference to demand charge module 1206. While this type of term may readily be cast into a linear programming framework, it can be difficult to determine the weighting coefficient w when the demand charge period is different from the optimization period. Nevertheless, through a judicious choice of the two adjustable parameters for demand charges (e.g., the weighting coefficient w and the initial value of the auxiliary demand variable), other types of demand charges may be included in the high level optimization problem.

In some embodiments, source models 724 store parameters of various incentive programs offered by sources 810. For example, the source definition for an electric utility may define a capability clearing price, a performance clearing price, a regulation award, or other parameters that define the benefits (e.g., potential revenue) of participating in a frequency regulation program. In some embodiments, source models 724 define a decision variable in the optimization problem that accounts for the capacity of a battery reserved for frequency regulation. This variable effectively reduces the capacity of the battery that is available for priced-based demand response. Depending on the complexity of the decision, source models 724 may also define a decision variable that indicates whether to participate in the incentive program. In asset allocator 802, storage capacity may be reserved for participation in incentive programs. Asset allocator 802 can operate within A3S platform 915 to control the reserved capacity that is charged/discharged for the incentive program (e.g., frequency response control).

In some embodiments, source models 724 store pricing information for the resources sold by sources 810. The pricing information can include time-varying pricing information, progressive or regressive resource prices (e.g., prices that depend on the amount of the resource purchased), or other types of pricing structures. Progressive and regressive resource prices may readily be incorporated into the optimization problem by leveraging the set of computational operations introduced by the operational domain. In the case of either a progressive rate that is a discontinuous function of the usage or for any regressive rate, additional binary variables can be introduced into the optimization problem to properly describe both of these rates. For progressive rates that are continuous functions of the usage, no binary variables are needed because one may apply a similar technique as that used for imposing demand charges.

Referring again to FIG. 7, element models 720 are shown to include subplant models 728. Subplant models 728 may store models for each of subplants 820. As discussed above, subplants 820 are the main assets of a central plant. Subplants 820 can be configured to convert resource types, making it possible to balance requested loads from the building or campus using resources purchased from sources 810. This general definition allows for a diverse set of central plant configurations and equipment types as well as varying degrees of subplant modeling fidelity and resolution.

In some embodiments, subplant models 728 identify each of subplants 820 as well as the optimization variables associated with each subplant. The optimization variables of a subplant can include the resources consumed, the resources produced, intrinsic variables, and extrinsic variables. Intrinsic variables may be internal to the optimization formulation and can include any auxiliary variables used to formulate the optimization problem. Extrinsic variables may be variables that are shared among subplants (e.g., condenser water temperature).

In some embodiments, subplant models 728 describe the relationships between the optimization variables of each subplant. For example, subplant models 728 can include subplant curves that define the output resource production of a subplant as a function of one or more input resources provided to the subplant. In some embodiments, operational domains are used to describe the relationship between the subplant variables. Mathematically, an operational domain is a union of a collection of polytopes in an n-dimensional (real) space that describe the admissible set of variables of a high level element. Operational domains are described in greater detail below.

In some embodiments, subplant models 728 store subplant constraints for each of subplants 820. Subplant constraints may be written in the following general form:

$$A_{x,j}x_j + A_{z,j}z_j \leq b_j$$

$$H_{x,j}x_j + H_{z,j}z_j = g_j$$

$$x_{lb,j} \leq x_j \leq x_{ub,j}$$

$$z_{lb,j} \leq z_j \leq z_{ub,j}$$

$$z_j = \text{integer}$$

for all j where j is an index representing the jth subplant, $x_j$ denotes the continuous variables associated with the jth subplant (e.g., resource variables and auxiliary optimization variables), and $z_j$ denotes the integer variables associated with the jth subplant (e.g., auxiliary binary optimization variables). The vectors $x_{lb,j}$, $x_{ub,j}$, $z_{lb,j}$, and $z_{ub,j}$ represent the box (bound) constraints on the decision variables. The matrices $A_{x,j}$, $A_{z,j}$, $H_{x,j}$, and $H_{z,j}$ and the vectors $b_j$ and $g_j$ are associated with the inequality constraints and the equality constraints for the jth subplant.

In some embodiments, subplant models 728 store the input data used to generate the subplant constraints. Such input data may include sampled data points of the high level subplant curve/operational domain. When implemented as part of an online operational tool (shown in FIG. 10 as central plant controller 910), the high level subplant operational domain can be sampled at several requested production amounts. When implemented as part of an offline planning tool (as shown here), the sampled data may be user-specified efficiency and capacity data.

Referring again to FIG. 7, element models 720 are shown to include storage models 730. Storage models 730 may store models for each of storage 830. Storage models 730 can define the types of resources stored by each of storage 830, as well as storage constraints that limit the state-of-charge (e.g., maximum charge level) and/or the rates at which each storage 830 can be charged or discharged. In some embodiments, the current level or capacity of storage 830 is quantified by the state-of-charge (SOC), which can be denoted by $\phi$ where $\phi=0$ corresponds to empty and $\phi=1$ corresponds to full. To describe the SOC as a function of the charge rate or discharge rate, a dynamic model can be stored as part of storage models 730. The dynamic model may have the form:

$$\phi(k+1)=A\phi(k)+Bu(k)$$

where $\phi(k)$ is the predicted state of charge at time step k of the optimization period, u(k) is the charge/discharge rate at time step k, and A and B are coefficients that account for dissipation of energy from storage 830. In some embodiments, A and B are time-varying coefficients. Accordingly, the dynamic model may have the form:

$$\phi(k+1)=A(k)\phi(k)+B(k)u(k)$$

where A(k) and B(k) are coefficients that vary as a function of the time step k.

Asset allocator 802 can be configured to add constraints based on the operational domain of storage 830. In some embodiments, the constraints link decision variables adjacent in time as defined by the dynamic model. For example, the constraints may link the decision variables $\phi(k+1)$ at time step k+1 to the decision variables $\phi(k)$ and u(k) at time step k. In some embodiments, the constraints link the SOC of storage 830 to the charge/discharge rate. Some or all of these constraints may be defined by the dynamic model and may depend on the operational domain of storage 830.

In some embodiments, storage models 730 store optimization constraints for each of storage 830. Storage constraints may be written in the following general form:

$$A_{x,k}x_k+A_{z,k}z_k \leq b_k$$

$$H_{x,k}x_k+H_{z,k}z_k = g_k$$

$$x_{lb,k} \leq x_k \leq x_{ub,k}$$

$$z_{lb,k} \leq z_k \leq z_{ub,k}$$

$$z_k = \text{integer}$$

for all k where k is an index representing the kth storage device, $x_k$ denotes the continuous variables associated with the kth storage device (e.g., resource variables and auxiliary optimization variables), and $z_k$ denotes the integer variables associated with the kth storage device (e.g., auxiliary binary optimization variables). The vectors $x_{lb,k}$, $x_{ub,k}$, $z_{lb,k}$, and $z_{ub,k}$ represent the box (bound) constraints on the decision variables. The matrices $A_{x,k}$, $A_{z,k}$, $H_{x,k}$, and $H_{z,k}$ and the vectors $b_k$ and $g_k$ are associated with the inequality constraints and the equality constraints for the kth storage device.

The optimization constraints may ensure that the predicted SOC for each of storage 830 is maintained between a minimum SOC $Q_{min}$ and a maximum SOC $Q_{max}$. The optimization constraints may also ensure that the charge/discharge rate is maintained between a minimum charge rate $\dot{Q}_{min}$ and maximum charge rate $\dot{Q}_{max}$. In some embodiments, the optimization constraints include terminal constraints imposed on the SOC at the end of the optimization period. For example, the optimization constraints can ensure that one or more of storage 830 are full at the end of the optimization period (e.g., "tank forced full" constraints).

In some embodiments, storage models 730 store mixed constraints for each of storage 830. Mixed constraints may be needed in the case that the operational domain of storage 830 is similar to that shown in FIG. 11. In a thermal energy storage tank, the constraints on the discharge rate at low SOCs may be due to mixing between layers of the tank. For TES subplants 831-832 and the TES tanks that form TES subplants 831-832, the SOC represents the fraction of the current tank level or:

$$\phi = \frac{Q - Q_{min}}{Q_{max} - Q_{min}}$$

where Q is the current tank level, $Q_{min}$ is the minimum tank level, $Q_{max}$ is the maximum tank level, and $\phi \in [0,1]$ is the SOC. Since the maximum rate of discharge or charge may depend on the SOC at low or high SOC, SOC dependent bounds on the maximum rate of discharge or charge may be included.

In some embodiments, storage models 730 store SOC models for each of storage 830. The SOC model for a thermal energy storage tank may be an integrator model given by:

$$\phi(k+1) = \phi(k) - \delta t_s \frac{\dot{Q}(k)}{Q_{max} - Q_{min}}$$

where $\dot{Q}(k)$ is the charge/discharge rate and $\delta t_s$. Positive values of $\dot{Q}(k)$ represent discharging, whereas negative values of $\dot{Q}(k)$ represent charging. The mixed constraints now shown in FIG. 11 can be accounted for as follows:

$$a_{mixed}\phi(k)+b_{mixed}\dot{Q}(k)$$

$$0 \leq \phi(k) \leq 1$$

$$-\dot{Q}_{charge,max} \leq \dot{Q}(k) \leq \dot{Q}_{discharge,max}$$

where $a_{mixed}$ and $b_{mixed}$ are vectors of the same dimension that describe any mixed linear inequality constraints (e.g., constraints that depend on both the SOC and the discharge/charge rate). The second constraint (e.g., $0 \leq \phi(k) \leq 1$) is the constraint on the SOC. The last constraint limits the rate of charging and discharging within bound.

In some embodiments, storage models 730 include models that treat the air within the building and/or the building mass as a form of energy storage. However, one of the key differentiators between an airside mass and storage 830 is that additional care must be taken to ensure feasibility of the optimization problem (e.g., soft constraining of the state constraints). Nevertheless, airside optimization units share many common features and mathematical operations as storage 830. In some embodiments, a state-space representation of airside dynamics can be used to describe the predicted evolution of airside optimization units (e.g., building mass). Such a model may have the form:

$$x(k+1)=Ax(k)+Bu(k)$$

where x(k) is the airside optimization unit state vector, u(k) is the airside optimization unit input vector, and A and B are the system matrices. In general, an airside optimization unit or the control volume that the dynamic model describes may represent a region (e.g., multiple HVAC zones served by the same air handling unit) or an aggregate of several regions (e.g., an entire building).

Still referring to FIG. 7, element models 720 are shown to include element links 726. In some embodiments, element links 726 define the connections between sources 810, subplants 820, storage 830, and sinks 840. These links 940 are shown as lines connecting various elements in plant resource diagrams 500 and 550. For example, element links 726 may define which of sources 810 provide resources to each of subplants 820, which subplants 820 are connected to which storage 830, and which subplants 820 and/or storage 830 provide resources to each of sinks 840. Element links 726 may contain the data and methods needed to create and solve an instance of the high level optimization problem.

In some embodiments, element links 726 link sources 810, subplants 820, storage 830, and sinks 840 (e.g., the high level problem elements) using a netlist of connections between high level problem elements. The information provided by element links 726 may allow multiple subplants 820, storage 830, sinks 840, and sources of the same type to be defined. Rather than assuming that all elements contribute to and draw from a common pool of each resource, element links 726 can be used to specify the particular connections between elements. Accordingly, multiple resources of the same type can be defined such that a first subset of subplants 820 produce a first resource of a given type (e.g., Chilled Water A), whereas a second subset of subplants 820 produce a second resource of the same type (e.g., Chilled Water B). Such a configuration is shown in FIG. 9B. Advantageously, element links 726 can be used to build constraints that reflect the actual physical connections between equipment in a central plant.

In some embodiments, element links 726 are used to account for the distribution costs of resources between elements of asset allocation system 800 (e.g., from sources 810 to subplants 820, from subplants 820 to sinks 840, etc.) and/or the distribution efficiency of each connection. In some cases it may be necessary to include costs for delivering the resource along a connection, or an efficiency of the transportation (amount or percentage of resources received on the other side of the connection). Accounting for distribution costs and/or distribution efficiency may affect the result of the optimization in some situations. For example, consider a first chiller subplant 820 that is highly efficient and can provide a chilled water resource to sinks 840, but it costs significantly more (e.g., due to pumping costs etc.) to transport the resource from the first chiller subplant 820 rather than from a second chiller subplant 820. In that scenario, asset allocator 802 may determine that the first chiller subplant 820 should be used only if necessary. Additionally, energy could be lost during transportation along a particular connection (e.g., chilled water temperature may increase over a long pipe). This could be described as an efficiency of the connection.

The resource balance constraint can be modified to account for distribution efficiency as follows:

$$\sum_{sources} \alpha_{source, resource} purchase_{resource, time} +$$

$$\sum_{subplants} \alpha_{subplant, resource} \text{produces}(x_{internal, time},$$

$$x_{external, time}, v_{uncontrolled, time}) - \sum_{subplants} \frac{1}{\alpha_{source, resource}}$$

$$\text{consumes}(x_{internal, time}, x_{external, time}, v_{uncontrolled, time}) +$$

$$\sum_{storages} discharges_{resource}(x_{internal, time}, x_{external, time}) -$$

-continued $$\frac{1}{\alpha_{sink, resource}} \sum_{sinks} requests_{resource} = 0$$

∀ resources, ∀ time ∈ horizon where the α terms are loss factors with values between zero and one.

The cost function can be modified to account for transportation costs as follows:

$$J(x) = \sum_{sources} \sum_{horizon} \text{cost}(purchase_{resource, time}, time) +$$

$$\ldots + \sum_{connection} \lambda_{connection} resource_{connection}$$

where $\lambda_{connection}$ is the cost per unit resource transported along a particular connection and $resource_{connection}$ is the amount of the resource transported along the connection. Accordingly, the final term of the cost function accounts for transportation costs along each of the connections or links between elements in asset allocation system 800.

Still referring to FIG. 7, planning tool 905 may send the model data (e.g., sink models 722, source models 724, etc.) along with the planned loads and utility rates to A3S platform 915. A3S platform 915 may perform the optimization for the resources and return the optimization results to the planning tool 905. Planning tool 905 may save the optimization results in the results database 738, or may present them on a client device 734 via a user interface 736.

Figure 13:
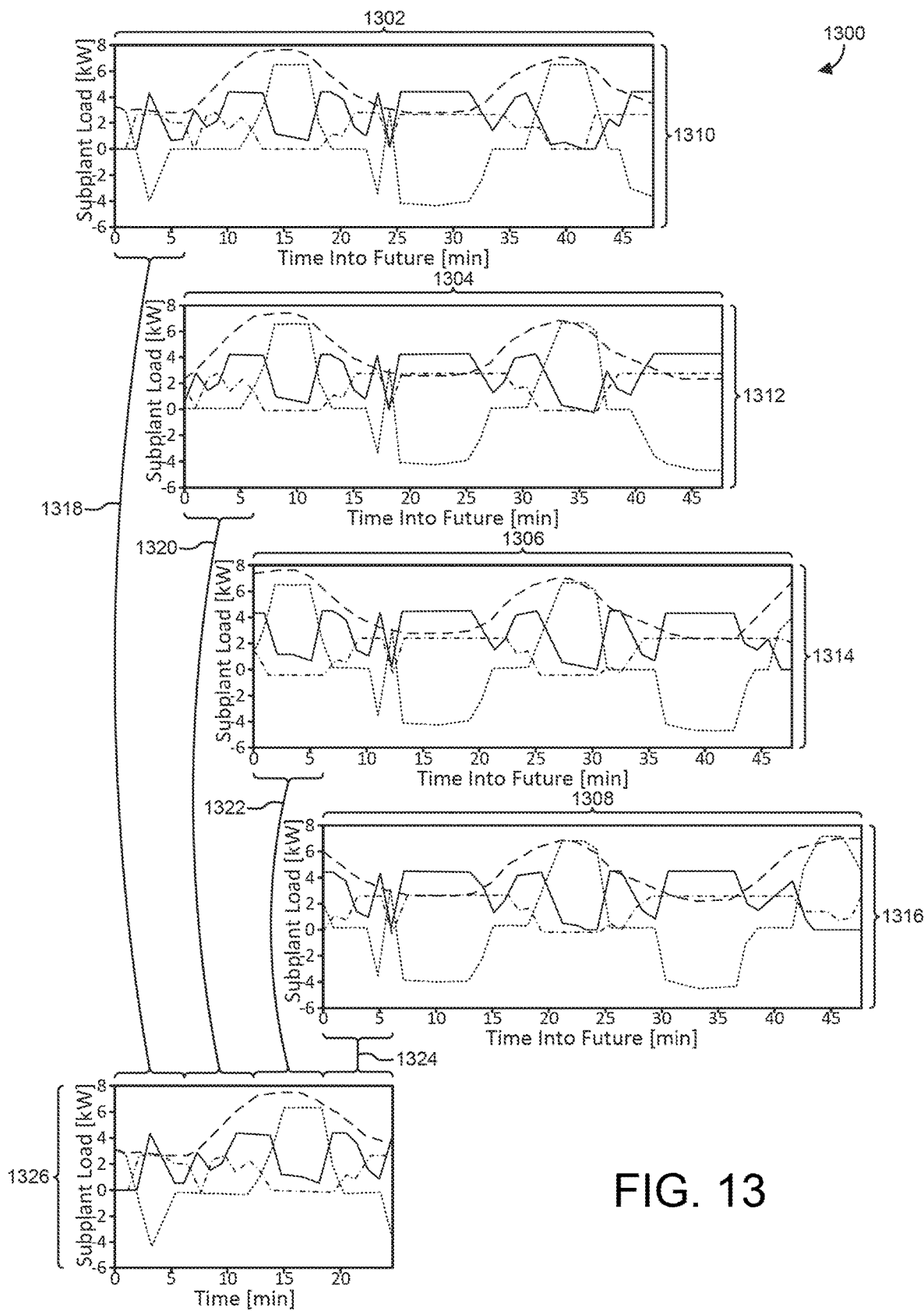
FIG. 13 is a flow diagram illustrating an optimization process which can be performed by the asset allocator of FIG. 12, according to an exemplary embodiment.

Still referring to FIG. 7, memory 706 is shown to include reporting applications 732. Reporting applications 732 may receive the optimized resource allocations from A3S platform 915 and, in some embodiments, costs associated with the optimized resource allocations. Reporting applications 732 may present the applied resource allocation to a client device 734 (e.g., via user interface 736) or storage in results database 738. Reporting applications 732 may include a web-based reporting application with several graphical user interface (GUI) elements (e.g., widgets, dashboard controls, windows, etc.) for displaying key performance indicators (KPI) or other information to users of a GUI. In addition, the GUI elements may summarize relative energy use and intensity across various plants, subplants, or the like. Other GUI elements or reports may be generated and shown based on available data that allow users to assess the results of the simulation. The user interface or report (or underlying data engine) may be configured to aggregate and categorize resource allocation and the costs associated therewith and provide the results to a user via a GUI. The GUI elements may include charts or histograms that allow the user to visually analyze the results of the simulation. An exemplary output that may be generated by reporting applications 732 is shown in FIG. 13.

Planning tool 905 may send an initial model and initial timeseries and attribute data to central plant controller 910. The initial model and data may be provided by plan information database 920 and/or a user via a client device 734. In some embodiments, planning tool 905 may receive actual timeseries data and updated attribute data from central plant controller 910.

Asset Allocation System

Referring now to FIG. 8, a block diagram of an asset allocation system 800 is shown, according to an exemplary embodiment. Asset allocation system 800 can be configured to manage energy assets such as central plant equipment, battery storage, and other types of equipment configured to serve the energy loads of a building. Asset allocation system 800 can determine an optimal distribution of heating, cooling, electricity, and energy loads across different subplants (e.g., equipment groups) capable of producing that type of energy. In some embodiments, asset allocation system 800 can be implemented as a component of a planning tool (described with reference to FIG. 7) and can be configured to simulate the operation of a central plant over a predetermined time period for planning, budgeting, and/or design considerations. In other embodiments, asset allocation system 800 is implemented as a component of central plant 200 and interacts with the equipment of central plant 200 in an online operational environment (e.g., performing real-time control of the central plant equipment). In some embodiments, some portions of asset allocation system 800 (e.g., asset allocator 802) may be implemented as components of A3S platform 915.

Asset allocation system 800 is shown to include sources 810, subplants 820, storage 830, and sinks 840. These four categories of objects define the assets of a central plant and their interaction with the outside world. Sources 810 may include commodity markets or other suppliers from which resources such as electricity, water, natural gas, and other resources can be purchased or obtained. Sources 810 may provide resources that can be used by asset allocation system 4800 to satisfy the demand of a building or campus. For example, sources 810 are shown to include an electric utility 811, a water utility 812, a natural gas utility 813, a photovoltaic (PV) field (e.g., a collection of solar panels), an energy market 815, and source M 816, where M is the total number of sources 810. Resources purchased from sources 810 can be used by subplants 820 to produce generated resources (e.g., hot water, cold water, electricity, steam, etc.), stored in storage 830 for later use, or provided directly to sinks 840.

Subplants 820 are the main assets of a central plant. Subplants 820 are shown to include a heater subplant 821, a chiller subplant 822, a heat recovery chiller subplant 823, a steam subplant 824, an electricity subplant 825, and subplant N, where N is the total number of subplants 820. In some embodiments, subplants 820 include some or all of the subplants of central plant 200, as described with reference to FIG. 2. For example, subplants 820 can include heater subplant 202, heat recovery chiller subplant 204, chiller subplant 206, and/or cooling tower subplant 208.

Subplants 820 can be configured to convert resource types, making it possible to balance requested loads from the building or campus using resources purchased from sources 810. For example, heater subplant 821 may be configured to generate hot thermal energy (e.g., hot water) by heating water using electricity or natural gas. Chiller subplant 822 may be configured to generate cold thermal energy (e.g., cold water) by chilling water using electricity. Heat recovery chiller subplant 823 may be configured to generate hot thermal energy and cold thermal energy by removing heat from one water supply and adding the heat to another water supply. Steam subplant 824 may be configured to generate steam by boiling water using electricity or natural gas. Electricity subplant 825 may be configured to generate electricity using mechanical generators (e.g., a steam turbine, a gas-powered generator, etc.) or other types of electricity-generating equipment (e.g., photovoltaic equipment, hydroelectric equipment, etc.).

The input resources used by subplants 820 may be provided by sources 810, retrieved from storage 830, and/or generated by other subplants 820. For example, steam subplant 824 may produce steam as an output resource. Electricity subplant 825 may include a steam turbine that uses the steam generated by steam subplant 824 as an input resource to generate electricity. The output resources produced by subplants 820 may be stored in storage 830, provided to sinks 840, and/or used by other subplants 820. For example, the electricity generated by electricity subplant 825 may be stored in electrical energy storage 833, used by chiller subplant 822 to generate cold thermal energy, used to satisfy the electric load 845 of a building, or sold to resource purchasers 841.

Storage 830 can be configured to store energy or other types of resources for later use. Each type of storage within storage 830 may be configured to store a different type of resource. For example, storage 830 is shown to include hot thermal energy storage 831 (e.g., one or more hot water storage tanks), cold thermal energy storage 832 (e.g., one or more cold thermal energy storage tanks), electrical energy storage 833 (e.g., one or more batteries), and resource type P storage 834, where P is the total number of storage 830. In some embodiments, storage 830 include some or all of the storage of central plant 200, as described with reference to FIG. 2. In some embodiments, storage 830 includes the heat capacity of the building served by the central plant. The resources stored in storage 830 may be purchased directly from sources or generated by subplants 820.

In some embodiments, storage 830 is used by asset allocation system 800 to take advantage of price-based demand response (PBDR) programs. PBDR programs encourage consumers to reduce consumption when generation, transmission, and distribution costs are high. PBDR programs are typically implemented (e.g., by sources 810) in the form of energy prices that vary as a function of time. For example, some utilities may increase the price per unit of electricity during peak usage hours to encourage customers to reduce electricity consumption during peak times. Some utilities also charge consumers a separate demand charge based on the maximum rate of electricity consumption at any time during a predetermined demand charge period.

Advantageously, storing energy and other types of resources in storage 830 allows for the resources to be purchased at times when the resources are relatively less expensive (e.g., during non-peak electricity hours) and stored for use at times when the resources are relatively more expensive (e.g., during peak electricity hours). Storing resources in storage 830 also allows the resource demand of the building or campus to be shifted in time. For example, resources can be purchased from sources 810 at times when the demand for heating or cooling is low and immediately converted into hot or cold thermal energy by subplants 820. The thermal energy can be stored in storage 830 and retrieved at times when the demand for heating or cooling is high. This allows asset allocation system 800 to smooth the resource demand of the building or campus and reduces the maximum required capacity of subplants 820. Smoothing the demand also asset allocation system 800 to reduce the peak electricity consumption, which results in a lower demand charge.

In some embodiments, storage 830 is used by asset allocation system 800 to take advantage of incentive-based demand response (IBDR) programs. IBDR programs provide incentives to customers who have the capability to store energy, generate energy, or curtail energy usage upon request. Incentives are typically provided in the form of monetary revenue paid by sources 810 or by an independent service operator (ISO). IBDR programs supplement traditional utility-owned generation, transmission, and distribution assets with additional options for modifying demand load curves. For example, stored energy can be sold to resource purchasers 841 or an energy grid 842 to supplement the energy generated by sources 810. In some instances, incentives for participating in an IBDR program vary based on how quickly a system can respond to a request to change power output/consumption. Faster responses may be compensated at a higher level. Advantageously, electrical energy storage 833 allows system 800 to quickly respond to a request for electric power by rapidly discharging stored electrical energy to energy grid 842.

Sinks 840 may include the requested loads of a building or campus as well as other types of resource consumers. For example, sinks 840 are shown to include resource purchasers 841, an energy grid 842, a hot water load 843, a cold water load 844, an electric load 845, and sink Q, where Q is the total number of sinks 840. A building may consume various resources including, for example, hot thermal energy (e.g., hot water), cold thermal energy (e.g., cold water), and/or electrical energy. In some embodiments, the resources are consumed by equipment or subsystems within the building (e.g., HVAC equipment, lighting, computers and other electronics, etc.). The consumption of each sink 840 over the optimization period can be supplied as an input to asset allocation system 800 or predicted by asset allocation system 800. Sinks 840 can receive resources directly from sources 810, from subplants 820, and/or from storage 830.

Still referring to FIG. 8, asset allocation system 800 is shown to include an asset allocator 802. Asset allocator 802 may be configured to control the distribution, production, storage, and usage of resources in asset allocation system 800. In some embodiments, asset allocator 802 performs an optimization process determine an optimal set of control decisions for each time step within an optimization period. The control decisions may include, for example, an optimal amount of each resource to purchase from sources 810, an optimal amount of each resource to produce or convert using subplants 820, an optimal amount of each resource to store or remove from storage 830, an optimal amount of each resource to sell to resources purchasers 841 or energy grid 840, and/or an optimal amount of each resource to provide to other sinks 840. In some embodiments, the control decisions include an optimal amount of each input resource and output resource for each of subplants 820.

In some embodiments, asset allocator 802 is configured to optimally dispatch all campus energy assets in order to meet the requested heating, cooling, and electrical loads of the campus for each time step within an optimization horizon or optimization period of duration h. Instead of focusing on only the typical HVAC energy loads, the concept is extended to the concept of resource. Throughout this disclosure, the term "resource" is used to describe any type of commodity purchased from sources 810, used or produced by subplants 820, stored or discharged by storage 830, or consumed by sinks 840. For example, water may be considered a resource that is consumed by chillers, heaters, or cooling towers during operation. This general concept of a resource can be extended to chemical processing plants where one of the resources is the product that is being produced by the chemical processing plat.

Asset allocator 802 can be configured to operate the equipment of asset allocation system 800 to ensure that a resource balance is maintained at each time step of the optimization period. This resource balance is shown in the following equation:

$$\Sigma x_{time} = 0 \forall \text{ resources}, \forall \text{ time} \in \text{horizon}$$

where the sum is taken over all producers and consumers of a given resource (e.g., all of sources 810, subplants 820, storage 830, and sinks 840) and time is the time index. Each time element represents a period of time during which the resource productions, requests, purchases, etc. are assumed constant. Asset allocator 802 may ensure that this equation is satisfied for all resources regardless of whether that resource is required by the building or campus. For example, some of the resources produced by subplants 820 may be intermediate resources that function only as inputs to other subplants 820.

In some embodiments, the resources balanced by asset allocator 802 include multiple resources of the same type (e.g., multiple chilled water resources, multiple electricity resources, etc.). Defining multiple resources of the same type may allow asset allocator 802 to satisfy the resource balance given the physical constraints and connections of the central plant equipment. For example, suppose a central plant has multiple chillers and multiple cold water storage tanks, with each chiller physically connected to a different cold water storage tank (e.g., chiller A is connected to cold water storage tank A, chiller B is connected to cold water storage tank B, etc.). Given that only one chiller can supply cold water to each cold water storage tank, a different cold water resource can be defined for the output of each chiller. This allows asset allocator 802 to ensure that the resource balance is satisfied for each cold water resource without attempting to allocate resources in a way that is physically impossible (e.g., storing the output of chiller A in cold water storage tank B, etc.).

Asset allocator 802 may be configured to minimize the economic cost (or maximize the economic value) of operating asset allocation system 800 over the duration of the optimization period. The economic cost may be defined by a cost function J(x) that expresses economic cost as a function of the control decisions made by asset allocator 802. The cost function J(x) may account for the cost of resources purchased from sources 810, as well as the revenue generated by selling resources to resource purchasers 841 or energy grid 842 or participating in incentive programs. The cost optimization performed by asset allocator 802 can be expressed as:

$$\operatorname*{argmin}_{x} J(x)$$

where J(x) is defined as follows:

$$J(x) = \sum_{sources} \sum_{horizon} \text{cost}(purchase_{resource,\, time}, \text{time}) - \sum_{incentives} \sum_{horizon} \text{revenue}(ReservationAmount)$$

The first term in the cost function J(x) represents the total cost of all resources purchased over the optimization horizon. Resources can include, for example, water, electricity, natural gas, or other types of resources purchased from a utility or other source 810. The second term in the cost function J(x) represents the total revenue generated by participating in incentive programs (e.g., IBDR programs) over the optimization horizon. The revenue may be based on the amount of power reserved for participating in the incentive programs. Accordingly, the total cost function represents the total cost of resources purchased minus any revenue generated from participating in incentive programs.

Each of subplants 820 and storage 830 may include equipment that can be controlled by asset allocator 802 to optimize the performance of asset allocation system 800. Subplant equipment may include, for example, heating devices, chillers, heat recovery heat exchangers, cooling towers, energy storage devices, pumps, valves, and/or other devices of subplants 820 and storage 830. Individual devices of subplants 820 can be turned on or off to adjust the resource production of each subplant 820. In some embodiments, individual devices of subplants 820 can be operated at variable capacities (e.g., operating a chiller at 10% capacity or 60% capacity) according to an operating setpoint received from asset allocator 802. Asset allocator 802 can control the equipment of subplants 820 and storage 830 to adjust the amount of each resource purchased, consumed, and/or produced by system 800.

In some embodiments, asset allocator 802 minimizes the cost function while participating in PBDR programs, IBDR programs, or simultaneously in both PBDR and IBDR programs. For the IBDR programs, asset allocator 802 may use statistical estimates of past clearing prices, mileage ratios, and event probabilities to determine the revenue generation potential of selling stored energy to resource purchasers 841 or energy grid 842. For the PBDR programs, asset allocator 802 may use predictions of ambient conditions, facility thermal loads, and thermodynamic models of installed equipment to estimate the resource consumption of subplants 820. Asset allocator 802 may use predictions of the resource consumption to monetize the costs of running the equipment.

Asset allocator 802 may automatically determine (e.g., without human intervention) a combination of PBDR and/or IBDR programs in which to participate over the optimization horizon in order to maximize economic value. For example, asset allocator 802 may consider the revenue generation potential of IBDR programs, the cost reduction potential of PBDR programs, and the equipment maintenance/replacement costs that would result from participating in various combinations of the IBDR programs and PBDR programs. Asset allocator 802 may weigh the benefits of participation against the costs of participation to determine an optimal combination of programs in which to participate. Advantageously, this allows asset allocator 802 to determine an optimal set of control decisions that maximize the overall value of operating asset allocation system 800.

In some embodiments, asset allocator 802 optimizes the cost function J(x) subject to the following constraint, which guarantees the balance between resources purchased, produced, discharged, consumed, and requested over the optimization horizon:

$$\sum_{sources} purchase_{resource, time} +$$

$$\sum_{subplants} produces(x_{internal, time}, x_{external, time}, v_{uncontrolled, time}) -$$

$$\sum_{subplants} consumes(x_{internal, time}, x_{external, time}, v_{uncontrolled, time}) +$$

-continued $$\sum_{storages} discharges_{resource}(x_{internal, time}, x_{external, time}) - \sum_{sinks} requests_{resource} =$$

$$0 \quad \forall \text{ resources}, \forall \text{ time} \in \text{horizon}$$

where $x_{internal,time}$ includes internal decision variables (e.g., load allocated to each component of asset allocation system 800), $x_{external,time}$ includes external decision variables (e.g., condenser water return temperature or other shared variables across subplants 820), and $v_{uncontrolled,time}$ includes uncontrolled variables (e.g., weather conditions).

The first term in the previous equation represents the total amount of each resource (e.g., electricity, water, natural gas, etc.) purchased from each source 810 over the optimization horizon. The second and third terms represent the total production and consumption of each resource by subplants 820 over the optimization horizon. The fourth term represents the total amount of each resource discharged from storage 830 over the optimization horizon. Positive values indicate that the resource is discharged from storage 830, whereas negative values indicate that the resource is charged or stored. The fifth term represents the total amount of each resource requested by sinks 840 over the optimization horizon. Accordingly, this constraint ensures that the total amount of each resource purchased, produced, or discharged from storage 830 is equal to the amount of each resource consumed, stored, or provided to sinks 840.

In some embodiments, additional constraints exist on the regions in which subplants 820 can operate. Examples of such additional constraints include the acceptable space (e.g., the feasible region) for the decision variables given the uncontrolled conditions, the maximum amount of a resource that can be purchased from a given source 810, and any number of plant-specific constraints that result from the mechanical design of the plant. These additional constraints can be generated and imposed by operational domain module 1204 (described in greater detail with reference to FIG. 12).

Asset allocator 802 may include a variety of features that enable the application of asset allocator 802 to nearly any central plant, central energy facility, combined heating and cooling facility, or combined heat and power facility. These features include broadly applicable definitions for subplants 820, sinks 840, storage 830, and sources 810; multiples of the same type of subplant 820 or sink 840; subplant resource connections that describe which subplants 820 can send resources to which sinks 840 and at what efficiency; subplant minimum turndown into the asset allocation optimization; treating electrical energy as any other resource that must be balanced; constraints that can be commissioned during runtime; different levels of accuracy at different points in the horizon; setpoints (or other decisions) that are shared between multiple subplants included in the decision vector; disjoint subplant operation regions; incentive based electrical energy programs; and high level airside models. Incorporation of these features may allow asset allocator 802 to support a majority of the central energy facilities that will be seen in the future. Additionally, it will be possible to rapidly adapt to the inclusion of new subplant types. Some of these features are described in greater detail below.

Broadly applicable definitions for subplants 820, sinks 840, storage 830, and sources 810 allow each of these components to be described by the mapping from decision variables to resources consume and resources produced. Resources and other components of system 800 do not need to be "typed," but rather can be defined generally. The mapping from decision variables to resource consumption and production can change based on extrinsic conditions. Asset allocator 820 can solve the optimization problem by simply balancing resource use and can be configured to solve in terms of consumed resource 1, consumed resource 2, produced resource 1, etc., rather than electricity consumed, water consumed, and chilled water produced. Such an interface at the high level allows for the mappings to be injected into asset allocation system 800 rather than needing them hard coded. Of course, "typed" resources and other components of system 800 can still exist in order to generate the mapping at run time, based on equipment out of service.

Incorporating multiple subplants 820 or sinks 840 of the same type allows for modeling the interconnections between subplants 820, sources 810, storage 830, and sinks 840. This type of modeling describes which subplants 820 can use resource from which sources 810 and which subplants 820 can send resources to which sinks 840. This can be visualized as a resource connection matrix (e.g., a directed graph) between the subplants 820, sources 810, sinks 840, and storage 830. Examples of such directed graphs are described in greater detail with reference to FIGS. 9A-9B. Extending this concept, it is possible to include costs for delivering the resource along a connection and also, efficiencies of the transmission (e.g., amount of energy that makes it to the other side of the connection).

In some instances, constraints arise due to mechanical problems after an energy facility has been built. Accordingly, these constraints are site specific and are often not incorporated into the main code for any of subplants 820 or the high level problem itself. Commissioned constraints allow for such constraints to be added without software updates during the commissioning phase of the project. Furthermore, if these additional constraints are known prior to the plant build, they can be added to the design tool run. This would allow the user to determine the cost of making certain design decisions.

Incorporating minimum turndown and allowing disjoint operating regions may greatly enhance the accuracy of the asset allocation problem solution as well as decrease the number of modifications to solution of the asset allocation by the low level optimization or another post-processing technique. It may be beneficial to allow for certain features to change as a function of time into the horizon. One could use the full disjoint range (most accurate) for the first four hours, then switch to only incorporating the minimum turndown for the next two days, and finally using to the linear relaxation with no binary constraints for the rest of the horizon. For example, asset allocator 802 can be given the operational domain that correctly allocates three chillers with a range of 1800 to 2500 tons. The true subplant range is then the union of [1800, 2500], [3600, 5000], and [5400, 7500]. If the range were approximated as [1800, 7500] the low level optimization or other post-processing technique would have to rebalance any solution between 2500 and 3600 or between 5000 and 5400 tons. Rebalancing is typically done heuristically and is unlikely to be optimal. Incorporating these disjoint operational domains adds binary variables to the optimization problem (described in greater detail below).

Some decisions made by asset allocator 802 may be shared by multiple elements of system 800. The condenser water setpoint of cooling towers is an example. It is possible to assume that this variable is fixed and allow the low level optimization to decide on its value. However, this does not allow one to make a trade-off between the chiller's electrical use and the tower's electrical use, nor does it allow the optimization to exceed the chiller's design load by feeding it cooler condenser water. Incorporating these extrinsic decisions into asset allocator 802 allows for a more accurate solution at the cost of computational time.

Incentive programs often require the reservation of one or more assets for a period of time. In traditional systems, these assets are typically turned over to alternative control, different than the typical resource price based optimization. Advantageously, asset allocator 802 can be configured to add revenue to the cost function per amount of resource reserved. Asset allocator 802 can then make the reserved portion of the resource unavailable for typical price based cost optimization. For example, asset allocator 802 can reserve a portion of a battery asset for frequency response. In this case, the battery can be used to move the load or shave the peak demand, but can also be reserved to participate in the frequency response program.

Plant Resource Diagrams

Figure 9A:
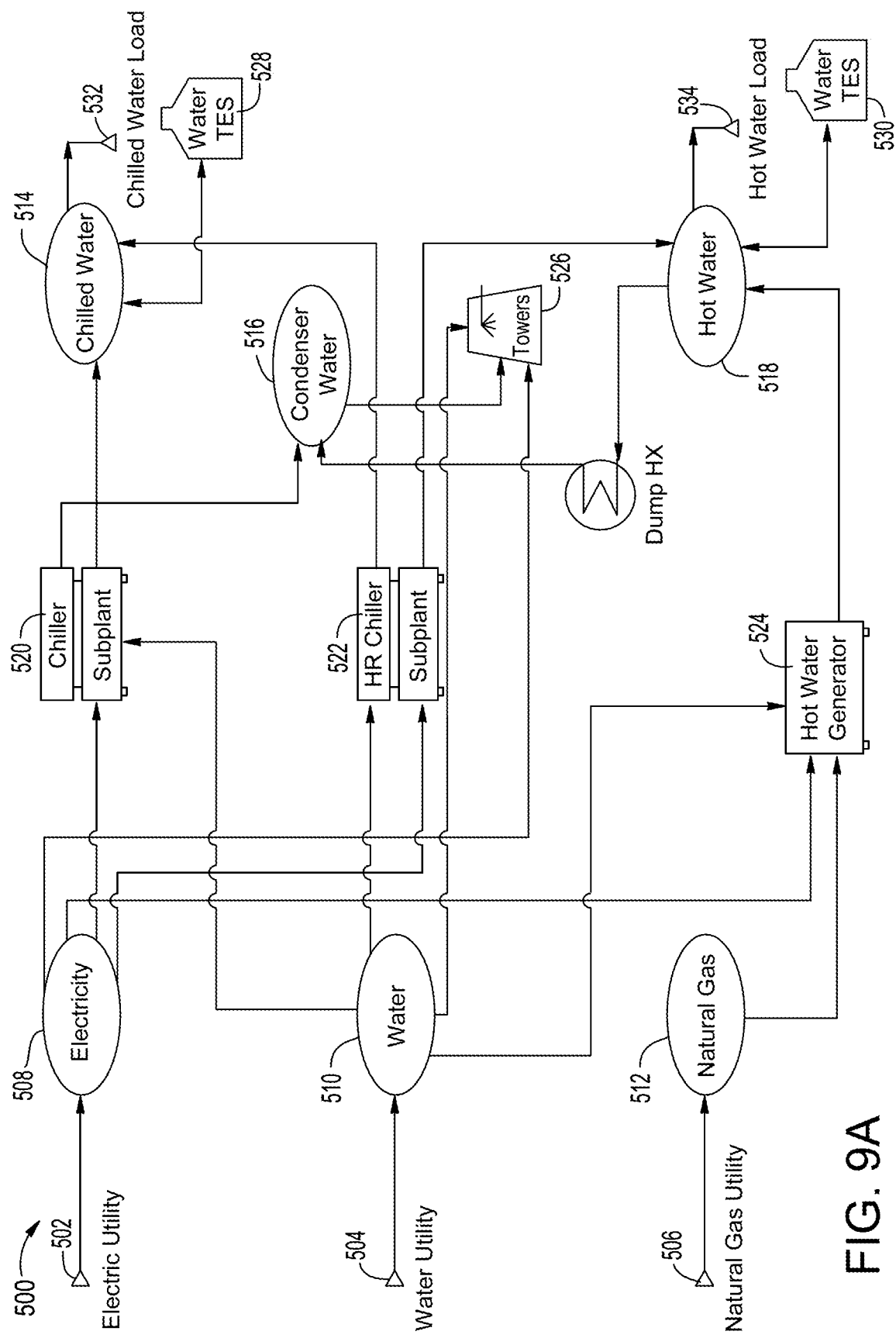
FIG. 9A is a plant resource diagram illustrating the elements of a central plant and the connections between such elements, according to an exemplary embodiment.
Figure 9B:
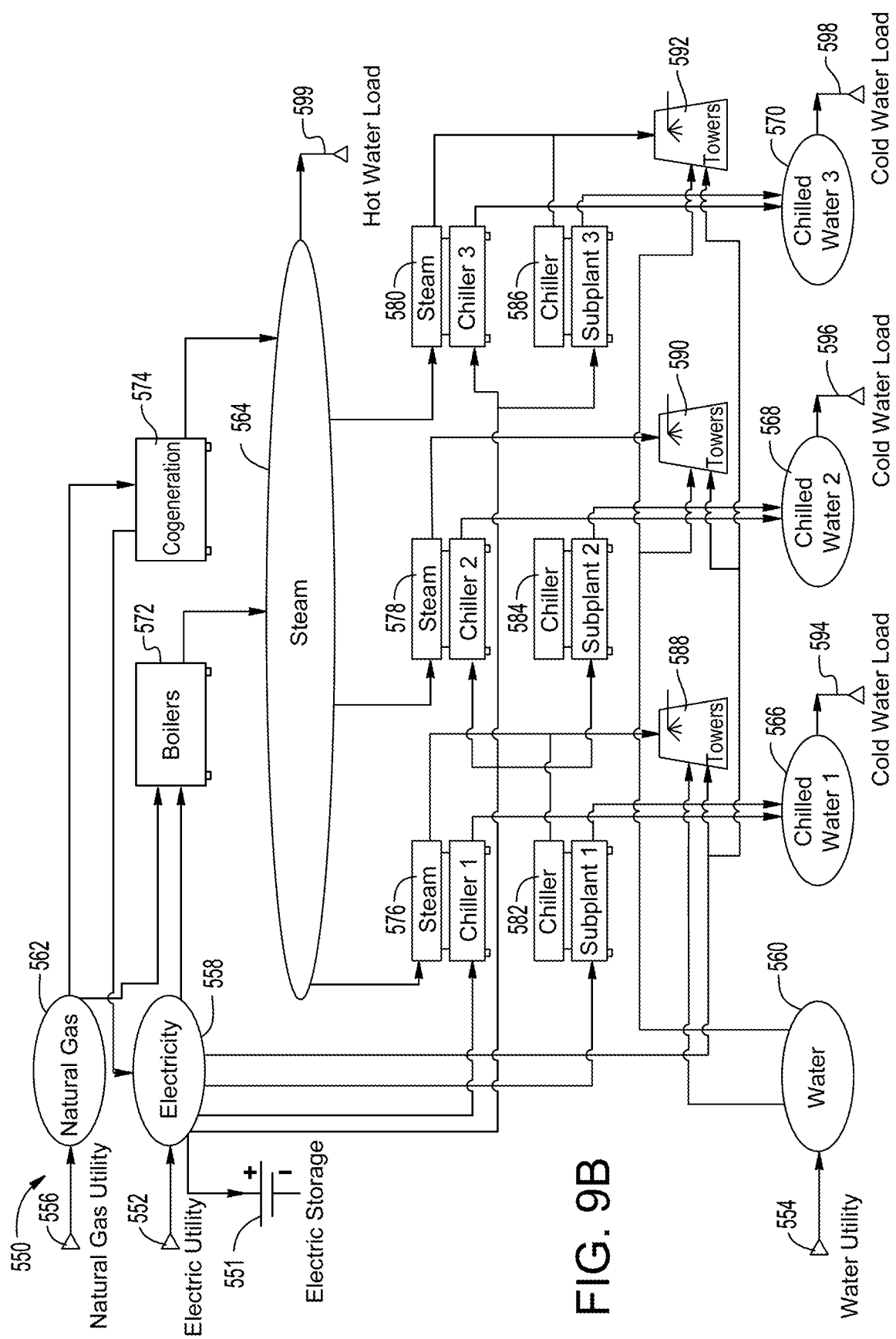
FIG. 9B is another plant resource diagram illustrating the elements of a central plant and the connections between such elements, according to an exemplary embodiment.

Referring now to FIG. 9A, a plant resource diagram 500 is shown, according to an exemplary embodiment. Plant resource diagram 500 represents a particular implementation of a central plant and indicates how the equipment of the central plant are connected to each other and to external systems or devices. Asset allocator 802 can use plant resource diagram 500 to identify the interconnections between various sources 810, subplants 820, storage 830, and sinks 840 in the central plant. In some instances, the interconnections defined by diagram 500 are not capable of being inferred based on the type of resource produced. For this reason, plant resource diagram 500 may provide asset allocator 802 with new information that can be used to establish constraints on the asset allocation problem.

Plant resource diagram 500 is shown to include an electric utility 502, a water utility 504, and a natural gas utility 506. Utilities 502-506 are examples of sources 810 that provide resources to the central plant. For example, electric utility 502 may provide an electricity resource 508, water utility 504 may provide a water resource 510, and natural gas utility 506 may provide a natural gas resource 512. The lines connecting utilities 502-506 to resources 508-512 along with the directions of the lines (e.g., pointing toward resources 508-512) indicate that resources purchased from utilities 502-506 add to resources 508-512.

Plant resource diagram 500 is shown to include a chiller subplant 520, a heat recovery (HR) chiller subplant 522, a hot water generator subplant 524, and a cooling tower subplant 526. Subplants 520-526 are examples of subplants 820 that convert resource types (e.g., convert input resources to output resources). For example, the lines connecting electricity resource 508 and water resource 510 to chiller subplant 520 indicate that chiller subplant 520 receives electricity resource 508 and water resource 510 as input resources. The lines connecting chiller subplant 520 to chilled water resource 514 and condenser water resource 516 indicate that chiller subplant 520 produces chilled water resource 514 and condenser water resource 516. Similarly, the lines connecting electricity resource 508 and water resource 510 to HR chiller subplant 522 indicate that HR chiller subplant 522 receives electricity resource 508 and water resource 510 as input resources. The lines connecting HR chiller subplant 522 to chilled water resource 514 and hot water resource 518 indicate that HR chiller subplant 522 produces chilled water resource 514 and hot water resource 518.

Plant resource diagram 500 is shown to include water TES 528 and 530. Water TES 528-530 are examples of storage 530 that can be used to store and discharge resources. The line connecting chilled water resource 514 to water TES 528 indicates that water TES 528 stores and discharges chilled water resource 514. Similarly, the line connecting hot water resource 518 to water TES 530 indicates that water TES 530 stores and discharges hot water resource 518. In diagram 500, water TES 528 is connected to only chilled water resource 514 and not to any of the other water resources 516 or 518. This indicates that water TES 528 can be used by asset allocator 802 to store and discharge only chilled water resource 514 and not the other water resources 516 or 518. Similarly, water TES 530 is connected to only hot water resource 518 and not to any of the other water resources 514 or 516. This indicates that water TES 530 can be used by asset allocator 802 to store and discharge only hot water resource 518 and not the other water resources 514 or 516.

Plant resource diagram 500 is shown to include a chilled water load 532 and a hot water load 534. Loads 532-534 are examples of sinks 840 that consume resources. The line connecting chilled water load 532 to chilled water resource 514 indicates that chilled water resource 514 can be used to satisfy chilled water load 532. Similarly, the line connecting hot water load 534 to hot water resource 518 indicates that hot water resource 518 can be used to satisfy hot water load 534. Asset allocator 802 can use the interconnections and limitations defined by plant resource diagram 500 to establish appropriate constraints on the optimization problem.

Referring now to FIG. 9B, another plant resource diagram 550 is shown, according to an exemplary embodiment. Plant resource diagram 550 represents another implementation of a central plant and indicates how the equipment of the central plant are connected to each other and to external systems or devices. Asset allocator 802 can use plant resource diagram 550 to identify the interconnections between various sources 810, subplants 820, storage 830, and sinks 840 in the central plant. In some instances, the interconnections defined by diagram 550 are not capable of being inferred based on the type of resource produced. For this reason, plant resource diagram 550 may provide asset allocator 802 with new information that can be used to establish constraints on the asset allocation problem.

Plant resource diagram 550 is shown to include an electric utility 552, a water utility 554, and a natural gas utility 556. Utilities 552-556 are examples of sources 810 that provide resources to the central plant. For example, electric utility 552 may provide an electricity resource 558, water utility 554 may provide a water resource 560, and natural gas utility 556 may provide a natural gas resource 562. The lines connecting utilities 552-556 to resources 558-562 along with the directions of the lines (e.g., pointing toward resources 558-562) indicate that resources purchased from utilities 552-556 add to resources 558-562. The line connecting electricity resource 558 to electrical storage 551 indicates that electrical storage 551 can store and discharge electricity resource 558.

Plant resource diagram 550 is shown to include a boiler subplant 572, a cogeneration subplant 574, several steam chiller subplants 576-580, several chiller subplants 582-586, and several cooling tower subplants 588-592. Subplants 572-592 are examples of subplants 820 that convert resource types (e.g., convert input resources to output resources). For example, the lines connecting boiler subplant 572 and cogeneration subplant 574 to natural gas resource 562, electricity resource 558, and steam resource 564 indicate that both boiler subplant 572 and cogeneration subplant 574 consume natural gas resource 562 and electricity resource 558 to produce steam resource 564.

The lines connecting steam resource 564 and electricity resource 558 to steam chiller subplants 576-580 indicate that each of steam chiller subplants 576-580 receives steam resource 564 and electricity resource 558 as input resources. However, each of steam chiller subplants 576-580 produces a different output resource. For example, steam chiller subplant 576 produces chilled water resource 566, steam chiller subplant 578 produces chilled water resource 568, and steam chiller subplant 580 produces chilled water resource 570. Similarly, the lines connecting electricity resource 558 to chiller subplants 582-586 indicate that each of chiller subplants 582-586 receives electricity resource 558 as an input. However, each of chiller subplants 582-586 produces a different output resource. For example, chiller subplant 582 produces chilled water resource 566, chiller subplant 584 produces chilled water resource 568, and chiller subplant 586 produces chilled water resource 570.

Chilled water resources 566-570 have the same general type (e.g., chilled water) but can be defined as separate resources by asset allocator 802. The lines connecting chilled water resources 566-570 to subplants 576-586 indicate which of subplants 576-586 can produce each chilled water resource 566-570. For example, plant resource diagram 550 indicates that chilled water resource 566 can only be produced by steam chiller subplant 576 and chiller subplant 582. Similarly, chilled water resource 568 can only be produced by steam chiller subplant 578 and chiller subplant 584, and chilled water resource 570 can only be produced by steam chiller subplant 580 and chiller subplant 586.

Plant resource diagram 550 is shown to include a hot water load 599 and several cold water loads 594-598. Loads 594-599 are examples of sinks 840 that consume resources. The line connecting hot water load 599 to steam resource 564 indicates that steam resource 564 can be used to satisfy hot water load 599. Similarly, the lines connecting chilled water resources 566-570 to cold water loads 594-598 indicate which of chilled water resources 566-570 can be used to satisfy each of cold water loads 594-598. For example, only chilled water resource 566 can be used to satisfy cold water load 594, only chilled water resource 568 can be used to satisfy cold water load 596, and only chilled water resource 570 can be used to satisfy cold water load 598. Asset allocator 802 can use the interconnections and limitations defined by plant resource diagram 550 to establish appropriate constraints on the optimization problem.

Central Plant Controller

Figure 10:
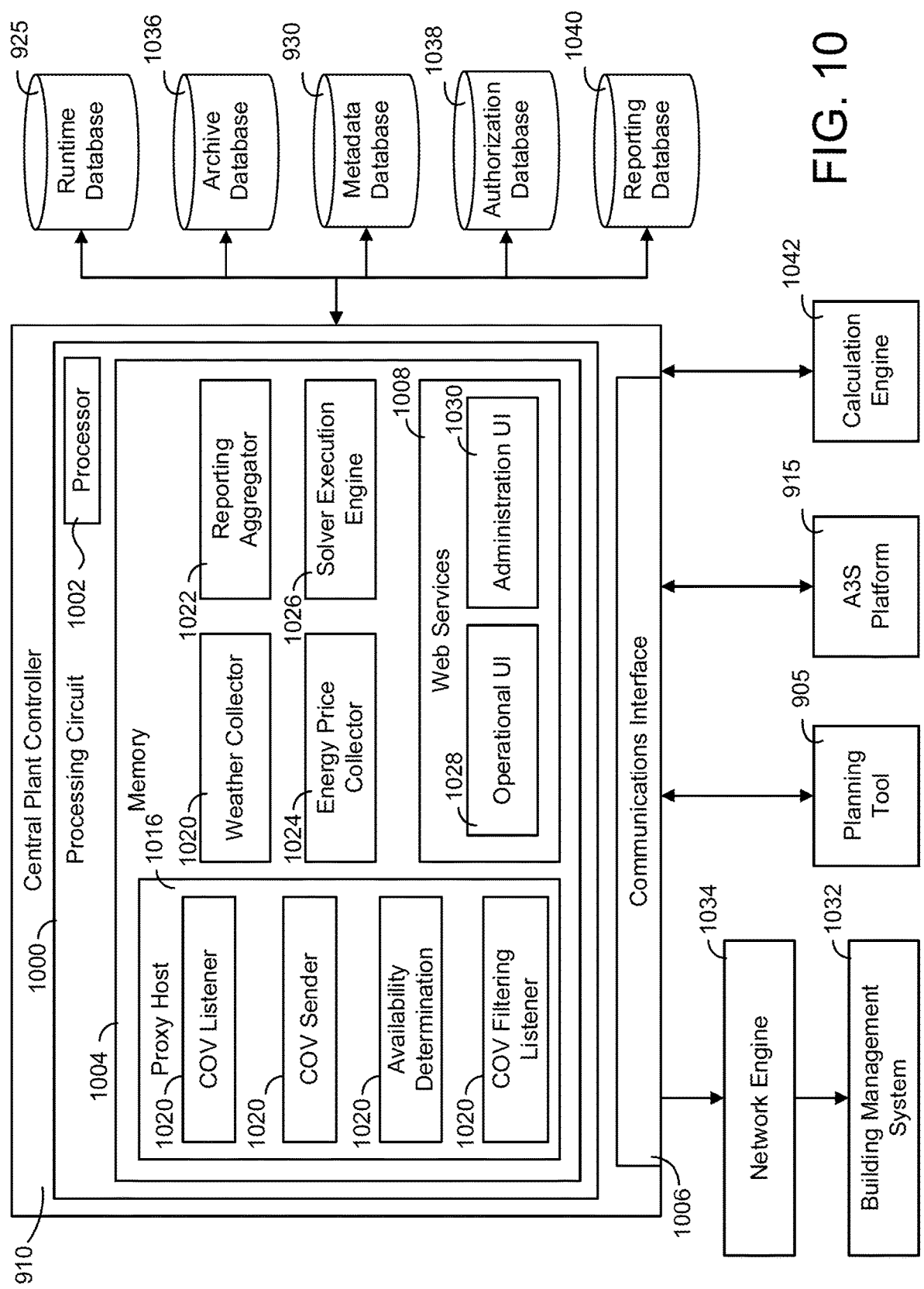
FIG. 10 is a block diagram illustrating the central plant controller of FIG. 5 in greater detail, according to an exemplary embodiment.

Referring now to FIG. 10, a block diagram illustrating central plant controller 910 in greater detail is shown, according to an exemplary embodiment. In various embodiments, central plant controller 910 can be configured to monitor and control central plant 200, asset allocation system 800, and various components thereof (e.g., sources 810, subplants 820, storage 830, sinks 840, etc.). Central plant controller 910 is shown providing control decisions to a building management system (BMS) 1032. The control decisions provided to BMS 1032 may include resource purchase amounts for sources 810, setpoints for subplants 820, and/or charge/discharge rates for storage 830.

In some embodiments, BMS 1032 is the same or similar to the BMS described with reference to FIG. 1. BMS 1032 may be configured to monitor conditions within a controlled building or building zone. For example, BMS 1032 may receive input from various sensors (e.g., temperature sensors, humidity sensors, airflow sensors, voltage sensors, etc.) distributed throughout the building and may report building conditions to central plant controller 910. Building conditions may include, for example, a temperature of the building or a zone of the building, a power consumption (e.g., electric load) of the building, a state of one or more actuators configured to affect a controlled state within the building, or other types of information relating to the controlled building. BMS 1032 may operate subplants 820 and storage 830 to affect the monitored conditions within the building and to serve the thermal energy loads of the building.

BMS 1032 may receive control signals from central plant controller 910 specifying on/off states, charge/discharge rates, and/or setpoints for the subplant equipment. BMS 1032 may control the equipment (e.g., via actuators, power relays, etc.) in accordance with the control signals provided by central plant controller 910. For example, BMS 1032 may operate the equipment using closed loop control to achieve the setpoints specified by central plant controller 910. In various embodiments, BMS 1032 may be combined with central plant controller 910 or may be part of a separate building management system. According to an exemplary embodiment, BMS 1032 is a METASYS® brand building management system, as sold by Johnson Controls, Inc.

In some embodiments, central plant controller 910 is integrated within a single computer (e.g., one server, one housing, etc.). In various other exemplary embodiments, central plant controller 910 can be distributed across multiple servers or computers (e.g., that can exist in distributed locations). For example, solver execution engine 1026 may reside on a separate server than proxy host 1010. The components of central plant controller 910 may be deployed on one or more servers. For instance, one server may be designated to host the databases (e.g., runtime database 925, archive database 1036, metadata database 930, etc.). In another exemplary embodiment, central plant controller 910 may integrated with a smart building manager that manages multiple building systems and/or combined with BMS 1032.

Central plant controller 910 is shown to include a communications interface 1006 and a processing circuit 1000. Communications interface 1006 may include wired or wireless interfaces (e.g., jacks, antennas, transmitters, receivers, transceivers, wire terminals, etc.) for conducting data communications with various systems, devices, or networks. For example, communications interface 1006 may include an Ethernet card and port for sending and receiving data via an Ethernet-based communications network and/or a Wi-Fi transceiver for communicating via a wireless communications network. Communications interface 1006 may be configured to communicate via local area networks or wide area networks (e.g., the Internet, a building WAN, etc.) and may use a variety of communications protocols (e.g., BACnet, IP, LON, etc.).

Communications interface 1006 may be a network interface configured to facilitate electronic data communications between central plant controller 910 and various external systems or devices (e.g., BMS 1032, A3S platform 915, planning tool 905, metadata database 930, runtime database 925, etc.). For example, central plant controller 910 may receive information from BMS 1032 (via network engine 1034) indicating one or more measured states of the controlled building (e.g., temperature, humidity, electric loads, etc.) and one or more states of subplants and/or storage (e.g., equipment status, power consumption, equipment availability, etc.).

Central plant controller 910 may communicate with network engine 1034 (e.g., via communications interface 1006). Network engine 1034 can be implemented to map the data points of building management system 1032 into central plant controller 910. Network engine 1034 can act as the intermediary between central plant controller 910 and building management system 1032. Network engine 1034 may be used when data is imported from planning tool 905 to central plant controller 910. Network engine 1034 can provide the functionality of a mapping tool between central plant controller 910 and building management system 1032. A field engineer can use network engine 1034 to centralize the points needed to run central plant controller 910. Network engine 1034 can serve to isolate customer-specific logic (e.g., providing aggregated flows).

Still referring to FIG. 10, processing circuit 1000 is shown to include a processor 1002 and memory 1004. Processor 1002 may be a general purpose or specific purpose processor, an application specific integrated circuit (ASIC), one or more field programmable gate arrays (FPGAs), a group of processing components, or other suitable processing components. Processor 1002 may be configured to execute computer code or instructions stored in memory 1004 or received from other computer readable media (e.g., CDROM, network storage, a remote server, etc.).

Memory 1004 may include one or more devices (e.g., memory units, memory devices, storage devices, etc.) for storing data and/or computer code for completing and/or facilitating the various processes described in the present disclosure. Memory 1004 may include random access memory (RAM), read-only memory (ROM), hard drive storage, temporary storage, non-volatile memory, flash memory, optical memory, or any other suitable memory for storing software objects and/or computer instructions. Memory 1004 may include database components, object code components, script components, or any other type of information structure for supporting the various activities and information structures described in the present disclosure. Memory 1004 may be communicably connected to processor 1002 via processing circuit 1000 and may include computer code for executing (e.g., by processor 1002) one or more processes described herein.

Still referring to FIG. 10, central plant controller 910 is shown to include weather collector 1020, reporting aggregator 1022, energy price collector 1024, and solver execution engine 1026. Weather collector 1020 may be a background service that communicates with a 3rd party web API. Weather collector 1020 can collect weather data on a schedule basis (e.g., hourly, etc.) based on latitude and longitude of building management system 1032. Solver execution engine 1026 can be configured to execute the solvers of central plant controller 910. Solver execution engine 1026 may execute a solver based on a schedule or triggered by an external event. Solver execution engine 1026 may be responsible for maintaining the schedule, receiving triggers, and controlling that only one instance of a solver type is executing at a single point in time. The solvers may be executed by an external process.

Still referring to FIG. 10, central plant controller 910 is shown to include proxy host 1010. Proxy host 1010 may include COV listener 1012, COV sender 1014, availability determination 1016, and/or COV filtering listener 1018. Proxy host 1010 may run as a background service. COV listener 1012 may be implemented to register for change of values (COVs) and write them to runtime database 925. COV listener 1012 may store the COVs in a simple latch table where only the latest value is kept, or COV listener 1012 may store the COVs in a circular queue where a configurable time of samples is maintained. COV sender 1014 can be configured to transmit the dispatch schedule to building management system 1032 via network engine 1034. Availability determination 1016 may be configured to register for COVs that can be used to determine the availability of a piece of equipment. Availability determination 1016 can use these values to calculate the availability and send only the availability status to runtime database 925. When availability status for a piece of equipment changes, an off-clock dispatch may be queued to run. COV filtering listener 1018 can be implemented to apply a recursive filter to the incoming values, writing out the filtered value to the COV tables of runtime database 925.

Central plant controller 910 is shown to include web services 1008. Web services 1008 is shown to include operational UI 1028 and administration UI 1030. Web services 1008 may contain one or more websites. A user may have access to one or more websites within web services 1008, but may not have access to all of them. Operational UI 1028 may be a website that services as the interface to central plant controller 910. It can have dashboard screens for high level plant operation, screens for viewing the current dispatch, and predictions for the horizon. Users of operational UI 1028 may interact with predictions for loads, weather, and pricing. Administration UI 1030 can be a website that is configured to configure operational UI 1028. Administration UI 1030 may support user management and basic user interface site configuration.

Still referring to FIG. 10, central plant controller 910 is shown to include interaction with calculation engine 1042. In some embodiments, not all data returned from solver execution engine 1026 is in a usable format. Calculation engine can be configured to perform calculations on such data. A calculator can be defined by metadata provided by metadata database 930. The metadata can consist of two points: information about how the point for which the calculation was defined (e.g., template, calculation type, how the point is used for reporting, whether the point represents predicted or actual data, etc.) and the points that are required for the calculation (e.g., template, point, how the point should be treated in calculation, etc.). The calculation definition may be stored in metadata database 930 and can tell us what calculations might exist and what types of points might be used to perform the calculation. When this information is matched against runtime database 925, we can get the list of actual calculation points in runtime database 925 along with the actual points that will be used within the calculation. For example, total plant production can be defined in metadata database 930 to include hot water production among other production types. If a customer site does not have hot water production, when the total plant production calculator is instantiated by calculation engine 1042, there will be no points for the calculator for hot water. Calculations may exist for production, consumption, utilization, simple efficiency, chiller-specific efficiency, site performance, overall CHP efficiency, CHP electric effectiveness, net electric efficiency, heat rate, utility cost, and demand cost. Calculation engine 1042 can allow central plant controller 910 to present user interfaces, provide reporting information, and export data to planning tool 905 in a manner that does not require custom configuration on a per customer basis.

Central plant controller 910 may interact with one or more databases. The databases may reside on a single server or may reside on a plurality of servers. Central plant controller 910 may be configured to interact with runtime database 925, archive database 1036, metadata database 930, authorization database 1038, and/or reporting database 1040. Runtime database 925 may be configured to store operational data for the system. This may include time series data, as well as model and non-time series data. Archive database 1036 may be configured to store the inputs and outputs of every solver run ran by solver execution engine 1026, as well as historical data that is not stored in runtime database 925. Metadata database 930 can be configured to store static information. This static information can include object templates, detailed information about time series and non-time series data, as well as data used to create user interfaces. Metadata database 930 can be implemented such that removing and rebuilding it can be done without affecting the operations and functionality of central plant controller 910. Reporting database 1040 can be configured to store time series data that has been aggregated to an hourly sampling rate. The sampling rate of runtime database 925 may have a default value (e.g., 15 minute boundaries), but may also include off-clock dispatches. Aggregating data to hourly boundaries in reporting database 1040 can reduce the amount of data that needs to be extracted for reporting, and also normalize the data to an even sample distance.

A3S Platform

Figure 11:
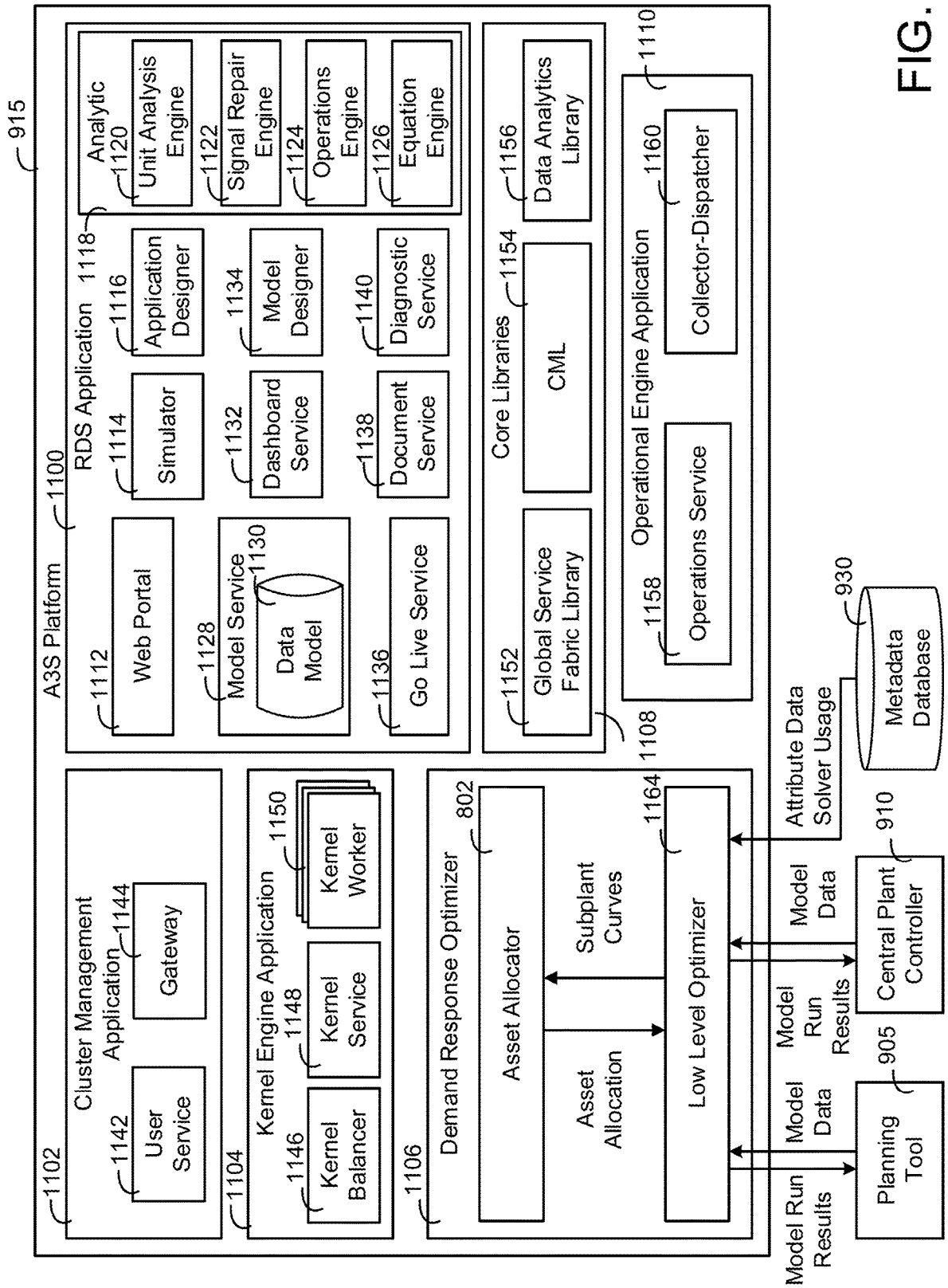
FIG. 11 is a block diagram illustrating the A3S platform of FIG. 5 in greater detail, according to an exemplary embodiment.

Referring now to FIG. 11, a block diagram illustrating A3S platform 915 in greater detail is shown, according to an exemplary embodiment. A3S platform 915 may be configured to use demand response optimizer 1106 to simulate the operation of a central plant over a predetermined time period (e.g., a day, a month, a week, a year, etc.) for planning, budgeting, and/or design considerations. For example, demand response optimizer 1106 may use building loads and utility rates to determine an optimal resource allocation to minimize cost over a simulation period.

A3S platform 915 and the various components of A3S platform 915 can be implemented as microservices on various computing devices (e.g., cloud servers, desktop computers, data centers, etc.). A3S platform 915 can be implemented with MICROSOFT® Service Fabric. A3S platform 915 can be implemented on one or more processing circuits (e.g., a processor and memory device) such as the processing circuit 404 of the BAS controller 366. However, A3S platform 915 can be implemented in any cloud computing system, a data center, one or more desktop computers, a building server, a private cloud, a public cloud, etc.

Still referring to FIG. 11, A3S platform 915 is shown to include a demand response optimizer 802. Demand response optimizer 802 may perform a cascaded optimization process to optimize the performance of asset allocation system 800. For example, demand response optimizer 1106 is shown to include asset allocator 802 and a low level optimizer 1164. Asset allocator 802 may control an outer (e.g., subplant level) loop of the cascaded optimization. Asset allocator 802 may determine an optimal set of control decisions for each time step in the prediction window in order to optimize (e.g., maximize) the value of operating asset allocation system 800. Control decisions made by asset allocator 802 may include, for example, load setpoints for each of subplants 820, charge/discharge rates for each of storage 830, resource purchase amounts for each type of resource purchased from sources 810, and/or an amount of each resource sold to energy purchasers. In other words, the control decisions may define resource allocation at each time step. The control decisions made by asset allocator 802 are based on the statistical estimates of incentive event probabilities and revenue generation potential for various IBDR events as well as the load and rate predictions. Advantageously, demand response optimizer 1106 may be configured to account for demand charges in the high level optimization process performed by asset allocator 802.

Low level optimizer 1164 may control an inner (e.g., equipment level) loop of the cascaded optimization. Low level optimizer 1164 may determine how to best run each subplant at the load setpoint determined by asset allocator 802. For example, low level optimizer 634 may determine on/off states and/or operating setpoints for various devices of the subplant equipment in order to optimize (e.g., minimize) the energy consumption of each subplant while meeting the resource allocation setpoint for the subplant. In some embodiments, low level optimizer 1164 receives actual incentive events from incentive programs. Low level optimizer 1164 may determine whether to participate in the incentive events based on the resource allocation set by asset allocator 802. For example, if insufficient resources have been allocated to a particular IBDR program by asset allocator 802 or if the allocated resources have already been used, low level optimizer 1164 may determine that asset allocation system 800 will not participate in the IBDR program and may ignore the IBDR event. However, if the required resources have been allocated to the IBDR program and are available in storage 830, low level optimizer 1164 may determine that system 400 will participate in the IBDR program in response to the IBDR event. The cascaded optimization process performed by demand response optimizer 1106 is described in greater detail in U.S. patent application Ser. No. 15/247,885.

In some embodiments, low level optimizer 1164 generates and provides subplant curves to asset allocator 802. Each subplant curve may indicate an amount of resource consumption by a particular subplant (e.g., electricity use measured in kW, water use measured in L/s, etc.) as a function of the subplant load. In some embodiments, low level optimizer 1164 generates the subplant curves by running the low level optimization process for various combinations of subplant loads and weather conditions to generate multiple data points. Low level optimizer 1164 may fit a curve to the data points to generate the subplant curves. In other embodiments, low level optimizer 1164 provides the data points asset allocator 802 and asset allocator 802 generates the subplant curves using the data points. Asset allocator 802 may store the subplant curves in memory for use in the high level (e.g., asset allocation) optimization process.

In some embodiments, the subplant curves are generated by combining efficiency curves for individual devices of a subplant. A device efficiency curve may indicate the amount of resource consumption by the device as a function of load. The device efficiency curves may be provided by a device manufacturer or generated using experimental data. In some embodiments, the device efficiency curves are based on an initial efficiency curve provided by a device manufacturer and updated using experimental data. The device efficiency curves may be stored in model service 1128. For some devices, the device efficiency curves may indicate that resource consumption is a U-shaped function of load. Accordingly, when multiple device efficiency curves are combined into a subplant curve for the entire subplant, the resultant subplant curve may be a wavy curve. The waves are caused by a single device loading up before it is more efficient to turn on another device to satisfy the subplant load.

In some embodiments, demand response optimizer 1106 uses the planned loads and utility rates in conjunction with subplant curves from low level optimizer 1164 to determine an optimal resource allocation (e.g., an optimal dispatch schedule) for a portion of the simulation period. Asset allocator 802 may request all of the subplant curves used in the simulation from low level optimizer 1164 at the beginning of the simulation. Since the planned loads and environmental conditions are known for the entire simulation period, asset allocator 802 may retrieve all of the relevant subplant curves at the beginning of the simulation. In some embodiments, low level optimizer 1164 generates functions that map subplant production to equipment level production and resource use when the subplant curves are provided to asset allocator 802. These subplant to equipment functions may be used to calculate the individual equipment production and resource use (e.g., in a post-processing module) based on the results of the simulation.

The portion of the simulation period over which asset allocator 802 optimizes the resource allocation may be defined by a prediction window ending at a time horizon. With each iteration of the optimization, the prediction window is shifted forward and the portion of the dispatch schedule no longer in the prediction window is accepted (e.g., stored or output as results of the simulation). Load and rate predictions may be predefined for the entire simulation and may not be subject to adjustments in each iteration. However, shifting the prediction window forward in time may introduce additional plan information (e.g., planned loads and/or utility rates) for the newly-added time slice at the end of the prediction window. The new plan information may not have a significant effect on the optimal dispatch schedule since only a small portion of the prediction window changes with each iteration.

A3S platform 915 is shown to include a cluster management application 1102, RDS application 1100, kernel engine application 1104, operational engine application 1110, and core libraries 1108. The cluster management application 1102 can be configured to provide external interactivity for an A3S cluster including user accounts and gateway services. A cluster may be a specific implementation of A3S platform 915 and/or particular services of A3S platform 915. Multiple A3S platforms 915 and/or services of the A3S platforms 915 can be deployed as clusters in a private cloud, a desktop computer, a public cloud, etc., all of which can work together provide controls for a building and/or facility.

Cluster management application 1102 is shown to include a user service 1142 and a gateway 1144. The user service 1142 can be a microservice configured to provide the ability for A3S platform 915 to identify a user whether identified through the gateway 1144 or a built in user interface (UI). The user service 1142 can be configured to provide users with login tokens, verify passwords, and/or otherwise manage user accounts and allow a user to access A3S platform 915. The gateway 1144 can be configured to route data between A3S platform 915 to an external user device. The gateway 1144 can provide an API (e.g., the external interface 766) for external systems to connect into. A developer can use an external interface to connect to A3S platform 915 through the gateway 1144.

The kernel engine application 1104 can be configured to manage distributed execution of the algorithms deployed into A3S platform 915 across various available clusters. The kernel engine application 1104 can be configured to distribute computing jobs among various clusters to optimize executing of the algorithms and further can be configured to recover computing algorithms in response to a computing cluster crashing. Hybrid cluster optimization can optimize the use of externally available resources to reduce cost of deployment and execution of the algorithms.

The kernel balancer 1146 can be configured to balance kernel execution for A3S platform 915. The kernel balancer 1146 can be configured to upload jobs into reliable storage, queue jobs, and balance jobs among various kernel services 1148 running in various A3S platform 915 clusters. The kernel service 1148 can be configured to execute a kernel and can be a microservice deployed in the cloud, in a data center, on one or more desktops, etc. In some embodiments, the kernel balancer 1146 can be configured to manage kernel execution using a cost function.

The kernel service 1148 can be configured to manage kernel execution processes (e.g., the kernel workers 1150). In response to receiving a job from the kernel balancer 1146, the kernel service 1148 can be configured to scan the kernel workers 1150 it has alive for any that are free and pass the job into the kernel worker 1150 using named data pipes. If active jobs exist on all the active kernels workers 792, the kernel service 1148 can be configured to create a new process (e.g., create a new kernel worker 1150). During the execution of the job on the kernel worker 1150, the kernel worker 1150 can be configured to return progress updates and errors back through the named data pipe. Once received, the kernel service 1148 can be configured to forward a notification back to the kernel balancer 1146.

The operational engine application 1110 can be configured to provide the A3S implementation of a sequence engine, a system that provides caching and algorithm execution of closed loop control. The operational engine application 1110 can maintain snapshots of raw data flowing on the target platform to ensure algorithms performance requirements are achieved. The operational engine application 1110 is shown to include operations service 1158 and collector-dispatcher 1160. Operations service 1158 can be configured to collect data from kernel workers 1150 and provide the collected data to the collector-dispatcher 1160 to execute control of building equipment. Similarly, the data that the collector-dispatcher 1160 collects from the building equipment can be provided to the kernel worker 1150 via the operations service 1158.

The RDS application 1100 can be configured to provide the user experience for the users of A3S's various target uses: deployment configuration, commissioning, creating generic live dashboards, editing deployed context model, maintaining and diagnosing live executions, simulating, monitoring, etc. The RDS application 1100 is shown to include a web portal 1112, a model service 1128, a simulator 1114, an analytic 1118, an application designer 1116, a dashboard service 1132, a diagnostic service 1140, a go live service 1136, a document service 1138, and a model designer 1134.

The web portal 1112 can be configured to provide one or more web interfaces to a user for accessing A3S platform 915. The web portal 1112 can be configured to allow a user to enter data into A3S platform 915, view system information, and other interface based features for the RDS application 1100.

The model service 1128 can be configured to receive information and generate the data model 1130. In some embodiments, the data model 1130 is the implementation of the metadata of the metadata database 930. Specifically, the data model 1130 may be a data model of a building and/or equipment for the building that is implemented based on the CML 1154. The model service 1128 may receive model data from planning tool 905 and/or central plant controller 910.

Simulator 1114 can be configured to run an active data model (e.g., the data model 1130) to provide experimental comparisons for testing algorithms against the data model 1130. In some cases, a developer builds a model, edits the model's data, solves the model against some settings, analyzes results, and continues to edit the model, solve the model, and analyze the results until satisfied with the model. However, the simulator 1114 enables a developer to test their algorithms against the current data model 1130 of A3S platform 915.

The analytic 1118 can be an engine that implements a scripting language that combines equations with actions implemented by a caller. The analytic 1118 can include various engines that it uses to operate. These engines may be the unit analysis engine 1120, the signal repair engine 1122, the operations engine 1124, and the equation engine 1126.

The unit analysis engine 1120 can be configured to provide a user with mathematical unit verification. In some embodiments, the unit analysis engine 1120 can track units in a script or otherwise in the code of the A3S platform by mapping a user defined unit into a standard unit and verifying that a unit result for an operation matches an expected unit. The signal repair engine 1122 can be configured to perform signal repair on various data sequences (e.g., time series data). The signal repair engine 1122 can be configured to perform interpolation and/or generate infinite resolution signals based on data sequences.

The operations engine 1124 may include various operations for execution for the analytic 1118. The operations executed by the operations engine 1124 can be timeseries executions, discrete data point execution, etc. These operations may be conventional operations or can be custom defined operations. The operations may be operations such as the operations found in FIGS. 9A and 9B of U.S. patent. Ser. No. 15/409,489 filed Jan. 18, 2017, the entirety of which is incorporated by reference herein. The equation engine 1126 can be configured to perform various operations based on the operations of a user defined script. The equation engine 1126 can be configured to break a sequence of script operations down into individual operations and generate an appropriate order for the execution of the operations.

The application designer 1116 can be configured to generate interfaces for displaying information of the data model 1130 to a user. The application designer 1116 can be configured to receive user uploaded scalable vector graphics (SVGs) that a user can generate via an illustration platform (e.g., ADOBE ILLUSTRATOR®, INKSCAPE®, Gimp, etc.). An SVG may be an XML-based vector image format for two-dimensional graphics that support user interaction and animation. Based on the user uploaded SVGs, a user can bind the SVGs to widgets, include data points in the widgets, and display the widgets in various interface pages. The widgets may update their data points based on a link generated by a user between the data model 1130 and the widget.

The dashboard service 1132 can be configured to provide a user with a dashboard of their building or facility. The interfaces that the dashboard service 1132 can be configure to host can be interfaces that include widgets generated by the application designer 1116.

The diagnostic service 1140 can be configured to enable administrators of A3S platform 915 to have full views of their models for editing and overrides. This view essentially is the show all version of model designer without the ability to edit the configuration of connections or hierarchy. Via the diagnostic service 1140, the administrator may commission data to the system not otherwise available from a custom app. It shows the current data, whenever requested, of the data model 1130 within the real-time system.

The go live service 1136, also referred to as the configuration tool herein, enables a user to bring the model they've created to a live system. The go live service 1136 reduces the required user efforts necessary to go live by reducing the number of steps to cause a system to "go live," e.g., begin operating. Causing a system to go live may include defining input definitions, input analytics, output definitions, output analytics, sequence settings, and system settings.

The first four steps surround input and output definitions. The user, when taking a design live, must specify the intersection between the points within the site and points within the data model for the algorithm they choose to run. If points do not exist or map one to one, the user can use the analytic 1118 to bridge the gap. In some embodiments, Johnson Controls (JCI) Logic Connector Tool (LCT) based logic covers this use case on sites. In the RDS application 1100, the analytic 1118 may not use a graphical approach and instead use a scripting language to cover this use case. In the analytic 1118, the user can map filtered points or averages to single points within the data model 1130.

Moreover, on output they may infer points in the site using many points within the data model 1130. Once inputs and outputs exist, the user then simply must specify network settings, and custom options for the sequences provided by the CML 1154. Once done, the system links into A3S platform 915 and start execution.

The document service 1138 can be configured to generate documentation for the data model 1130. The document generated by the document service 1138 can illustrate various data points, descriptions of the data points, units for the data points, and/or any other information for the data model 1130. A user can view the documents generated by the document service 1138 as a reference for updating and/or generating a new context 704.

The model designer 1134 can be configured to provide a user with interfaces for generating and/or updating a data model. The model designer 1134 can be configured to allow a user to select between various models (e.g., the data model 1130) and edit the model to change or add various pieces of equipment in the building or other information pertaining to the building.

A3S platform 915 may include various client integration points. These integration points may include planning tool 905 and central plant controller 910. The core libraries 1108 can be various code libraries configured to enable the execution of A3S platform 915. The core libraries 1108 are shown to include a global service fabric library 1152, a CML 1154, and a data analytics 1156 library. The global service fabric library 1152 may be a library allowing A3S platform 915 to implement A3S platform 915 and/or the various components and services of A3S platform 915 as microservices. Implementing A3S platform 915 and its various components and services as microservices may include deploying A3S platform 915 via MICROSOFT® Service Fabric, which the global service fabric library 1152 may enable. The global service fabric library 1152 may include one or more libraries enabling A3S platform 915 to implemented as a microservice.

Asset Allocator

Figure 12:
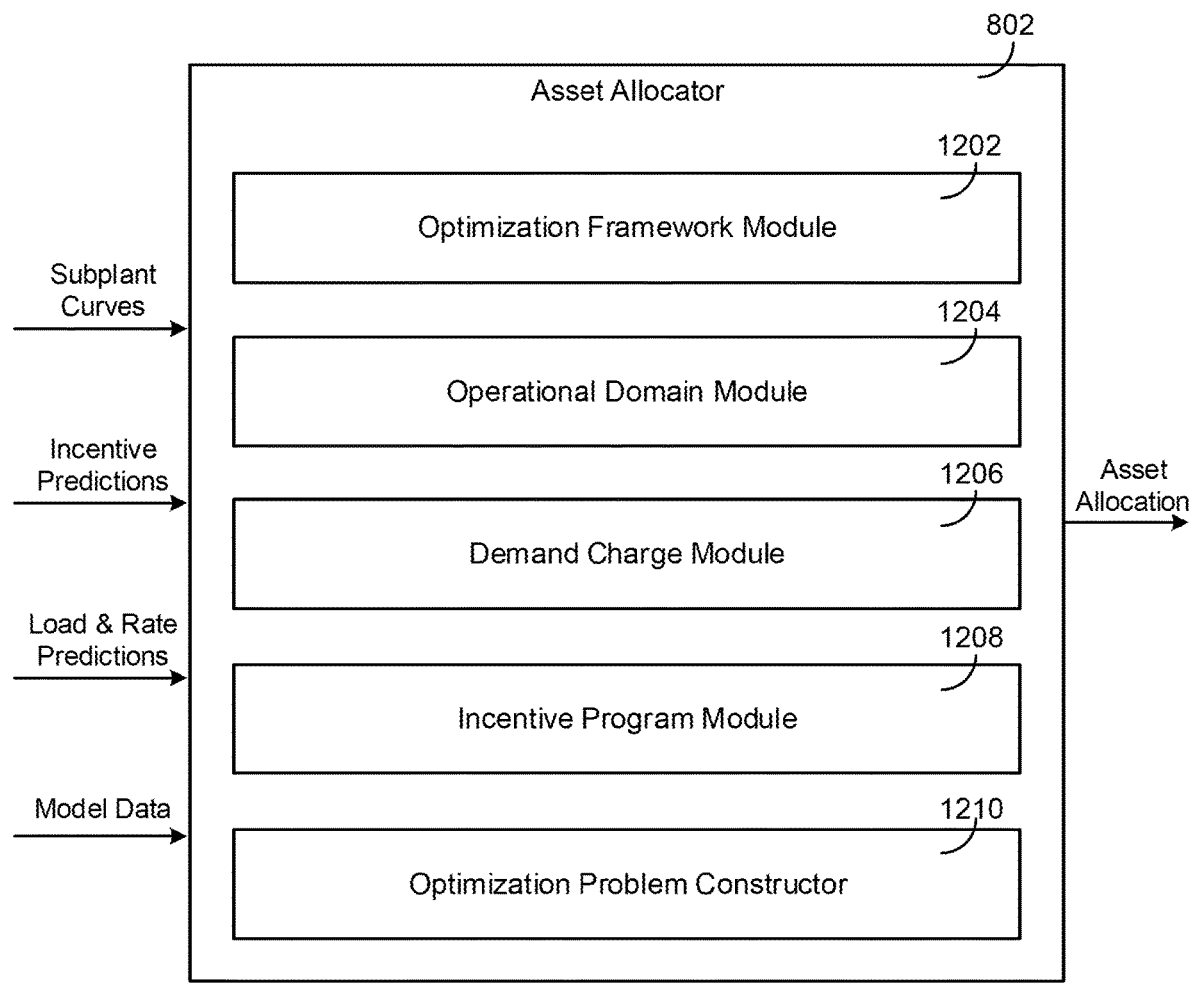
FIG. 12 is a block diagram illustrating the asset allocator of FIG. 8 in greater detail, according to an exemplary embodiment.

Referring now to FIG. 12, a block diagram illustrating asset allocator 802 in greater detail is shown, according to an exemplary embodiment. Asset allocator 802 may be configured to control the distribution, production, storage, and usage of resources in a central plant. As discussed above, asset allocator 802 can be configured to minimize the economic cost (or maximize the economic value) of operating a central plant over the duration of the optimization period. The economic cost may be defined by a cost function J(x) that expresses economic cost as a function of the control decisions made by asset allocator 802. The cost function J(x) may account for the cost of resources purchased from sources 810, as well as the revenue generated by selling resources to resource purchasers 841 or energy grid 842 or participating in incentive programs.

In some embodiments, asset allocator 802 performs an optimization process determine an optimal set of control decisions for each time step within an optimization period. The control decisions may include, for example, an optimal amount of each resource to purchase from sources 810, an optimal amount of each resource to produce or convert using subplants 820, an optimal amount of each resource to store or remove from storage 830, an optimal amount of each resource to sell to resources purchasers 841 or energy grid 840, and/or an optimal amount of each resource to provide to other sinks 840. In some embodiments, asset allocator 802 is configured to optimally dispatch all campus energy assets in order to meet the requested heating, cooling, and electrical loads of the campus for each time step within the optimization period.

Throughout this disclosure, asset allocator 802 is described as actively identifying or defining various items (e.g., sources 810, subplants 820, storage 830, sinks 840, operational domains, etc.). However, it should be understood that asset allocator 802 can also, or alternatively, receive such items as inputs. For example, the existence of such items can be defined by a user (e.g., via a user interface) or any other data source (e.g., another algorithm, an external system or process, etc.). Asset allocator 802 can be configured to identify which of these items have been defined or identified and can generate an appropriate cost function and optimization constraints based on the existence of these items. It should be understood that the acts of identifying or defining these items can include asset allocator 802 identifying, detecting, receiving, or otherwise obtaining a predefined item an input.

Optimization Framework

Asset allocator 802 is shown to include an optimization framework module 1202. Optimization framework module 1202 can be configured to define an optimization framework for the optimization problem solved by asset allocator 802. In some embodiments, optimization framework module 1202 defines the optimization problem as a mixed integer linear program (MILP). The MILP framework provides several advantages over the linear programming framework used in previous systems. For example, the MILP framework can account for minimum turndowns on equipment, can ensure that the high level optimization problem computes a point on the subplant curve for heat recovery chillers, and can impose logical constraints on the optimization problem to compensate for poor mechanical design and/or design inefficiencies.

In some embodiments, the MILP created by optimization framework module 1202 has the following form:

$$\min_{x,z} c_x^T x + c_z^T z$$

subject to the following constraints:

$$A_x x + A_z z \leq b$$

$$H_x x + H_z z = g$$

$$z = \text{integer}$$

where $x \in \mathbb{R}^{n_x}$ is a vector of the continuous decision variables, $z \in \mathbb{Z}^{n_z}$ is a vector of the integer decision variables, $c_x$ and $c_z$ are the respective cost vectors for the continuous decision variables and integer decision variables, $A_x$, $A_z$, and b are the matrices and vector that describe the inequality constraints, and $H_x$, $H_z$, and g are the matrices and vector that describe the equality constraints.

Optimization Problem Construction

Still referring to FIG. 12, asset allocator 802 is shown to include an optimization problem constructor 1210. Optimization problem constructor 1210 can be configured to construct the high level (e.g., asset allocation) optimization problem solved by asset allocator 802. In some embodiments, the high level optimization problem includes one or more of the elements of asset allocation system 800. For example, the optimization problem can include sinks 840, sources 810, subplants 820, and storage 830, as described with reference to FIG. 8. In some embodiments, the high level optimization problem includes airside units, which can be considered a type of energy storage in the mass of the building. The optimization problem may include site-specific constraints that can be added to compensate for mechanical design deficiencies.

In some embodiments, the optimization problem generated by optimization problem constructor 1210 includes a set of links between sources 810, subplants 820, storage 830, sinks 840, or other elements of the optimization problem. For example, the high level optimization problem can be viewed as a directed graph, as shown in FIGS. 9A-9B. The nodes of the directed graph can include sources 810, subplants 820, storage 830, and sinks 840. The set of links can define the connections between the nodes, the cost of the connections between nodes (e.g., distribution costs), the efficiency of each connection, and the connections between site-specific constraints.

In some embodiments, the optimization problem generated by optimization problem constructor 1210 includes an objective function. The objective function can include the sum of predicted utility usage costs over the horizon (e.g., the optimization period), the predicted demand charges, the total predicted incentive revenue over the prediction horizon, the sum of the predicted distribution costs, the sum of penalties on unmet and overmet loads over the prediction horizon, and/or the sum of the rate of change penalties over the prediction horizon (e.g., delta load penalties). All of these terms may add to the total cost, with the exception of the total predicted incentive revenue. The predicted incentive revenue may subtract from the total cost. For example, the objective function generated by optimization problem constructor 1210 may have the following form:

$$J(x) = \sum_{k=1}^{h} (\text{Source Usage Cost})_k +$$

$$(\text{Total Demand Charges}) - (\text{Total Incentives}) +$$

$$\sum_{k=1}^{h} (\text{Distribution Cost})_k + \sum_{k=1}^{h} (\text{Unmet/Overmet Load Penalties})_k +$$

$$\sum_{k=1}^{h} (\text{Rate of Change Penalties})_k$$

where the index k denotes a time step in the optimization period and h is the total number of time steps in the optimization period.

In some embodiments, the optimization problem generated by optimization problem constructor 1210 includes a set of constraints. The set of constraints can include resource balance constraints (e.g., hot water balance, chilled water balance, electricity balance, etc.), operational domain constraints for each of subplants 820, state of charge (SOC) and storage capacity constraints for each of storage 830, decision variable constraints (e.g., subplant capacity constraints, charge and discharge of storage constraints, and storage capacity constraints), demand/peak usage constraints, auxiliary constraints, and any site specific or commissioned constraints. In some embodiments, the operational domain constraints are generalized versions of the subplant curves. The operational domain constraints can be generated by operational domain module 1204 (described in greater detail below). The decision variable constraints may be box constraints of the form $x_{lb} \leq x \leq x_{ub}$, where x is a decision variable and $x_{lb}$ and $x_{ub}$ are the lower and upper bound for the decision variable x.

The optimization problem generated by optimization problem constructor 1210 can be considered a finite-horizon optimal control problem. The optimization problem may take the form:

$$\text{minimize } J(x)$$

subject to resource balances, operational domains for subplants 820 (e.g., subplant curves), constraints to predict the SOC of storage 830, storage capacity constraints, subplant/storage box constraints (e.g., capacity constraints and discharge/charge rate constraints), demand/peak usage constraints, auxiliary constraints for rate of change variables, auxiliary constraints for demand charges, and site specific constraints.

In some embodiments, optimization problem constructor 1210 applies an inventory balance constraint to each resource. One side of the inventory balance constraint for a given resource may include the total amount of the resource purchased from all sources 810, the total amount of the resource produced by all of subplants 820, the total amount of the resource discharged from storage 830 (negative values indicate charging storage 830), and unmet load. The other side of the inventory balance for the resource may include the total amount of the resource requested/predicted (uncontrolled load), carryover from the previous time step, the total amount of the resource consumed by all subplants 820 and airside units, overmet load, and the total amount of the resource sold. For example, the inventory balance for a resource may have the form:

$$\sum_{i \in \{Sources\}} (\text{Purchased Resource})_i + \sum_{j \in \{Subplants\}} (\text{Produced Resource})_j +$$

$$\sum_{k \in \{Storage\}} (\text{Discharged Storage})_k + \text{Unmet Load} =$$

$$\text{Requested Load} + \text{Carryover} +$$

$$\sum_{j \in \{Subplants\}} (\text{Consumed Resource})_j \sum_{l \in \{Airside\ Units\}} (\text{Consumed Resource})_l +$$

$$\text{Overmet Load} + \text{Resource Sold}$$

Optimization problem constructor 1210 may require this resource balance to be satisfied for each resource at each time step of the optimization period. Together the unmet and overmet load capture the accumulation of a resource. Negative accumulation (unmet load) are distinguished from positive accumulation (overmet load) because typically, overmet loads are not included in the resource balance. Even though unmet and overmet loads are listed separately, at most one of the two may be non-zero. The amount of carryover may be the amount of unmet/overmet load from the previous time step (described in greater detail below). The requested load may be determined by load/rate predictor 1018 and provided as an input to the high level optimization problem.

Throughout this disclosure, the high level/asset allocator optimization problem or high level/asset allocator problem refers to the general optimization problem constructed by optimization problem constructor 1210. A high level problem instance refers to a realization of the high level problem provided the input data and parameters. The high level optimization/asset allocation algorithm refers to the entire set of steps needed to solve a high level problem instance (e.g., encapsulates both the set of mathematical operations and the implementation or software design required to setup and solve a high level problem instance. Finally, a high level problem element or high level element refers to any of the elements of the high level problem including sinks 840, sources 810, subplants 820, storage 830, or airside unit.

Demand Charges

Still referring to FIG. 12, asset allocator 802 is shown to include a demand charge module 1206. Demand charge module 1206 can be configured to modify the cost function J(x) and the optimization constraints to account for one or more demand charges. As previously described, demand charges are costs imposed by sources 810 based on the peak consumption of a resource from sources 810 during various demand charge periods (e.g., the peak amount of the resource purchased from the utility during any time step of the applicable demand charge period). For example, an electric utility may define one or more demand charge periods and may impose a separate demand charge based on the peak electric consumption during each demand charge period. Electric energy storage can help reduce peak consumption by storing electricity in a battery when energy consumption is low and discharging the stored electricity from the battery when energy consumption is high, thereby reducing peak electricity purchased from the utility during any time step of the demand charge period.

In some instances, one or more of the resources purchased from 810 are subject to a demand charge or multiple demand charges. There are many types of potential demand charges as there are different types of energy rate structures. The most common energy rate structures are constant pricing, time of use (TOU), and real time pricing (RTP). Each demand charge may be associated with a demand charge period during which the demand charge is active. Demand charge periods can overlap partially or completely with each other and/or with the optimization period. Demand charge periods can include relatively long periods (e.g., monthly, seasonal, annual, etc.) or relatively short periods (e.g., days, hours, etc.). Each of these periods can be divided into several sub-periods including off-peak, partial-peak, and/or on-peak. Some demand charge periods are continuous (e.g., beginning Jan. 1, 2017 and ending Jan. 31, 2017), whereas other demand charge periods are non-continuous (e.g., from 11:00 AM-1:00 PM each day of the month).

Over a given optimization period, some demand charges may be active during some time steps that occur within the optimization period and inactive during other time steps that occur during the optimization period. Some demand charges may be active over all the time steps that occur within the optimization period. Some demand charges may apply to some time steps that occur during the optimization period and other time steps that occur outside the optimization period (e.g., before or after the optimization period). In some embodiments, the durations of the demand charge periods are significantly different from the duration of the optimization period.

Advantageously, demand charge module 1206 may be configured to account for demand charges in the high level optimization process performed by asset allocator 802. In some embodiments, demand charge module 1206 incorporates demand charges into the optimization problem and the cost function J(x) using demand charge masks and demand charge rate weighting factors. Each demand charge mask may correspond to a particular demand charge and may indicate the time steps during which the corresponding demand charge is active and/or the time steps during which the demand charge is inactive. Each rate weighting factor may also correspond to a particular demand charge and may scale the corresponding demand charge rate to the time scale of the optimization period.

The demand charge term of the cost function J(x) can be expressed as:

$$J(x) = \ldots \sum_{s \in sources} \sum_{q \in demands_s} w_{demand,s,q} r_{demand,s,q} \max_{i \in demand_{s,q}} (purchase_{s,i}) \ldots$$

where the max( ) function selects the maximum amount of the resource purchased from source s during any time step i that occurs during the optimization period. However, the demand charge period associated with demand charge q may not cover all of the time steps that occur during the optimization period. In order to apply the demand charge q to only the time steps during which the demand charge q is active, demand charge module 1206 can add a demand charge mask to the demand charge term as shown in the following equation:

$$J(x) = \\ \ldots \sum_{s \in sources} \sum_{q \in demands_s} w_{demand,s,q} r_{demand,s,q} \max_{i \in demand_{s,q}} (g_{s,q,i} purchase_{s,i}) \ldots$$

where $g_{s,q,i}$ is an element of the demand charge mask.

The demand charge mask may be a logical vector including an element $g_{s,q,i}$ for each time step i that occurs during the optimization period. Each element $g_{s,q,i}$ of the demand charge mask may include a binary value (e.g., a one or zero) that indicates whether the demand charge q for source s is active during the corresponding time step i of the optimization period. For example, the element $g_{s,q,i}$ may have a value of one (e.g., $g_{s,q,i}=1$) if demand charge q is active during time step i and a value of zero (e.g., $g_{s,q,i}=0$) if demand charge q is inactive during time step i. An example of a demand charge mask is shown in the following equation:

$$g_{s,q}=[0,0,0,1,1,1,1,0,0,0,1,1]^T$$

where $g_{s,q,1}$, $g_{s,q,2}$, $g_{s,q,3}$, $g_{s,q,8}$, $g_{s,q,9}$, and $g_{s,q,10}$ have values of zero, whereas $g_{s,q,4}$, $g_{s,q,5}$, $g_{s,q,6}$, $g_{s,q,7}$, $s_{s,q,11}$, and $g_{s,q,12}$ have values of one. This indicates that the demand charge q is inactive during time steps i=1, 2, 3, 8, 9, 10 (e.g., $g_{s,q,i}=0$ $\forall i=1, 2, 3, 8, 9, 10$) and active during time steps i=4, 5, 6, 7, 11, 12 (e.g., $g_{s,q,i}=1$ $\forall i=4, 5, 6, 7, 11, 12$). Accordingly, the term $g_{s,q,i} purchase_{s,i}$ within the max( ) function may have a value of zero for all time steps during which the demand charge q is inactive. This causes the max( ) function to select the maximum purchase from source s that occurs during only the time steps for which the demand charge q is active.

In some embodiments, demand charge module 1206 calculates the weighting factor $w_{demand,s,q}$ for each demand charge q in the cost function J(x). The weighting factor $w_{demand,s,q}$ may be a ratio of the number of time steps the corresponding demand charge q is active during the optimization period to the number of time steps the corresponding demand charge q is active in the remaining demand charge period (if any) after the end of the optimization period. For example, demand charge module 1206 can calculate the weighting factor $w_{demand,s,q}$ using the following equation:

$$w_{demand,s,q} = \frac{\sum_{i=k}^{k+h-1} g_{s,q,i}}{\sum_{i=k+h}^{period\_end} g_{s,q,i}}$$

where the numerator is the summation of the number of time steps the demand charge a is active in the optimization period (e.g., from time step k to time step k+h−1) and the denominator is the number of time steps the demand charge a is active in the portion of the demand charge period that occurs after the optimization period (e.g., from time step k+h to the end of the demand charge period).

The following example illustrates how demand charge module 1206 can incorporate multiple demand charges into the cost function J(x). In this example, a single source of electricity (e.g., an electric grid) is considered with multiple demand charges applicable to the electricity source (e.g., q=1 ... N, where N is the total number of demand charges). The system includes a battery asset which can be allocated over the optimization period by charging or discharging the battery during various time steps. Charging the battery increases the amount of electricity purchased from the electric grid, whereas discharging the battery decreases the amount of electricity purchased from the electric grid.

Demand charge module 1206 can modify the cost function J(x) to account for the N demand charges as shown in the following equation:

$$J(x) = \ldots + w_{d_1} r_{d_1} \max_i(g_{1_i}(-P_{bat_i} + eLoad_i)) +$$
$$\ldots + w_{d_q} r_{d_q} \max_i(g_{q_i}(-P_{bat_i} + eLoad_i)) +$$
$$\ldots + w_{d_N} r_{d_N} \max_i(g_{N_i}(-P_{bat_i} + eLoad_i))$$

where the term $-P_{bat_i}+eLoad_i$ represents the total amount of electricity purchased from the electric grid during time step i (e.g., the total electric load $eLoad_i$ minus the power discharged from the battery $P_{bat_i}$). Each demand charge q=1 ... N can be accounted for separately in the cost function J(x) by including a separate max( ) function for each of the N demand charges. The parameter $r_{d_q}$ indicates the demand charge rate associated with the qth demand charge (e.g., \$/kW) and the weighting factor $w_{d_q}$ indicates the weight applied to the qth demand charge.

Demand charge module 1206 can augment each max( ) function with an element $g_{q_i}$ of the demand charge mask for the corresponding demand charge. Each demand charge mask may be a logical vector of binary values which indicates whether the corresponding demand charge is active or inactive at each time step i of the optimization period. Accordingly, each max( ) function may select the maximum electricity purchase during only the time steps the corresponding demand charge is active. Each max( ) function can be multiplied by the corresponding demand charge rate $r_{d_q}$ and the corresponding demand charge weighting factor $w_{d_q}$ to determine the total demand charge resulting from the battery allocation $P_{bat}$ over the duration of the optimization period.

In some embodiments, demand charge module 1206 linearizes the demand charge terms of the cost function J(x) by introducing an auxiliary variable $d_q$ for each demand charge q. In the case of the previous example, this will result in N auxiliary variables $d_1 \ldots d_N$ being introduced as decision variables in the cost function J(x). Demand charge module 1206 can modify the cost function J(x) to include the linearized demand charge terms as shown in the following equation:

$$J(x) = \ldots + w_{d_1} r_{d_1} d_1 + \ldots + w_{d_q} r_{d_q} d_q + \ldots + w_{d_N} r_{d_N} d_N$$

Demand charge module 1206 can impose the following constraints on the auxiliary demand charge variables $d_1 \ldots d_N$ to ensure that each auxiliary demand charge variable represents the maximum amount of electricity purchased from the electric utility during the applicable demand charge period:

$$d_1 \geq g_{1_i}(-P_{bat_i} + eLoad_i) \quad \forall\, i = k \ldots k+h-1,\ g_{1_i} \neq 0$$
$$d_1 \geq 0$$
$$\vdots$$
$$d_q \geq g_{q_i}(-P_{bat_i} + eLoad_i) \quad \forall\, i = k \ldots k+h-1,\ g_{q_i} \neq 0$$
$$d_q \geq 0$$
$$\vdots$$
$$d_N \geq g_{N_i}(-P_{bat_i} + eLoad_i) \quad \forall\, i = k \ldots k+h-1,\ g_{N_i} \neq 0$$
$$d_N \geq 0$$

In some embodiments, the number of constraints corresponding to each demand charge q is dependent on how many time steps the demand charge q is active during the optimization period. For example, the number of constraints for the demand charge q may be equal to the number of non-zero elements of the demand charge mask $g_q$. Furthermore, the value of the auxiliary demand charge variable $d_q$ at each iteration of the optimization may act as the lower bound of the value of the auxiliary demand charge variable $d_q$ at the following iteration.

Consider the following example of a multiple demand charge structure. In this example, an electric utility imposes three monthly demand charges. The first demand charge is an all-time monthly demand charge of 15.86 \$/kWh which applies to all hours within the entire month. The second demand charge is an on-peak monthly demand charge of 1.56 \$/kWh which applies each day from 12:00-18:00. The third demand charge is a partial-peak monthly demand charge of 0.53 \$/kWh which applies each day from 9:00-12:00 and from 18:00-22:00.

For an optimization period of one day and a time step of one hour (e.g., i=1 ... 24), demand charge module 1206 may introduce three auxiliary demand charge variables. The first auxiliary demand charge variable $d_1$ corresponds to the all-time monthly demand charge; the second auxiliary demand charge variable $d_2$ corresponds to the on-peak monthly demand charge; and the third auxiliary demand charge variable $d_3$ corresponds to the partial-peak monthly demand charge. Demand charge module 1206 can constrain each auxiliary demand charge variable to be greater than or equal to the maximum electricity purchase during the hours the corresponding demand charge is active, using the inequality constraints described above.

Demand charge module 1206 can generate a demand charge mask $g_q$ for each of the three demand charges (e.g., q=1 . . . 3), where $g_q$ includes an element for each time step of the optimization period (e.g., $g_q=[g_{q_1} \ldots g_{q_{24}}]$). The three demand charge masks can be defined as follows:

$g_{1_i}=1 \forall i=1 \ldots 24$ $g_{2_i}=1 \forall i=12 \ldots 18$ $g_{3_i}=1 \forall i=9 \ldots 12, 18 \ldots 22$ with all other elements of the demand charge masks equal to zero. In this example, it is evident that more than one demand charge constraint will be active during the hours which overlap with multiple demand charge periods. Also, the weight of each demand charge over the optimization period can vary based on the number of hours the demand charge is active, as previously described.

In some embodiments, demand charge module 1206 considers several different demand charge structures when incorporating multiple demand charges into the cost function J(x) and optimization constraints. Demand charge structures can vary from one utility to another, or the utility may offer several demand charge options. In order to incorporate the multiple demand charges within the optimization framework, a generally-applicable framework can be defined as previously described. Demand charge module 1206 can translate any demand charge structure into this framework. For example, demand charge module 1206 can characterize each demand charge by rates, demand charge period start, demand charge period end, and active hours. Advantageously, this allows demand charge module 1206 to incorporate multiple demand charges in a generally-applicable format.

The following is another example of how demand charge module 1206 can incorporate multiple demand charges into the cost function J(x). Consider, for example, monthly demand charges with all-time, on-peak, partial-peak, and off-peak. In this case, there are four demand charge structures, where each demand charge is characterized by twelve monthly rates, twelve demand charge period start (e.g., beginning of each month), twelve demand charge period end (e.g., end of each month), and hoursActive. The hoursActive is a logical vector where the hours over a year where the demand charge is active are set to one. When running the optimization over a given horizon, demand charge module 1206 can implement the applicable demand charges using the hoursActive mask, the relevant period, and the corresponding rate.

In the case of an annual demand charge, demand charge module 1206 can set the demand charge period start and period end to the beginning and end of a year. For the annual demand charge, demand charge module 1206 can apply a single annual rate. The hoursActive demand charge mask can represent the hours during which the demand charge is active. For an annual demand charge, if there is an all-time, on-peak, partial-peak, and/or off-peak, this translates into at most four annual demand charges with the same period start and end, but different hoursActive and different rates.

In the case of a seasonal demand charge (e.g., a demand charge for which the maximum peak is determined over the indicated season period), demand charge module 1206 can represent the demand charge as an annual demand charge. Demand charge module 1206 can set the demand charge period start and end to the beginning and end of a year.

Demand charge module 1206 can set the hoursActive to one during the hours which belong to the season and to zero otherwise. For a seasonal demand charge, if there is an All-time, on-peak, partial, and/or off-peak, this translates into at most four seasonal demand charges with the same period start and end, but different hoursActive and different rates.

In the case of the average of the maximum of current month and the average of the maxima of the eleven previous months, demand charge module 1206 can translate the demand charge structure into a monthly demand charge and an annual demand charge. The rate of the monthly demand charge may be half of the given monthly rate and the annual rate may be the sum of given monthly rates divided by two. These and other features of demand charge module 1206 are described in greater detail in U.S. patent application Ser. No. 15/405,236 filed Jan. 12, 2017, the entire disclosure of which is incorporated by reference herein.

Incentive Programs

Referring again to FIG. 12, asset allocator 802 is shown to include an incentive program module 1208. Incentive program module 908 may modify the optimization problem to account for revenue from participating in an incentive-based demand response (IBDR) program. IBDR programs may include any type of incentive-based program that provides revenue in exchange for resources (e.g., electric power) or a reduction in a demand for such resources. For example, asset allocation system 800 may provide electric power to an energy grid or an independent service operator as part of a frequency response program (e.g., PJM frequency response) or a synchronized reserve market. In a frequency response program, a participant contracts with an electrical supplier to maintain reserve power capacity that can be supplied or removed from an energy grid by tracking a supplied signal. The participant is paid by the amount of power capacity required to maintain in reserve. In other types of IBDR programs, asset allocation system 800 may reduce its demand for resources from a utility as part of a load shedding program. It is contemplated that asset allocation system 800 may participate in any number and/or type of IBDR programs.

In some embodiments, incentive program module 1208 modifies the cost function J(x) to include revenue generated from participating in an economic load demand response (ELDR) program. ELDR is a type of IBDR program and similar to frequency regulation. In ELDR, the objective is to maximize the revenue generated by the program, while using the battery to participate in other programs and to perform demand management and energy cost reduction. To account for ELDR program participation, incentive program module 1208 can modify the cost function J(x) to include the following term:

$$\min_{b_i, P_{bat_i}} \left( -\sum_{i=k}^{k+h-1} b_k r_{ELDR_i}(adjCBL_i - (eLoad_i - P_{bat_i})) \right)$$

where $b_i$ is a binary decision variable indicating whether to participate in the ELDR program during time step i, $r_{ELDR_i}$ is the ELDR incentive rate at which participation is compensated, and $adjCBL_i$ is the symmetric additive adjustment (SAA) on the baseline load. The previous expression can be rewritten as:

$$\min_{b_i, P_{bat_i}} \left( -\sum_{i=k}^{k+h-1} b_i r_{ELDR_i} \left( \sum_{l=1}^{4} \frac{e_{li}}{4} + \sum_{p=m-4}^{m-2} \frac{1}{3} \left( eLoad_p - P_{bat_p} - \sum_{l=1}^{4} \frac{e_{lp}}{4} \right) - (eLoad_i - P_{bat_i}) \right) \right)$$

where $e_{li}$ and $e_{lp}$ are the electric loads at the lth hour of the operating day.

In some embodiments, incentive program module 1208 handles the integration of ELDR into the optimization problem as a bilinear problem with two multiplicative decision variables. In order to linearize the cost function J(x) and customize the ELDR problem to the optimization framework, several assumptions may be made. For example, incentive program module 1208 can assume that ELDR participation is only in the real-time market, balancing operating reserve charges and make whole payments are ignored, day-ahead prices are used over the horizon, real-time prices are used in calculating the total revenue from ELDR after the decisions are made by the optimization algorithm, and the decision to participate in ELDR is made in advance and passed to the optimization algorithm based on which the battery asset is allocated.

In some embodiments, incentive program module 1208 calculates the participation vector $b_i$ as follows:

$$b_i = \begin{cases} 1 & \forall i / r_{DA_i} \geq NBT_i \text{ and } i \in S \\ 0 & \text{otherwise} \end{cases}$$

where $r_{DA_i}$ is the hourly day-ahead price at the ith hour, $NBT_i$ is the net benefits test value corresponding to the month to which the corresponding hour belongs, and S is the set of nonevent days. Nonevent days can be determined for the year by choosing to participate every x number of days with the highest day-ahead prices out of y number of days for a given day type. This approach may ensure that there are nonevent days in the 45 days prior to a given event day when calculating the CBL for the event day.

Given these assumptions and the approach taken by incentive program module 1208 to determine when to participate in ELDR, incentive program module 1208 can adjust the cost function J(x) as follows:

$$J(x) = -\sum_{i=k}^{k+h-1} r_{e_i} P_{bat_i} - \sum_{i=k}^{k+h-1} r_{FR_i} P_{FR_i} + \sum_{i=k}^{k+h-1} r_{s_i} s_i + w_d r_d d - \sum_{i=k}^{k+h-1} b_i r_{DA_i} \left( \sum_{p=m-4}^{m-2} -\frac{1}{3} P_{bat_p} + P_{bat_i} \right)$$

where $b_i$ and m are known over a given horizon. The resulting term corresponding to ELDR shows that the rates at the ith participation hour are doubled and those corresponding to the SAA are lowered. This means it is expected that high level optimizer will tend to charge the battery during the SAA hours and discharge the battery during the participation hours. Notably, even though a given hour is set to be an ELDR participation hour, high level optimizer may not decide to allocate any of the battery asset during that hour. This is due to the fact that it may be more beneficial at that instant to participate in another incentive program or to perform demand management.

To build the high level optimization problem, optimization problem constructor 1210 may query the number of decision variables and constraints that each subplant 820, source 810, storage 830, and site specific constraint adds to the problem. In some embodiments, optimization problem constructor 1210 creates optimization variable objects for each variable of the high level problem to help manage the flow of data. After the variable objects are created, optimization problem constructor 1210 may pre-allocate the optimization matrices and vectors for the problem. Element links 726 can then be used to fill in the optimization matrices and vectors by querying each component. The constraints associated with each subplant 820 can be filled into the larger problem-wide optimization matrix and vector. Storage constraints can be added, along with demand constraints, demand charges, load balance constraints, and site-specific constraints.

Extrinsic Variables

In some embodiments, asset allocator 802 is configured to optimize the use of extrinsic variables. Extrinsic variables can include controlled or uncontrolled variables that affect multiple subplants 820 (e.g., condenser water temperature, external conditions such as outside air temperature, etc.). In some embodiments, extrinsic variables affect the operational domain of multiple subplants 820. There are many methods that can be used to optimize the use of extrinsic variables. For example, consider a chiller subplant connected to a cooling tower subplant. The cooling tower subplant provides cooling for condenser water provided as an input to the chiller. Several scenarios outlining the use of extrinsic variables in this example are described below.

In a first scenario, both the chiller subplant and the tower subplant have operational domains that are not dependent on the condenser water temperatures. In this scenario, the condenser water temperature can be ignored (e.g., excluded from the set of optimization variables) since the neither of the operational domains are a function of the condenser water temperature.

In a second scenario, the chiller subplant has an operational domain that varies with the entering condenser water temperature. However, the cooling tower subplant has an operational domain that is not a function of the condenser water temperature. For example, the cooling tower subplant may have an operational domain that defines a relationship between fan power and water usage, independent from its leaving condenser water temperature or ambient air wet bulb temperature. In this case, the operational domain of the chiller subplant can be sliced (e.g., a cross section of the operational domain can be taken) at the condenser water temperature indicated at each point in the optimization period.

In a third scenario, the cooling tower subplant has an operational domain that depends on its leaving condenser water temperature. Both the entering condenser water temperature of the chiller subplant and the leaving condenser water temperature of the cooling tower subplant can be specified so the operational domain will be sliced at those particular values. In both the second scenario and the third scenario, asset allocator 802 may produce variables for the condenser water temperature. In the third scenario, asset allocator 802 may produce the variables for both the tower subplant and the chiller subplant. However, these variables will not become decision variables because they are simply specified directly In a fourth scenario, the condenser water temperature affects the operational domains of both the cooling tower subplant and the chiller subplant. Because the condenser water temperature is not specified, it may become an optimization variable that can be optimized by asset allocator 802. In this scenario, the optimization variable is produced when the first subplant (e.g., either the chiller subplant or the cooling tower subplant) reports its optimization size. When the second subplant is queried, no additional variable is produced. Instead, asset allocator 802 may recognize the shared optimization variable as the same variable from the connection netlist.

When asset allocator 802 asks for constraints from the individual subplants 820, subplants 820 may send those constraints using local indexing. Asset allocator 802 may then disperse these constraints by making new rows in the optimization matrix, but also distributing the column to the correct columns based on its own indexing for the entire optimization problem. In this way, extrinsic variables such as condenser water temperature can be incorporated into the optimization problem in an efficient and optimal manner.

Commissioned Constraints

Some constraints may arise due to mechanical problems after the energy facility has been built. These constraints are site specific and may not be incorporated into the main code for any of the subplants or the high level problem itself. Instead, constraints may be added without software update on site during the commissioning phase of the project. Furthermore, if these additional constraints are known prior to the plant build they could be added to the design tool run. Commissioned constraints can be held by asset allocator 802 and can be added constraints to any of the ports or connections of subplants 820. Constraints can be added for the consumption, production, or extrinsic variables of a subplant.

As an example implementation, two new complex type internals can be added to the problem. These internals can store an array of constraint objects that include a dictionary to describe inequality and equality constraints, times during which the constraints are active, and the elements of the horizon the constraints affect. In some embodiments, the dictionaries have keys containing strings such as (subplantUserName).(portInternalName) and values that represent the linear portion of the constraint for that element of the constraint matrix. A special "port name" could exist to reference whether the subplant is running. A special key can be used to specify the constant part of the constraint or the right hand side. A single dictionary can describe a single linear constraint.

Operational Domains

Still referring to FIG. 12, asset allocator 802 is shown to include an operational domain module 1204. Operational domain module 1204 can be configured to construct an operational domain for one or more elements of asset allocation system 800. In some embodiments, operational domain module 1204 converts sampled data points into a collection of convex regions making up the operational domain and then generates constraints based on the vertices of the convex regions. Being able to convert sampled data points into constraints gives asset allocator 802 much generality. This conversion methodology is referred to as the constraint generation process.

Operational domain module 1204 can be configured to generate and store operational domains for various elements of the high level optimization problem. For example, operational domain module 1204 can create and store operational domains for one or more of sources 810, subplants 820, storage 830, and/or sinks 840. The operational domains for subplants 820 may describe the relationship between the resources, intrinsic variables, and extrinsic variables, and constraints for the rate of change variables (delta load variables). The operational domains for sources 810 may include the constraints necessary to impose any progressive/regressive rates (other than demand charges). The operational domain for storage 830 may include the bounds on the state of charge, bounds on the rate of charge/discharge, and any mixed constraints.

In some embodiments, the operational domain is the fundamental building block used by asset allocator 802 to describe the models (e.g., optimization constraints) of each high level element. The operational domain may describe the admissible values of variables (e.g., the inputs and the outputs of the model) as well as the relationships between variables. Mathematically, the operational domain is a union of a collection of polytopes in an n-dimensional real space. Thus, the variables must take values in one of the polytopes of the operational domain. The operational domains generated by operational domain module 1204 can be used to define and impose constraints on the high level optimization problem.

Referring now to FIG. 13, several graphs 1300 illustrating the operation of asset allocator 802 are shown, according to an exemplary embodiment. With each iteration of the optimization process, asset allocator 802 selects an optimization period (e.g., a portion of the simulation period) over which the optimization is performed. For example, asset allocator 802 may select optimization period 1302 for use in the first iteration. Once the optimal resource allocation 1310 has been determined, asset allocator 802 may select a portion 1318 of resource allocation 1310 to send to plant dispatch 830. Portion 1318 may be the first b time steps of resource allocation 1310. Asset allocator 802 may shift the optimization period 1302 forward in time, resulting in optimization period 1304. The amount by which the prediction window is shifted may correspond to the duration of time steps b.

Asset allocator 802 may repeat the optimization process for optimization period 1304 to determine the optimal resource allocation 1312. Asset allocator 802 may select a portion 1320 of resource allocation 1312 to send to plant dispatch 1330. Portion 1320 may be the first b time steps of resource allocation 1312. Asset allocator 802 may then shift the prediction window forward in time, resulting in optimization period 1306. This process may be repeated for each subsequent optimization period (e.g., optimization periods 1306, 1308, etc.) to generate updated resource allocations (e.g., resource allocations 1314, 1316, etc.) and to select portions of each resource allocation (e.g., portions 1322, 1324) to send to plant dispatch 1326. Plant dispatch 1326 includes the first b time steps 1318-1324 from each of optimization periods 1302-1308. Once the optimal resource allocation is compiled for the entire simulation period, the results may be sent to reporting applications 726, results database 738, and/or client device 734, as described with reference to FIG. 7.

Data Linkage Process for Central Plant Design and Operational Data

Figure 14:
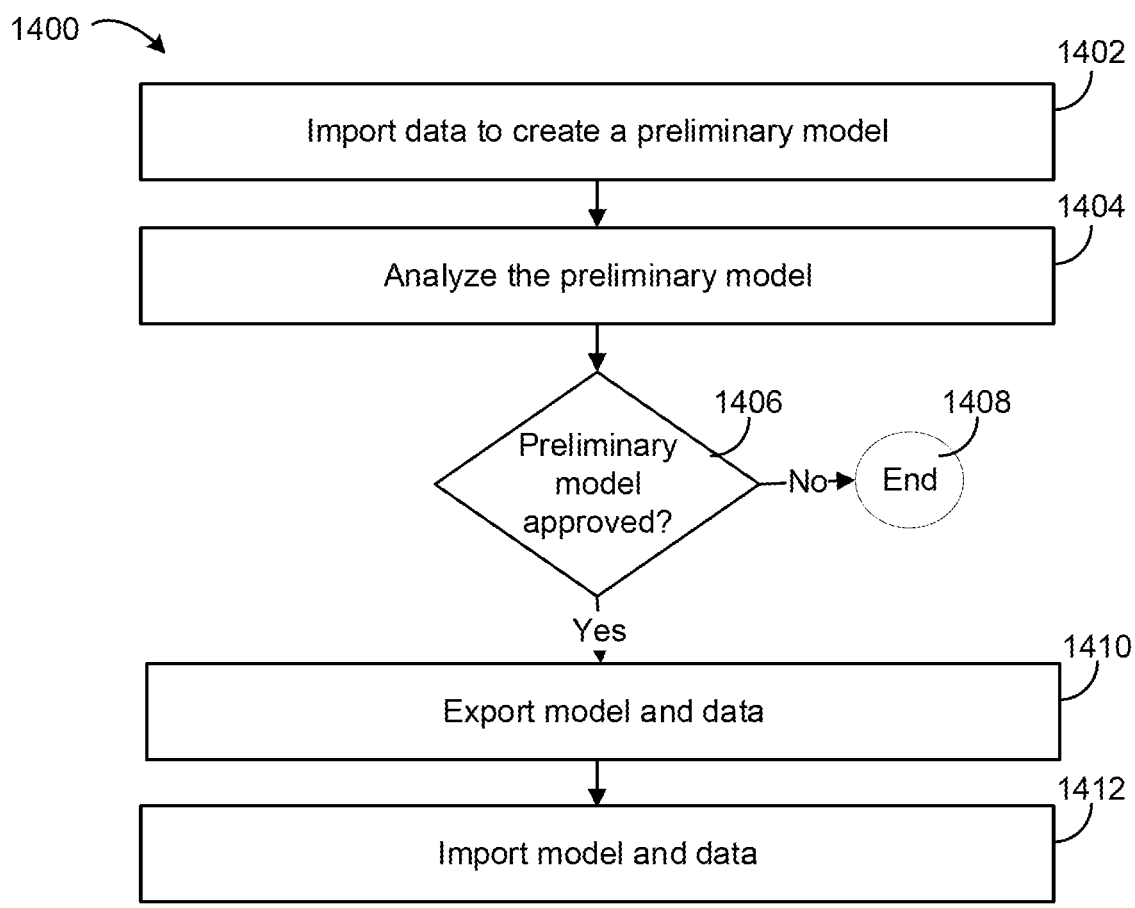
FIG. 14 is a flow diagram illustrating a process for commissioning the central plant controller of FIG. 5, according to an exemplary embodiment.

Referring now to FIG. 14, a flow diagram illustrating a process 1400 for setting up central plant controller 910 is shown, according to an exemplary embodiment. Process 1400 may be performed by one or more components of planning tool 905, A3S platform 915, and/or central plant controller 910. Before optimizing the central plant, data may be imported to central plant controller 910.

In step 1402, data is imported into planning tool 905. In some embodiments, the data may be imported by a salesperson or site customer for the central plant. The user may import a preliminary model to identify the impact of operating central plant controller 910 and other plant design changes and updates. The user may be a customer of the central plant site.

In step 1404, planning tool 905 may analyze the preliminary model created in step 1402. Analyzing the preliminary model can include sending the initial model and default data to A3S platform 915 for optimization. Planning tool 905 may receive optimization results once A3S platform 915 performs the optimization. The preliminary plant model may be further reviewed, for example in step 1406.

In step 1406, the preliminary model and optimization results produced in step 1404 may be analyzed by the salesperson or site customer for the central plant. If the salesperson or customer decides to move forward with central plant controller 910, the process continues to step 1410. In step 1410, the plant configuration and system performance models are exported from planning tool 905. In some embodiments, the data may be exported to memory of an external device (i.e. to the disk of a user's device, etc.). This exportation may occur upon user request. The format of the exported data can be consistent with the data format used by A3S platform 915 (i.e. JSON format, etc.). If the salesperson or customer decides to abandon the preliminary model, the process may exit in step 1408. Upon exiting the process, the salesperson or site customer may decide to import new data and a new preliminary model to analyze again.

In step 1412, the exported data (i.e. the plant configuration and system performance models exported in step 1410) can be imported into central plant controller 910. The import may be conducted by a user at the customer site (i.e. a field service engineer, etc.) on a client device 734 via a user interface 736 of planning tool 905. Prior to importation, the user may be prompted for the name of the import file and/or prompted to re-authenticate (i.e. enter username and password, etc.) to enhance security of the system. It may be necessary to restart the server of the central plant controller 910 in order to complete the process of importing the data. Upon restarting the server, the central plant controller 910 can hold and own the model. A user may also begin interacting with the central plant controller 910 (i.e. via user interface, etc.). At the completion of step 1412, further commissioning of building management system 1032 (i.e. mapping of point data to building management system 1032) may begin. Once the databases are populated, the files necessary for proxy host 1010 of central plant controller 910 can be generated along with the point names that form the central plant controller side of network engine 1034. The central plant controller side of network engine 1034 may be configured automatically after the model has been imported. A field engineer can then manually map the point data of building management system 1032 into network engine 1034 (e.g., via industry standard BacNet). If additional logic is required (e.g., combining points into a single value required by central plant controller 910), the field engineer may add this logic into network engine 1034.

Figure 15:
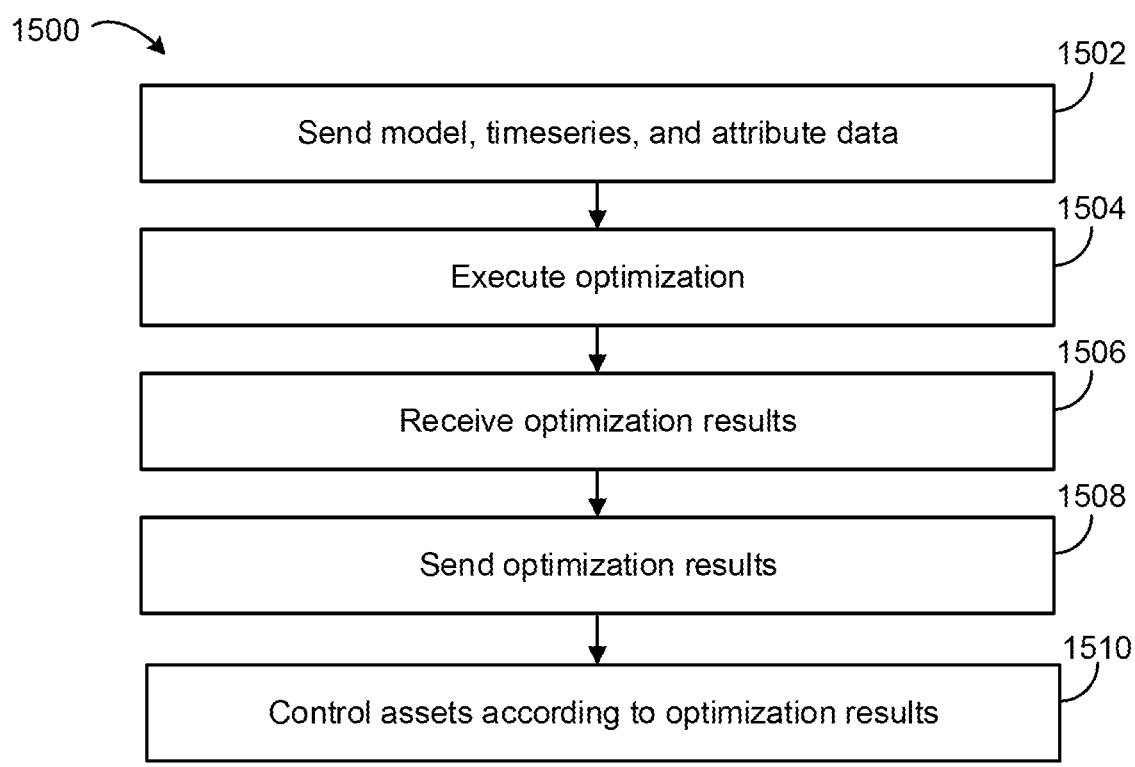
FIG. 15 is a flow diagram illustrating a process for exchanging central plant design and operational data, according to an exemplary embodiment.

Referring now to FIG. 15, a flow diagram illustrating a process 1500 for exchanging central plant design and operational data is shown, according to an exemplary embodiment. Process 1500 may be performed by central plant controller 910, A3S platform 915, and planning tool 905. Process 1500 may be done within system 500 of FIG. 5.

In step 1502, central plant controller 910 may send model data, actual timeseries data, and attribute data to A3S platform 915 for optimization. In some embodiments, central plant controller 910 may send the data on a scheduled basis (e.g., every 15 minutes, every 2 hours, etc.). In other embodiments, central plant controller 910 may schedule an off-clock dispatch run, in which case central plant controller 910 will send data promptly. Central plant controller 910 may send the model data for the central plant along with current data to A3S platform 915. Current data can be data recently acquired from the BAS, and also recent historical data. A3S platform 915 may determine the amount of data that can be inputted.

In step 1504, A3S platform 915 may use the data sent in step 1502 to optimize the assets of the central plant. Demand response optimizer 1106, specifically asset allocator 802, can perform the optimization. Details of the optimization process performed by demand response optimizer 1106 is described in greater detail with reference to FIG. 11. Upon optimization, A3S platform 915 can send optimization results to central plant controller 910.

In step 1506, central plant controller 910 may receive the optimization results from the optimization process performed by A3S platform 915, for instance in step 1504. Data handler 1020 and/or data transporter 1024 may receive the data and store it in data collector 1022. In some embodiments, central plant controller 910 can be configured to send the optimization results to one or more monitoring and reporting applications 1028 for further analysis. Central plant controller 910 can push the optimization results to planning tool 905, as described in step 1508.

In step 1508, central plant controller 910 may send current performance data (e.g., actual timeseries data, updated attribute data, etc.) and optimization results to planning tool 905. Planning tool 905 may use the additional data to enable further operational analysis, performance reporting, M&V (model & verification) reporting, and to evaluate future central plant re-designs and upgrades. In some embodiments, planning tool 905 may present the received data to a user on a client device 734 via a user interface 736 and/or may store the data in results database 738.

In step 1510, central plant controller 910 may control the assets according to the optimization results. Data handler 1020 may receive the optimization results and send the control decisions to building management system 1032. Building management system 1032 can be configured to update sources 1034, subplants 1036, and storage 1038.

Figure 16:
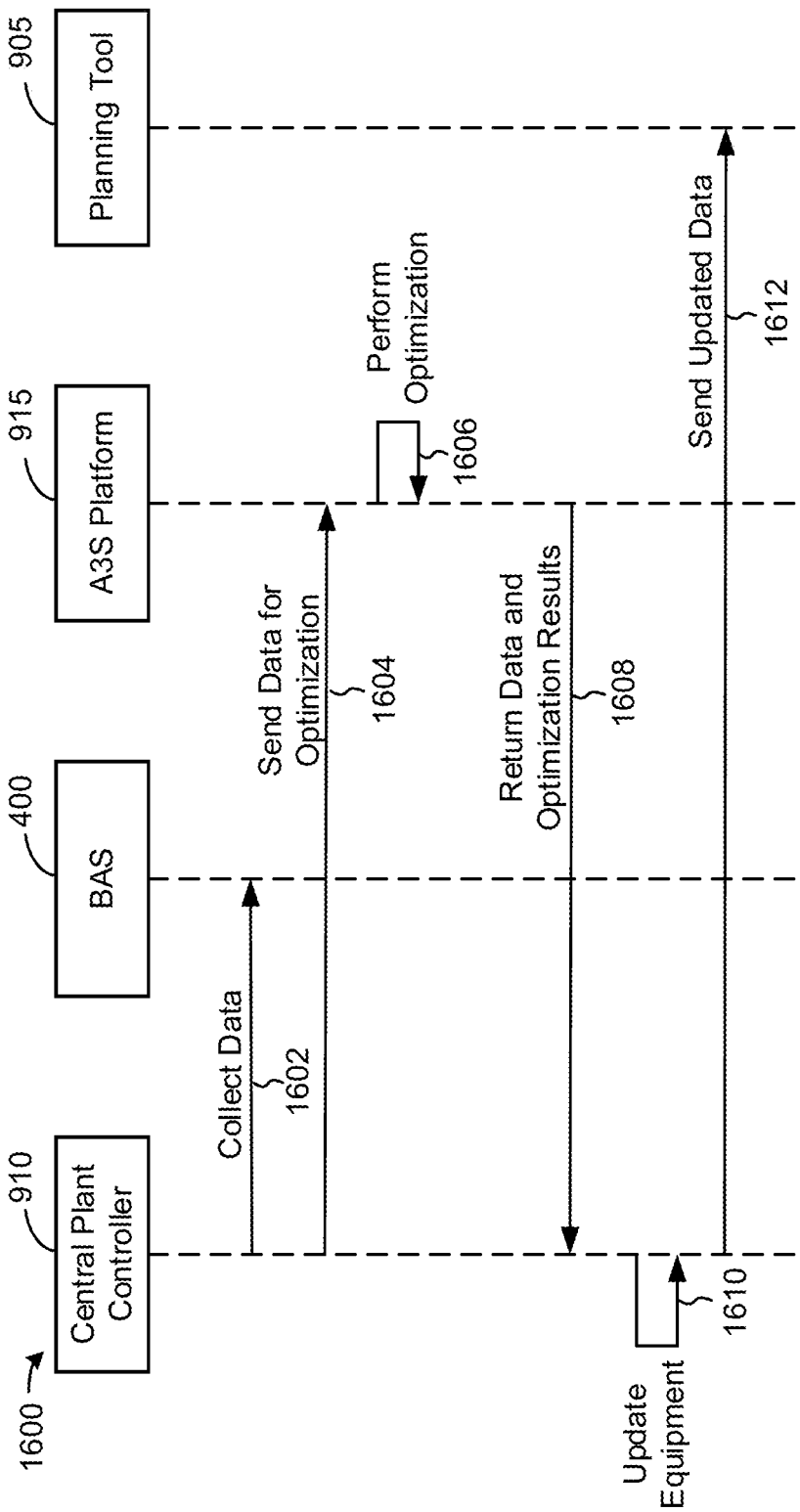
FIG. 16 is a sequence diagram illustrating a process for performing optimization within a central plant, according to an exemplary embodiment.

Referring now to FIG. 16, a sequence diagram illustrating a process 1600 for performing optimization within system 900 is shown, according to an exemplary embodiment. Process 1600 can be performed by central plant controller 910, BAS 400, A3S platform 915, and/or planning tool 905. Process 1600 can be used to optimize the performance of an asset allocation system.

Process 1600 is shown to include central plant controller 910 collecting data from building management system 1032 (step 1602). Central plant controller 910 may collect data from building management system 1032 upon value change. For example, central plant controller 910 may collect data from building management system 1032 when a data point (i.e. a temperature value) from a subplant 1036 changes. In some embodiments, central plant controller 910 may collect data from building management system 1032 on a schedule. For example, every 15 minutes central plant controller 910 may ping the equipment of building management system 1032 for data points. In some embodiments, building management system 1032 may send data to central plant controller 910 voluntarily.

Process 1600 is shown to include central plant controller 910 sending data to be optimized to A3S platform 915 (step 1604). Data sent may include model data, timeseries data, and attribute data. The data sent may be collected in step 1602, or queried from metadata database 930 and/or runtime database 925.

Process 1600 is shown to include A3S platform 915 performing optimization (step 1606). Using model data, timeseries data, and attribute data, demand response optimizer 1106 of A3S platform 915 may perform an optimization process to optimize the performance of an asset allocation system including central plant controller 910.

Process 1600 is shown to include A3S platform 915 return optimization results to central plant controller 910 (step 1608). The optimization results may determine how resources should be allocated in the central plant controlled by central plant controller 910. Central plant controller 910 may store the optimization results from A3S platform 915 in runtime database 925.

Process 1600 is shown to include central plant controller 910 updating equipment (step 1610). Depending on the optimization results, central plant controller 910 may update the values (e.g., capacity, load, etc.) of the central plan equipment. Central plant control 910 may interact with various components of building management system 1032 to update the values of equipment. For example to update the setpoints in subplants 1036, update the charge or discharge rates in storage 1038, and update the resource purchase amounts in sources 1034.

Process 1600 is shown to include central plant controller 910 sending updated data to planning tool 905 (step 1610). Data sent to planning tool 905 may include actual timeseries data and updated attribute data. Central plant controller 910 may push the data on a scheduled basis to planning tool 905. Planning tool 905 may use the data for further evaluation, for example for M&V (model and verification) reporting and analysis.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A central plant optimization system for designing and operating a central plant, the central plant optimization system comprising:
   a planning tool configured to obtain a model of the central plant comprising one or more element links representing physical connections between equipment of the central plant;
   a central plant controller configured to receive the model of the central plant from the planning tool and combine the model of the central plant with timeseries data comprising a timeseries of predicted energy loads to be served by the equipment of the central plant;
   an optimization platform configured to:
      receive, from the central plant controller, the model of the central plant combined with the timeseries data;
      automatically construct an optimization problem for the central plant using the model of the central plant and the timeseries data by using the elements links to build constraints that reflect the physical connections between the equipment of the central plant;
      solve the optimization problem to determine an optimal allocation of the energy loads across the equipment of the central plant at each of a plurality of time steps within an optimization period; and
      provide optimization results comprising the optimal allocation of the predicted energy loads to the central plant controller;
   wherein the central plant controller is configured to use the optimization results to operate the equipment of the central plant to achieve the optimal allocation of the predicted energy loads.

2. The central plant optimization system of claim 1, wherein the timeseries data further comprise a timeseries of prices for one or more resources consumed by the equipment of the central plant.

3. The central plant optimization system of claim 1, wherein the planning tool is configured to combine the model of the central plant with plan information comprising predetermined energy loads for each time step of the optimization period.

4. The central plant optimization system of claim 1, wherein the optimization platform is configured to receive, from the planning tool, the model of the central plant combined with the plan information and solve the optimization problem using the plan information in place of the timeseries data in response to a request from the planning tool.

5. The central plant optimization system of claim 1, wherein receiving the model of the central plant occurs on user demand.

6. The central plant optimization system of claim 1, wherein the central plant controller is configured to provide optimization results comprising the optimal allocation of the predicted energy loads to the planning tool.

7. The central plant optimization system of claim 6, wherein the planning tool is configured to use optimization results for reporting and analysis of the system.

8. The central plant optimization system of claim 1, further comprising a database configured to store shared data for the system.

9. The central plant optimization system of claim 1, wherein the planning tool is configured to receive initial data from an external source to be used for generating the model of the central plant.

10. The central plant optimization system of claim 1, wherein the planning tool is configured to allow user interaction, via a user interface, for designing the central plant.

11. A method for designing and operating a central plant, the method comprising:
    generating, by a planning tool, a model of the central plant, the model of the central plant comprising one or more subplant models representing equipment of the central plant and one or more element links representing connections between the equipment of the central plant;
    receiving, by a central plant controller, the model of the central plant from the planning tool;
    combining, by the central plant controller, the model of the central plant with timeseries data comprising a timeseries of predicted energy loads to be served by the equipment of the central plant;
    receiving, by an optimization platform, a model of the central plant combined with timeseries data;
    automatically constructing, by the optimization platform, an optimization problem for the central plant using the model of the central plant and the timeseries data, wherein automatically constructing the optimization problem comprises automatically determining, by the optimization platform, a number of decision variables to include in the optimization problem based on the model;
    solving, by the optimization platform, the optimization problem to determine an optimal allocation of the energy loads across the equipment of the central plant at each of a plurality of time steps within an optimization period;
    providing, by the optimization platform, optimization results comprising the optimal allocation of the predicted energy loads to the central plant controller;
    using, by the central plant controller, the optimization results to operate the equipment of the central plant to achieve the optimal allocation of the predicted energy loads.

12. The method of claim 11, wherein the timeseries data further comprise a timeseries of prices for one or more resources consumed by the equipment of the central plant.

13. The method of claim 11, further comprising combining, by the planning tool, the model of the central plant with plan information comprising predetermined energy loads for each time step of the optimization period.

14. The method of claim 11, further comprising:
    receiving, by the optimization platform, from the planning tool, the model of the central plant combined with the plan information;
    solving, by the optimization platform, the optimization problem using the plan information in place of the timeseries data in response to a request from the planning tool.

15. The method of claim 11, wherein receiving the model of the central plant occurs on user demand.

16. The method of claim 11, further comprising providing, by the central plant controller optimization results comprising the optimal allocation of the predicted energy loads to the planning tool.

17. The method of claim 16, further comprising using, by the planning tool, optimization results for reporting and analysis of the system.

18. The method of claim 11, further comprising storing, by a database, shared data for the system.

19. The method of claim 11, further comprising receiving, by the planning tool, initial data from an external source to be used for generating the model of the central plant.

20. The method of claim 11, further comprising allowing, by the planning tool, user interaction, via a user interface, for designing the central plant, wherein the model is based on the user interaction via the user interface.

* * * * *